US006591272B1

(12) United States Patent
Williams

(10) Patent No.: US 6,591,272 B1
(45) Date of Patent: Jul. 8, 2003

(54) METHOD AND APPARATUS TO MAKE AND TRANSMIT OBJECTS FROM A DATABASE ON A SERVER COMPUTER TO A CLIENT COMPUTER

(75) Inventor: Mark Williams, Capitola, CA (US)

(73) Assignee: Tricoron Networks, Inc., Capitola, CA (US)

( * ) Notice: Subject to any disclaimer, the term of this patent is extended or adjusted under 35 U.S.C. 154(b) by 0 days.

(21) Appl. No.: 09/510,750

(22) Filed: Feb. 22, 2000

Related U.S. Application Data

(60) Provisional application No. 60/121,527, filed on Feb. 25, 1999.

(51) Int. Cl.[7] ........................... G06F 7/00; G06F 17/00

(52) U.S. Cl. ........................ 707/102; 707/100; 707/101

(58) Field of Search .................... 707/1–10, 100–104.1; 706/50; 345/763

(56) References Cited

U.S. PATENT DOCUMENTS

| | | | | | |
|---|---|---|---|---|---|
| 4,930,071 | A | * | 5/1990 | Tou et al. | 706/50 |
| 5,295,256 | A | * | 3/1994 | Bapat | 717/137 |
| 5,418,717 | A | * | 5/1995 | Su et al. | 704/9 |
| 5,542,078 | A | * | 7/1996 | Martel et al. | 707/101 |
| 5,627,979 | A | * | 5/1997 | Chang et al. | 345/763 |
| 5,630,131 | A | * | 5/1997 | Palevich et al. | 717/108 |
| 5,652,884 | A | * | 7/1997 | Palevich | 713/1 |
| 5,809,505 | A | * | 9/1998 | Lo et al. | 707/100 |
| 5,832,498 | A | * | 11/1998 | Exertier | 707/1 |
| 5,857,191 | A | * | 1/1999 | Blackwell et al. | 707/10 |
| 5,857,197 | A | | 1/1999 | Mullins | 707/103 |
| 5,893,108 | A | * | 4/1999 | Srinivasan et al. | 707/103 R |
| 5,956,725 | A | * | 9/1999 | Burroughs et al. | 707/100 |
| 5,970,490 | A | * | 10/1999 | Morgenstern | 707/10 |
| 5,999,734 | A | * | 12/1999 | Willis et al. | 717/149 |
| 6,038,565 | A | * | 3/2000 | Nock | 707/101 |
| 6,061,515 | A | * | 5/2000 | Chang et al. | 707/100 |
| 6,175,837 | B1 | * | 1/2001 | Sharma et al. | 707/102 |
| 6,374,256 | B1 | * | 4/2002 | Ng et al. | 707/100 |
| 6,453,312 | B1 | * | 9/2002 | Goiffon et al. | 707/3 |

OTHER PUBLICATIONS

"Relational Data Hits the Highway", Julia K. Miller and Thomas Kern, *Distributed Computing,* Jul. 1998, pp. 38–42.

* cited by examiner

*Primary Examiner*—Greta Robinson
*Assistant Examiner*—Linh Black
(74) *Attorney, Agent, or Firm*—Gray Cary Ware & Freidenrich LLP

(57) ABSTRACT

Contents of databases are translated into objects by reading the database schema metadata to determine data interrelationships and create objects with nominal human to computer interaction. Metadata for any number of databases is normalized in a standardized view. Skeleton code templates representative of final classes to be produced are accessed and merged with the standardized view. Source code for the class of the objects is then generated. At runtime, data objects are then produced by encapsulating the metadata and data values. Communication between database instances and a client computer consists of metadata and database row values., Rows from database tables and the corresponding metadata are transmitted from the server to the client computer in one logical network operation. The final distributed objects are then assembled into the optimal format required by the client computer. To update, delete or create new persistent objects, the reverse process occurs.

8 Claims, 22 Drawing Sheets

Normalization Object Topology

Basic OSF Persistence Model

A Generated HTML Page

Non-Frames Generated HTML Page

Database Connect Panel- DB Login Panel

Database Connect Panel- Advanced Connect

Database Connect Panel- DB Driver and URL

Database and Table Select- No Selections Made

Database and Table Select- CUSTOMER Table Selected

Object and Attribute Naming

Object and Attribute Naming-
Attribute Name Correction

Database and Table Select- All Tables Selected

Generation Options - Primary Options

Generation Options - Enterprise Architecture

Generation Options - Secondary Options

HTML Template in
IDE Design Mode

Generated
HTML
Subframe

METHOD AND APPARATUS TO MAKE AND TRANSMIT OBJECTS FROM A DATABASE ON A SERVER COMPUTER TO A CLIENT COMPUTER

This application claims the benefit of U.S. Provisional Application No. 60/121,527, filed on Feb. 25, 1999, entitled "Expert System to Build and Deploy Coherent Networked Distributed Objected Applications".

TECHNICAL FIELD

The present invention relates to translating relations in databases to networked, persistent objects in a manner consistent with an expert, automated process, specifically with nominal computer to human interaction and minimal knowledge and training requirements from the standpoint of the end user. Once created, the present invention efficiently transmits the objects from databases in server computers, and in particular to a method and apparatus for making objects from databases in the classes of objects desired and to transmit the objects made, efficiently to client computers.

This application incorporates by reference the files on a Compact Disc Recordable (CD-R) media, for operating under IBM-PC machine format and MS-Windows operating system. The files are for execution by any machine supporting a lava Virtual Machine (JVM) and are thus platform independent. The list of files contained on the CD-R media, including the names, sizes in bytes and dates of creation is as follows:

| FILE NAMES | SIZE | DATE |
|---|---|---|
| OSFApplicationTables.java | 4,962 | 02/14/00 12:26p |
| OSFAttribute.java | 1,964 | 02/14/00 12:26p |
| OSFBaseObject.java | 18,709 | 02/14/00 12:26p |
| OSFBaseTable.java | 7,991 | 02/14/00 12:26p |
| OSFBaseTableIO.java | 3,506 | 02/14/00 12:26p |
| OSFColumnList.java | 5,688 | 02/14/00 12:26p |
| OSFComponentObject.java | 23,477 | 02/14/00 12:26p |
| OSFControlServlet.java | 14,741 | 02/14/00 12:26p |
| OSFDatabase.java | 18,139 | 02/14/00 12:26p |
| OSFDataElement.java | 1,945 | 02/14/00 12:26p |
| OSFDateTime.java | 22,519 | 02/14/00 12:26p |
| OSFDBIOException.java | 2,667 | 02/14/00 12:26p |
| OSFDBIOObject.java | 18,861 | 02/14/00 12:26p |
| OSFDBUpdateValueCompareException.java | 6,155 | 02/14/00 12:26p |
| OSFGeneralExceptionFormat.java | 1,585 | 02/14/00 12:26p |
| OSFGenerate.java | 281,158 | 02/14/00 12:26p |
| OSFGenerateMT.java | 248,832 | 02/14/00 12:26p |
| OSFIDL.java | 10,813 | 02/14/00 12:26p |
| OSFKeyField.java | 2,248 | 02/14/00 12:26p |
| OSFKeyFields.java | 3,411 | 02/14/00 12:26p |
| OSFMain.java | 234,303 | 02/14/00 12:26p |
| OSFMember.java | 9,143 | 02/14/00 12:26p |
| OSFMessageWindow.java | 5,064 | 02/14/00 12:26p |
| OSFObject.java | 5,478 | 02/14/00 12:26p |
| OSFObjectCache.java | 5,213 | 02/14/00 12:26p |
| OSFObjects.java | 31,569 | 02/14/00 12:26p |
| OSFORBStream.java | 59,173 | 02/14/00 12:26p |
| OSFORBStreamException.java | 1,607 | 02/14/00 12:26p |
| OSFORBStreamObject.java | 613 | 02/14/00 12:26p |
| OSFOwnerList.java | 3,731 | 02/14/00 12:26p |
| OSFPersistenceObject.java | 22,468 | 02/14/00 12:26p |
| OSFPickListBuildThread.java | 8,746 | 02/14/00 12:26p |
| OSFRegistry.java | 4,310 | 02/14/00 12:26p |
| OSFRelationList.java | 6,487 | 02/14/00 12:26p |
| OSFRemoteException.java | 2,739 | 02/14/00 12:26p |
| OSFRulesObject.java | 16,548 | 02/14/00 12:26p |
| OSFSecurity.java | 26,245 | 02/14/00 12:26p |
| OSFSecurityException.java | 1,595 | 02/14/00 12:26p |
| OSFSecurityObject.java | 1,974 | 02/14/00 12:26p |

-continued

| FILE NAMES | SIZE | DATE |
|---|---|---|
| OSFServerObject.java | 3,851 | 02/14/00 12:26p |
| OSFServletObject.java | 107,762 | 02/14/00 12:26p |
| OSFServletRunner.java | 1,542 | 02/14/00 12:26p |
| OSFSystemManagement.java | 16,839 | 02/14/00 12:26p |
| OSFTableOwner.java | 821 | 02/14/00 12:26p |
| templates | | 02/14/00 12:26p |
| OSFattributecommonrules.java | 2,253 | 02/14/00 12:26p |
| OSFbuildejserver | 1,087 | 02/14/00 12:26p |
| OSFcommonrules.java | 9,209 | 02/14/00 12:26p |
| OSFcontents.html | 2,416 | 02/14/00 12:26p |
| OSFcontentsDEMO.html | 2,675 | 02/14/00 12:26p |
| OSFcontentsPROD.html | 2,431 | 02/14/00 12:26p |
| OSFdbio.java | 51,642 | 02/14/00 12:26p |
| OSFdeploymentdescriptor.txt | 1,628 | 02/14/00 12:26p |
| OSFdeploymentdescriptor.xml | 1,108 | 02/14/00 12:26p |
| OSFedit.html | 5,541 | 02/14/00 12:26p |
| OSFejhome.java | 2,592 | 02/14/00 12:26p |
| OSFejmanifest | 111 | 02/14/00 12:26p |
| OSFejobject.java | 8,936 | 02/14/00 12:26p |
| OSFejserver.java | 21,310 | 02/14/00 12:26p |
| OSFhelp.html | 4,475 | 02/14/00 12:26p |
| OSFinquiry.html | 5,718 | 02/14/00 12:26p |
| OSFlanguagesedscript.sed | 1,079 | 02/14/00 12:26p |
| OSFobject.java | 86,725 | 02/14/00 12:26p |
| OSFpersistence.java | 44,242 | 02/14/00 12:26p |
| OSFprodbuildNT.cmd | 7,119 | 02/14/00 12:26p |
| OSFregistry.java | 26,452 | 02/14/00 12:26p |
| OSFresourcebundle.java | 2,362 | 02/14/00 12:26p |
| OSFrules.java | 8,118 | 02/14/00 12:26p |
| OSFsearch.html | 4,593 | 02/14/00 12:26p |
| OSFserver.java | 28,246 | 02/14/00 12:26p |
| OSFserverdeploymentdescriptor.xml | 613 | 02/14/00 12:26p |
| OSFserverrules.java | 6,960 | 02/14/00 12:26p |
| OSFserverstartup.java | 5,129 | 02/14/00 12:26p |
| OSFservlet.java | 81,345 | 02/14/00 12:26p |
| OSFtable.html | 5,104 | 02/14/00 12:26p |
| OSFtestdbio.java | 15,552 | 02/14/00 12:26p |
| OSFtestejserver.java | 5,949 | 02/14/00 12:26p |
| OSFtestobject.java | 6,679 | 02/14/00 12:26p |
| OSFtestpersistence.java | 17,665 | 02/14/00 12:26p |
| OSFtestserver.java | 18,562 | 02/14/00 12:26p |

BACKGROUND OF THE INVENTION

SQL-based databases and the tables and structures contained therein are well known in the art. Typically, SQL-based tables and associated relations are "flat" structures involving elements in rows and columns with elements in a column "related" to elements in different columns by a relation.

Structured Query Language or "SQL" is used to define database elements, consisting, but not limited to: tables, columns with tables, data types of columns, relationships between tables, constraints of numerous types, and to perform queries upon and to also perform create, update, delete operations upon the aforementioned elements. Although attempts have been made at standardization, in reality the syntax of SQL and operation of relational databases can vary significantly from one database vendor and type to another. It can thus be problematic, within an application, to change from one database type to another.

The process of interrogation of relational database schema or catalogs to obtain information pertaining to the database tables and the interrelationships between database tables is well known.

The use of Internet, or Intranet, or other network to communicate from a database computer to a server computer to a client computer is also well known.

The use of software to manually map database tuples (rows of a table or, more importantly, multiple rows of related tables) into objects for use by object oriented languages such as lava and C++ is also well known.

The use of software to map objects from relations and data in relational database management systems or vice versa to object oriented applications is also well known.

The use of software to transmit information in object form from a server computer to a client computer or vice versa is also well known.

In the prior art, such as that disclosed in U.S. Pat. No. 5,857,197, the process of manually mapping database tuples into objects is typically performed through utilization of graphical computer interface. Using a graphical computer interface in a manual manner for this relational to object mapping operation has proven to be time consuming and error prone. An expert-level technician with extensive knowledge of both the internals of relational databases and detailed knowledge and experience with object oriented systems and languages is typically required to use these software products, referred to as "object-relational mapping tools". These expert-level personnel are usually in practice, both scarce and expensive.

In the prior art, databases have been maintained on server computers and when queried by a client computer the resultant objects have been transmitted to the client computer. There is an inherent mismatch between data stored in relational databases and the format and structure of this relational data in object based systems. The problem faced by the prior art and how such prior art has failed is detailed in "Relational Data Hits the Highway, Making Persistent Objects from Relational Data", Miller, Julia K. and Kern, Thomas, pgs. 38–42, *Distributed Computing*, Jul. 1998. Further, network efficiency problems faced by the prior art are enumerated in "Reducing Network Traffic in Distributed Java Apps", Patten, Bon and McCabe, James, pgs. 51–57, Java Report, Sep. 1999. Attempts to solve these problems in the prior art have been addressed by several methods. A common technique is to create an intermediate translation or mapping between the relational database(s) and the object system though interaction with a graphical interface. It is not uncommon to have to manually create or define all of the attributes and methods of the target objects, then manually map the corresponding relational data. This intermediate translation layer of software either significantly and measurably reduced the efficiency of the resultant application and/or introduced an additional point of failure into the application, thus reducing the overall reliability of the application.

In the prior art, manual creation or manipulation of SQL is also typically needed to populate the objects from the database though this intermediate object-relational mapping layer. This SQL can be specific to the brand or vendor of the database, making migration from one database type to that of another vendor costly and problematic. In the prior art, the combination of numerous, heterogeneous databases from different database vendors was either time-consuming, error-prone, problematic, inefficient, or not possible.

In the prior art, one could typically update the underlying relational database(s) exclusively through the object system, precluding direct database updates though conventional methods, such as offline or batch database load jobs or tasks, and realtime data communication software. The result would be data presented to end users that would not be current or, worse, when updates were made to the underlying database, the offline or batch changes would be lost.

In the prior art, to transmit subsets of related database tables as a distributed objects comprising, e.g. 4×5 or a total of 20 elements, 4 objects need to be created at the server computer and transmitted to the client computer with up to, in the case of CORBA, 20 subsequent attribute requests from the client computer to the server computer interspersed there between for a total of 40 transmissions, or more, over the network to populate the 4 objects. This is wasteful of the network and server resources and reduces the performance and scalability of object systems so constructed. Thus, what is required and would be particularly useful would be:

1. A computer program product that embodies and contains the human knowledge of an expert in the fields of both relational databases and object systems and object languages, and,
2. A computer program product that reduces or eliminates the manual and error-prone manual mapping operations between the relational database(s) and the object oriented classes required by the object-based system, and,
3. A computer program product that provides the ability to combine multiple types of heterogeneous databases from different vendors into one logical object view, so that the business application software sees one logical set of objects in a vendor-independent manner, and,
4. A computer program product that provides a transparent way to update and access relational databases as persistent objects without the need to ever use or be aware of the specific query language (or SQL) unique to a given database vendor, thus providing the capability to change vendors and types of a given relational database so as to preclude the necessity to alter the high-level source code at the application level, and
5. A computer program product that permits offline database loads and batch database update jobs and real time data communications interface software to execute concurrently with, and update the same databases as, the object based system, whilst concurrently providing consistent and current data to the end-users and eliminating the possibility of lost updates, whilst also performing this in an efficient manner, and,
6. A computer program product that generates software that, at execution time, is as efficient or more efficient, and also less problematic, than software that could be manually designed, constructed, written, and tested by an expert in the fields of relational databases and object systems and object languages.

SUMMARY OF THE INVENTION

In the present invention, an automated, expert method, system and program product that translates and transmits metadata and data from database tables into familiar and customary objects desired is disclosed. The method comprises the steps of reading the definitional elements of the databases to determine data types and interrelationships between relational data elements. These data interrelationships and data types are assembled in a vendor-neutral standardized view of the database schemas and the plurality of all the possible logical objects contained therein in the databases are created. Template definitions generically represent the classes of the objects desired.

An inexperienced user can, if so desired, easily select a subset of all possible objects represented by the databases through use of a simple and intuitive graphical interface. Conversely, tables and interrelationships not required by the application can be easily deselected through use of the said simple and intuitive graphical interface.

Source code for the classes is then generated from the standardized view when merged with the prepared template definitions. The source code is then compiled into binary executable form into the classes desired. Pseudo-objects are then produced by dynamic generation and execution of pre-optimized SQL, enveloping values that result from execution of the generated prepared SQL statements. Result sets from said associated prepared statement operations from the appropriate database tables and rows are normalized into a standard format, then combined with metadata from the database schemas. The pseudo-objects are then ready for transmission to the client computer or the requester of the objects desired. The present invention also relates to a method of communicating elements of a database table between a server computer and a client computer. A pseudo-object is generated by the server computer with the pseudo-object comprising rows from singular database tables, or optimized joins between multiple related database tables, that comprise the object desired. The plurality of datatypes present in the relational databases are normalized into a singular standardized form to prepare the data for transmission to the requestor of the object. Metadata of the elements where the metadata is the relationship between the data elements is also generated by the server computer. The metadata and normalized pseudo-object data are transmitted from the server computer to the client computer in a single logical transmission.. At the client computer, the elements are assembled into the final objects from the pseudo-objects and metadata received, into the format required by the software on the client computer without runtime overhead on the database or middle-tier server computers.

The present invention also relates to a method of communication of new objects from client computers and their conversion into one or more rows to be inserted in the corresponding databases in transactional mode.

The present invention also relates to a method of communication of changes to existing objects from client computers and their conversion into updates to one or more rows so as to modify the rows of the appropriate tables in the corresponding databases in transactional mode.

The present invention also relates to a method of communication removal existing objects from client computers so as to delete the rows of the appropriate tables in the corresponding databases in transactional mode.

The present invention also relates to a method that permits the databases to be shared with multiple applications, so as to ensure that the most current data is presented to the end-users and that updates from end users do not collide with updates, inserts and deletes to database columns and rows performed outside of the object system.

Finally, the present invention also relates to an article of manufacture embodied as a computer usable medium having computer readable program code embodied therein configured to perform the aforementioned methods.

DETAILED DESCRIPTION OF THE DRAWINGS

Figure 1:
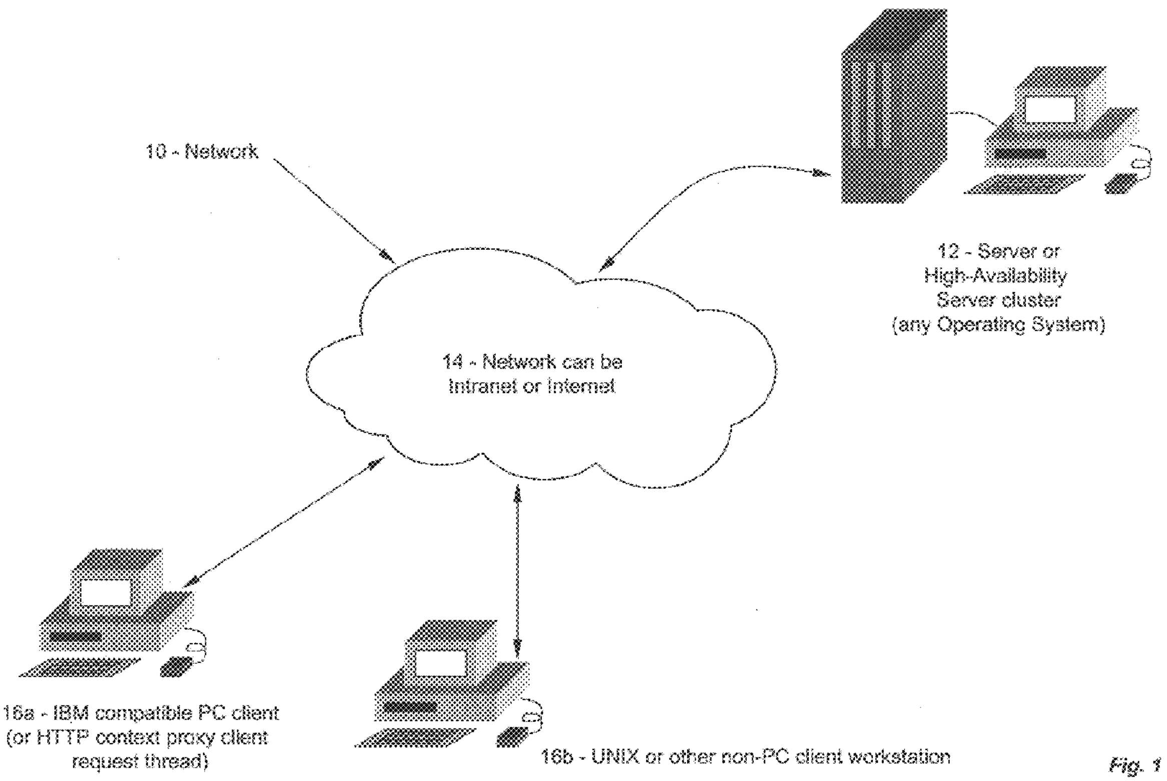
FIG. 1 is a schematic hardware view of the relationship of a client computer and a server computer in the environment in which the methods of the present invention are utilized.

Referring to FIG. 1 there is shown a network 10 in which the methods of the present invention can be practiced. As is well known, the network 10 comprises a server computer 12 connected to a network 14 to which a number of client computers 16 are also connected. The client computers 16 communicate with the server computer 12 through the network 14. The network 14 can be an Intranet in which the network is private, it can be in the nature of the Internet, which is the public accessible network or it can be a secure private virtual network, a private network which uses the Internet. The server computer 12 can comprise an IBM compatible PC, or a workstation or a mini-computer or a mainframe. Each of the client computer 16(*a–b*) can comprise IBM compatible PCs or other types of computers having at least a microprocessor, disk storage and some memory for processing. It can even be a NC or network computer in which there is no disk for storage.

Figure 2:
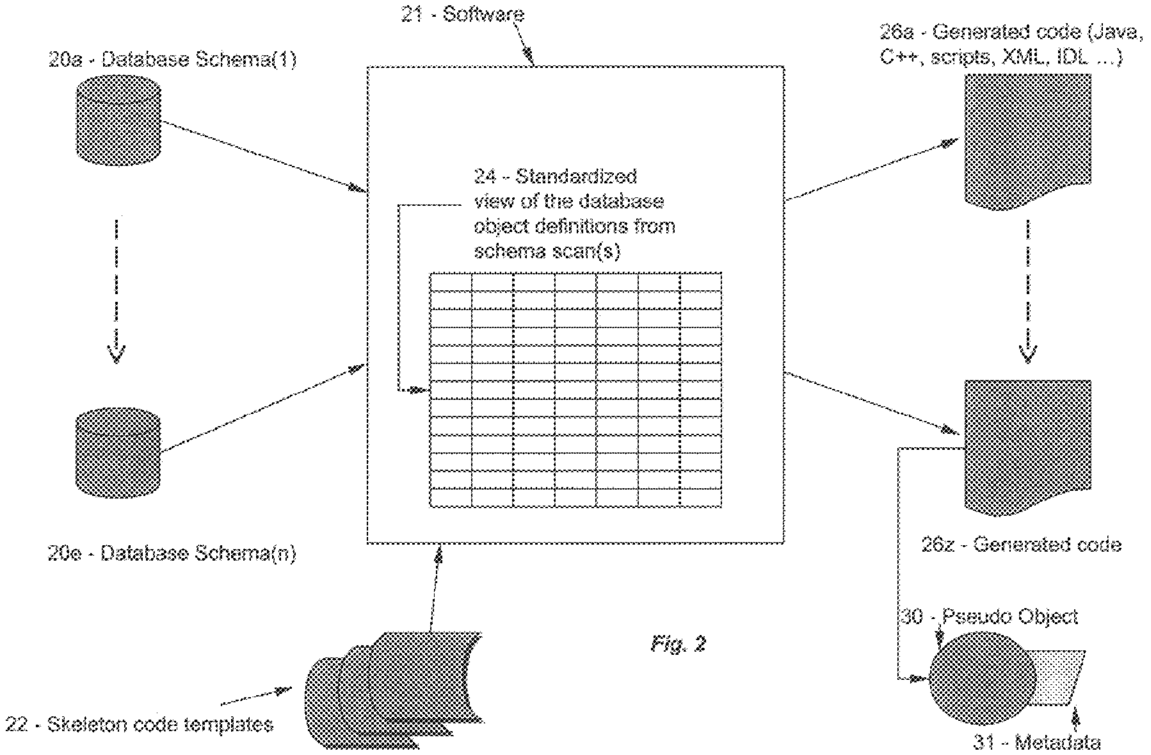
FIG. 2 is a schematic software view of an embodiment of one method of the present invention with regard to the translation of elements of a relational database table into classes desired.

In the first method of the present invention, shown in FIG. 2, software 21 in the nature of a computer usable medium, such as magnetic disks or CD-ROM, having computer readable program code embodied therein is loaded onto any computer connected to the network 14, such that it can access a plurality of databases 20(*a–e*). The software 21 generates the necessary class file source code compilation then subsequent execution by the server computer 12 and, if necessary, by the client computer 16. The software 21 presents a graphical computer interface to the user on the client computer 16 requesting the user to establish connections to the various database management systems or databases 20(*a–e*) to be selected and to be translated into objects desired. Thus, for example, if a user desires to access data from a plurality of databases 20(*a–e*), which are all different and from different vendors and having different object properties, the method of the present invention first seeks out the definitions or the schemas from these databases 20(*a–e*).

The software 21 then performs an inspection of the schema definitions and an optional inversion of each database table contained within the databases 20(*a–e*). Thus, each table is optionally read from top to bottom and each value of each column is inspected. From this inspection, a pick list is generated for ultimate presentation to the user at run time, in which the user can minimize data entry errors. Further, by internationalizing the pick list descriptions, it permits the user at the client computer 16(*a–b*) to select the preferred language. To perform this, the software 21 executes a pick list scan thread for each database table in databases 20(*a–e*). Column values are selected as pick list candidates based upon field, length and count of unique values. A java.util.LlistRresourceBundle of a derived class is generated for each object and foreign language selected at this time. A translation file contains internationalized strings for each attribute descriptor and descriptor for each pick list in each object. Further details of this process is set forth in the section entitled "Database Table Scan/Table Column Value Inversion" in the Principles of Operation set forth hereinafter.

Once the database tables have been selected and each column of values has been examined, a standardized view of the data objects 24 is generated. The "standardized view of the database objects" 24 is structure of vectors and hash tables 24 having the relationship between the elements of the database table, common to all the database tables in the databases 20(*a–e*) without any specific elements that are unique to the database tables, that are attributable to any particular vendors. Thus, this structure 24 so generated does not contain any code that is specific to the type of the data object that the user has desired nor programming language selected, e.g. C++, JAVA, or object language. The structure 24 so generated only has the definitional elements and values common to the database tables in the databases 20(*a–e*). This standardized view of the databases 20(*a–e*) is generated and a pictorial representation of this is set forth in the diagram entitled "Normalization Object Topology" of the preferred embodiment description, hereinafter.

Skeleton code templates 22, generalized versions of the final objects to be produced, are also supplied to the software 21. Code 26(*a–z*) for the class of the particular objects desired by the user, e.g. Java/C++, XML, sed or shell scripts, IDL etc. is then generated. The code 26 is used to implement the standardized view of the table 24.

The foregoing method can be analogized to the following in the word processing area. Assume the documents 20(*a–e*) have been created by various different application programs such as Word, WordPerfect, PageMaker, Claris, etc. The standardized view of each particular document 24, may be the DOS text version of those characters without the specific attribute codes or metadata produced by the respective programs but with the text indicating where the attribute codes should be placed. For example, different word processing programs generate different code for the attribute of "bold" or "underscore". The standardized view of the document 24 simply has the reference to the words that constitute the document as well as to indicate that that particular word or phase is to be "bolded". The code 26 that is so generated would then provide the specific bold code for that object or that version of the document desired.

It is the use of templates 22 which are not object-specific combined with standardized view of object specific tables 24 to convert into code 26 (*a–z*), such that after compiling and execution pseudo-objects 30 of the classes desired and its associated metadata 31, is produced at run time, that is the basis of the first method of the present invention. The software 21 to perform the foregoing method is set forth in the software modules entitled: OSFMain.java and OSFGenerate.java, within the Principles of Operation set forth on the CD-ROM filed herewith.

Figure 3:
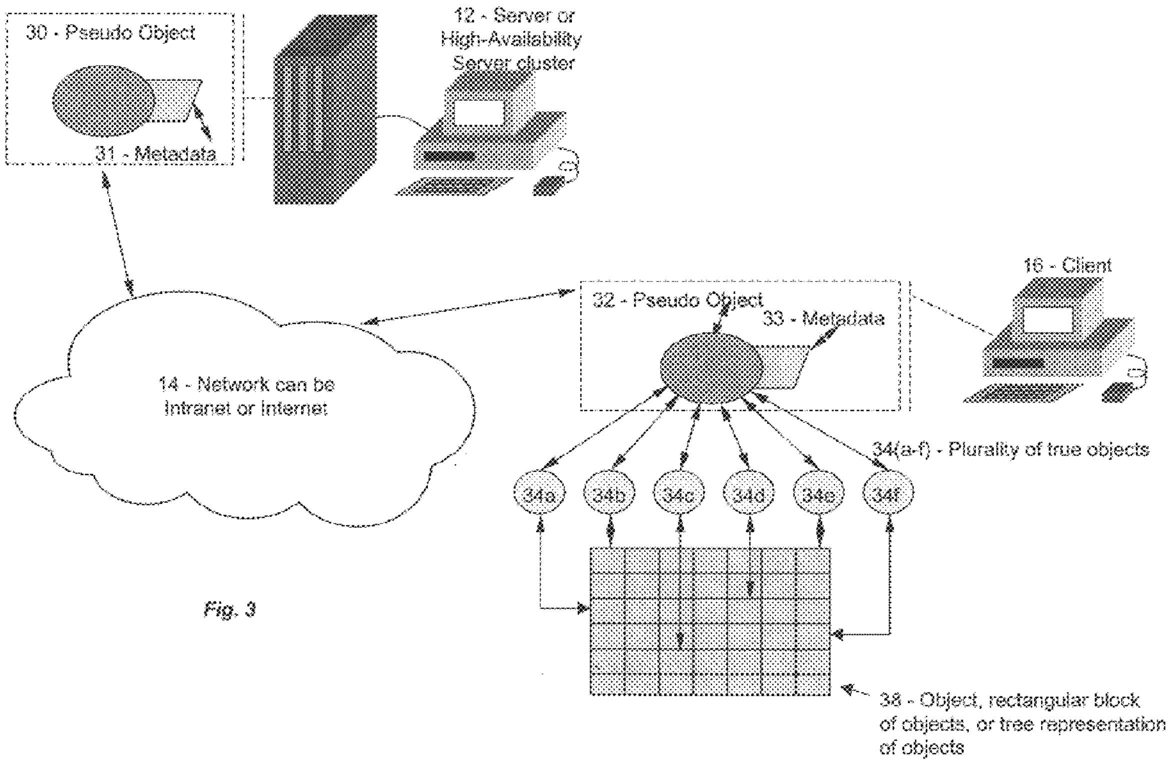
FIG. 3 is a schematic block level diagram of a software view of another method of the present invention in communicating elements of a database tables from a one or more database server computers and/or middle-tier computers to a client computer.

Referring to FIG. 3, once the code 26 (on FIG. 2) is compiled and loaded upon server computer 12, object access or update requests can originate from client computer(s) 16 over network 14. Server computer 12, in response to an object access request, generates the pseudo-object 30 and the associated metadata 31, in a particular object of choice is generated. During execution, subsets of database tables in the databases 20(*a–e*) (on FIG. 2) are enveloped by code 26 (on FIG. 2) to become a pseudo-object 30 desired, along with its associated metadata 31, and is transported as a single logical network packet unit transmitted synchronously or asynchronously over the network 14 to the client computer 16. The pseudo-object 30 so transmitted over the network 14 with metadata 31 is received as the received pseudo-object 32 and received metadata 33 at the client computer 16. However, as can be seen from the previous description, the received pseudo-object 32 is in essence data a subset of rows from database tables in databases 20(*a–e*) of the relevant entries comprising a plurality of entries. Thus, the received pseudo-object 32 at the client computer 16 is then assembled into a plurality of true objects 34(*a–f*) in an object, or block of objects; or hierarchical or "tree" object representation 38 having the specific relationships between the objects 34(*a–f*). The object(s) 38 then can be presented to the user through conventional display means such as HTML etc.

The manner by which the pseudo-object 30 and metadata 31 is transmitted over the network 14 in which the data and their relationship is transmitted in a single packet unit is as follows. The pseudo-object 30, is as previously described, comprises a plurality of the values 34(*a–f*) of the object 38, in the user interface of the client computer 16. The relationship between these objects 34(*a–f*), called metadata, was transmitted along with the pseudo-object 30. In the logical network transmission pseudo-object 30 to the client computer 16, the pseudo-object 30 comprised data values of the objects 34(*a–f*). In addition, the metadata 31 indicating the relationship between the pseudo-objects 34(*a–f*) was also transmitted.

At the client computer 16, the received pseudo-object 32 is assembled to retrieve the data values 34(*a–f*), and the metadata is then used to place these data values 34(*a–f*) into the user interface of the client computer 16, or in the case of creation of new objects, from the client computer 16 to the server computers 12 containing the database tables in databases 20(*a–e*) (of FIG. 2). In this manner, an efficient means of transmitting a number of database elements from a server computer 12 to a client computer 16 and new objects or object updates or object deletions from client computer 16 to server computer 12 is accomplished.

Thus, in the present invention, where the client computer 16 makes a single request and a single pseudo-object 30 with metadata is transmitted over the network 14 with the received pseudo-object 32 thereafter assembled and placed into the user interface of the client computer 16, only two uses of the network 14 are made. This greatly reduces traffic on the network 14 and dramatically reduces CPU processing time requirements on server computer 12. Conversely, when new objects are created, a single object 34 is created on client computer 16, is transmitted over network 14 to server computer 12 where the pseudo-object 30 is created by metadata 31 on server computer 12 to create appropriate new table rows in database tables in databases 20(*a–e*) with only two uses of network 14. Further, the client can assemble the objects into the precise format desired by the user interface object being populated by object data; such as tree or hierarchical format, or block or grid data format. The software to perform the foregoing method is set forth in the software modules entitled: OSFORBStream java, OSFORBStreamObjectjava, and OSFORBStreamExceptionjava which are on the CD-ROM filed herewith.

The preferred embodiment of the present invention is also disclosed in the following Principles of Operation.

PRINCIPLES OF OPERATION

PREFACE

This document provides, for reference purposes, a detailed definition of the OBJECTSERVERFACTORY product (OSF) and the PRO-OBJECTS, support classes, XML, and scripts generated by OSF.

Built exclusively upon open, generally accepted industry standards, OSF has successfully addressed several problems associated with distributing persistent, relational objects built from relational databases over networks. In particular, a generalized and efficient relational to object translation and algorithm and object distribution methodology has proven elusive. It is these processes and algorithms that are unique to OSF; thus a detailed description of this unique technology is therefore an appropriate focus of this preferred embodiment of the present invention..

The result of the above technologies is a set of object-oriented networked remote database access methods that use generally accepted industry standard Internet-centric protocols and software engineering standards to extend persistent objects securely out from relational databases.

OSF-created PRO-OBJECTS permit rich user interfaces to be built that would otherwise would be inefficient, even on the fastest of networks. The net result is an application system with superior aesthetics and performance than would otherwise be possible using current distributed object technology.

Outlined herein is the minimum level of insight required to understand and take maximum advantage of OSF to generate a set of persistent relational objects and to efficiently implement these objects into an application.

Required Background

The reader is assumed to have a working knowledge of relational databases in general and significant development experience with C, C++ or the Java programming language. A basic understanding of object oriented technology and terminology will prove helpful.

Document Organization

The information presented in this document is grouped into the following sections:

The Introduction highlights the major design patterns and the resultant benefits, technical features and structure of OSF. Readers, whom desire an overview can read only this section, then skip to the subsequent detailed sections of further interest.

OSF Software Organization describes the major software component classes within OSF, PRO-OBJECTS and support classes. This section provides the necessary background material for adequate comprehension of the following detailed sections. Included here is the class structure of PRO-OBJECTS.

OSF Expert System Operation outlines how internal OSF definition objects are assembled and organized through the OSF object-oriented graphical computer interface as databases are opened, schemas are scanned, tables are selected or deselected for assembly into objects, objects/attributes names are verified, and class generation options are chosen.

OSF Template-based Software Generation details how OSF template files are organized and the scanning and replacement algorithms are used to generate database-specific persistent-relational objects, support classes and scripts. A complete example demonstrates how the OSFGenerate class builds a PRO-HTML browser component.

OSFORBStreams shows how related attributes and multiple objects can be blocked together to reduce network traffic by two orders of magnitude or more. Object update/locking and object assembly/disassembly algorithms are outlined. The OSF object <-> relational persistence translation model is implicitly defined here.

OSF Support Classes are then discussed. Examples of these support classes include pick list generation, distributed edit/business rules, and real-time performance measurement and analysis. The Registry class is central to runtime system configuration and it is described in this section.

The technical approach to integrate these components is unique and the result is a highly effective expert software system.

INTRODUCTION

OSF addresses many nagging problems associated with making persistent, distributed object components from relational databases and specifically, relational to object translation. The algorithms and processes used for these endeavors are unique in the software engineering community and are the result of a significant research and development investment.

OSF addresses the need to present sets of relational database tables to client applications and applets as proper, true distributed persistent, relational objects (or PRO-OBJECTS for short). PRO-OBJECTS can take the form of RMI server-side objects; CORBA version 2.0-style objects and even objects in dynamically generated HTML streams. This subject area has been a challenging design area since object-oriented programming was first extended over networks via CORBA to object-oriented client applications from centralized object servers using traditional relational databases.

There are many aspects to the problem of how to best produce coherent CORBA-style objects from relational databases: distribution and communication mechanisms, performance, object lifecycle, locking, integration to legacy applications, recovery, scalability, fault-tolerance to name a few. Indeed, the problem is multidimensional. A generalized, pre-packaged and intuitive commercial solution has been nearly impossible to imagine. Until the invention of ObjectServerFactory, that is.

ObjectServerFactory uses several unique algorithms and design patterns to address these and other problems that have to-date precluded a successful turnkey solution. These designs are unique to the ObjectServerFactory product and the resultant PRO-OBJECTS OSF creates for runtime execution. These algorithms and design patters are a significant leap over the current state-of-the-art. A synopsis of these algorithms is enumerated in this section.

Relational to Object Translation with OSFbRBStreams

OSF uses a technique known as Deferred Object Assembly to build true objects from flat relational tables.

The previous version of OSF given to a client in Q2 1998 worked admirably, but server overhead required to read flat tables and build objects was significant, noticeable in fact. This version used the generally accepted and standard methodology used in all distributed object applications today; first read the database tables and assemble the objects in the server or in middleware near the server, then transmit the object(s__ to the client for use in the graphical computer interface.

However, some object requests are simple while others very complex requiring significant amounts of CPU time to join many records from numerous database tables to create blocks of objects needed by client application interfaces such as grids and tree controls. Given potentially powerful PCs on a user's desktop it makes sense to match CPU requirements to the machine that made the request, freeing up the servers for subsequent requests. This is the idea behind distributed computing-distribute the work over all machines in the network.

Since only the final object assembly work is done in a web server or web browser (in the case of an applet), the "thin-client" model is preserved. Further, the raw relational data can be processed one time and assembled into the presentation format desired by the graphical interface component currently in use in the browser. Consider that objects displayed in a tree control require different assembly than in a form or a grid/spreadsheet.

OSFORBStream Definition

OSFORBStream.class is a generalized object used on both the transmitting and receiving object streams, both to the client and to the server.

By sending all attributes that make up an object or by sending a block of objects in one stream, object-oriented network traffic is reduced by at least an order of magnitude when compared to standard CORBA or RMI solutions.

The easiest way to define an OSFORBStream is to provide a functional summary of the four sub-types of OSFORBStreams.

Server side, transmit OSFORBStreams are used to package the raw records read from the flat database tables. Metadata is sent along with the raw table records to identify the base table records, identify the primary and foreign keys and data fields and the relationships between key fields between the table records.

The reason metadata is sent is so client-side objects do not need to have server-side definition files imported into the client-end application. This makes OSFORBStreams dynamic so clients or object requesters can be insulated from changes to the backend database tables. A very useful feature but was complex to implement in practice.

Client/requestor side, receive OSFORBStreams process the server side, transmit OSFORBStreams. The aforementioned metadata is isolated, verified then used to assemble the objects into the form desired by the requestor.

Client/requestor side, transmit OSFORBStreams are used to create, delete and update server-side objects.

Server side, receive OSFORBStreams are used to disassemble the objects back into the corresponding flat database tables so the appropriate object delete, object insertion or object attribute update operations can be performed.

Object Requestor May Not Be A Client Workstation

Note that the client-side is referred to as client/requestor. This is because in many cases the requestor of a persistent, relational object is indeed the client workstation. It is quite common in fact for the requester to not be the end client workstation where the terminal operator or end user resides. Consider:

An HTTP servlet requires a PRO-OBJECT for use in server-side business rules or domain logic. The web browser running on the client workstation can not perform final object assembly since the Java VM is not running (or needed to process the dynamic HTTP stream). Thus the server-side HTTP servlet acts as a requestor and processes the OSFORBStream created by the underlying Persistence class.

Middleware domain logic may request a PRO-OBJECT via CORBA. The final PRO-OBJECTS are then assembled by this middleware requestor and consumed, created, updated or deleted as needed by the domain logic.

Stateless or Stateful Session Enterprise JavaBeans containing pure domain or business logic can and do request PRO-OBJECTS. The Session EJB is the requestor and performs the final object assembly.

Symmetry of the OSFORBStream Object

One symmetrical Java class handles both server and client/requestor streams of types receive and transmit.

Again, this seems intuitive, obvious and simple. Yet anyone familiar with network programming will appreciate the complexity of making a generalized object like OSFORBStreams work in an efficient, robust generalized manner, and still be symmetric for both transmit receive, both client and server.

OSFORBStream Media and Transport Independence

OSFORBStreams were originally designed to transmit blocks of objects via CORBA-2 using the GIOP mapping to TCP/IP (IIOP). Significant network traffic reductions also result using OSFORBStreams over the Pure Java Remote Method Invocation protocol known as RMI.

However, clean design permits use of the OSFORBStream class to transfer objects through raw sockets or even method to method (as in the case of HTTP Servlets). In fact, OSFORBStreams can even be sent over any communications media, such as RS-232/485 serial communications.

All features of OSFORBStreams (client independence, automatic compression and encryption etc) operate effectively on whatever protocol or transport media is used.

Deferred Object Assembly

OSF performs the absolute minimal database I/O to build the object(s)- one read per query request; no more, no less. This is true whether the client end or server middleware requests a single object or a block of objects.

Object Block Reads

This section briefly summarizes how blocks of objects are requested, created, transmitted, assembled and presented to the requestor (1) Requesting An Object Block, Key Field Issues Object blocks are requested by specifying a value for each primary key of-the high-level parent object and the count of objects desired. The top-level parent table is then read, requesting a number of rows equal to the number of objects desired. If multiple tables comprise the object, a "left outer join" with a subselect is generated by the SQL generator and then generated (2) No SQL Strings No SQL strings are used anywhere in OSF or the PRO-OBJECT server support classes. Avoidance of SQL strings and use of proper logical database objects not only reduces maintenance, but results in pure object software which is easy to maintain, extensible, and results in software which is database-vendor independent. That is, the same code runs against any vendor-specific brand of RDB.

(3) OSFORBStreams

After a transmit-type OSFORBStream is instantiated, metadata needed for object assembly is appended to the OSFORBStream. Then result objects from the individual table reads are stringified, appended to the OSFORBStream and transmitted to the client or consumer of the object (as in the case of server middleware).

Note that the OSFORBStream is compressed and encrypted by default before being transmitted to the client.

Also note that OSFORBStreams can be transmitted using any communications protocol or media, such as CORBA, RMI or BSD sockets over IP, serial lines (PPP and RS232/485).or any other media. Thus the name OSFORBStream is a bit of a misnomer because the streams do not have to be sent through an Object Request Broker. (The astute reader will have observed that, even in the CORBA-2 world, CORBA object communications and data transfers typically bypass the ORB for speed and to eliminate a point of failure.)

(4) Object and Attribute Identification

After the OSFORBStream is received, decompressed and decrypted, objects and base table object components are identified through the use of an IDL enumeration. Object IDs and Attribute IDs are generated at application'build time through the use of any vendor's IDL compiler. These object IDs are transmitted with the stringified base table rows in the OSFORBStream so the rows can be identified.

(5) Object Assembly

Metadata is sent at the front of the OSFORBStream so rows can be merged and redundant fields eliminated during object assembly (all foreign keys are by definition redundant and must be removed from the child rows during object assembly). This metadata takes the form of OSF KeyMaps in external string form and are part of the OSFORBStream header. Static helper methods in the OSFORBStream class assist with the construction of these OSFORBStream headers.

At the client end, final object assembly is performed depending on the visual object that is to contain and display the data. A very high-speed assembly algorithm matches related base table records, completing the object assembly process. A java.util.Enumeration interface implemented by OSFORBStream is used to then access the objects or object segments and ultimately attributes in the correct and proper sequence.

Fully Qualified Object Access

Reading a block of objects requires a key value for each primary key in the highest-level parent table, as noted in the discussion above.

To read a single object, a key value is needed for each primary key for each base table that makes up the object.

This is referred to internally in OSF as "fully qualified object access" as opposed to "partially qualified object access" as outlined in the previous section.

The Deferred Object Assembly process, including building of the OSFORBStreams, transmission, and object assembly are the same whether fully or partially qualified object access is used.

Object Disassembly

For object insertions, an OSFORBStream is built in the client that contains the new attributes of the object to be inserted. The OSFORBStream is transmitted to a server where the object is disassembled into its base table components; the underlying RDB table records are then inserted. This is a more traditional approach—the work is done in the server. However, the generalized algorithm which maps the object to the underlying tables is unique to OSF and uses OSFKeyMap objects to disassemble the objects when insertion, object update or object deletion is required.

Compression and Encryption

Because of the inherent network performance efficiencies associated with blocking of n objects into one transmission or network packet through the use of OSFORBStreams, OSFORBStreams are used for the vast majority of client and server communication between PRO-OBJECTS and their backend server-side support classes.

Accordingly OSFORBStreams provide a convenient point to encrypt and compress the object and attribute stream.

By default, the OSFORBStream class compresses and encrypts the stream before transmission and decrypts and decompresses the stream upon receipt.

A short overview of encryption and compression techniques is described.

Encryption Details

The PRO-OBJECTS runtime uses a very fast dual-asymmetric-random-key encryption algorithm developed at the same time OSFORBStreams were designed. The objective was to create an encryption scheme that was highly efficient and suitable for use on corporate Intranets only to keep prying eyes away from the data. When a PRO-OBJECTS based applet loads, a stream of 64 random integers is transmitted to the client.

The OSFORBStream is thus encrypted. The stream is now ready for transmission over CORBA as an IDL-defined OSFORBStream data type or over another transmission media or protocol (because OSFORBStreams are transport, media and protocol independent).

(6) SSL Support

Of course, all of the above is compatible with web servers running in secure mode with SSL. In the case of SSL, if a hacker were to decode an SSL-encoded network packet they would then be faced with an encrypted OSFORBStream. Thus we offer an additional level of security that is well suited for the most sensitive of data.

Compression Details

Standard java.util.zip.Deflater and java.util.zip.Inflater classes are used for decompression and compression. No proprietary or special programming is involved here.

Use of CORBA-Standard IIOP Accessors NOTE: OMG IDL generated by OSF defines all attributes in all persistent relational CORBA objects as read-only. Thus the standard getter remote CORBA accessor methods are available but these do not use OSFORBStreams. This raw IIOP network traffic is not encrypted by default and thus the underlying TCP packets are open for viewing for anyone with a network protocol analyzer. The network packets are also more numerous as well.

OSF Events, Exceptions and Asynchronous Communications

A really brief outline of OSF events and exceptions is contained in this section. Persistent Object Events A custom OSFPersistentObjectEvent class is used to communicate state changes of the object to other components in the applet, server middleware or other component using PRO-OBJECTS. These events are:

```
final static int OBJECTDELETE = 1 + FIRSTEVENT;
final static int OBJECTUPDATE = 2 + FIRSTEVENT;
final static int OBJECTCREATE = 3 + FIRSTEVENT;
final static int MATRIXUPDATE = 4 + FIRSTEVENT;
final static int OBJECTINFORMATION = 5 + FIRSTEVENT;
final static int COMPONENTEXCEPTION = 6 + FIRSTEVENT;
```

The standard JavaBean property change events are also supported for bound properties. Each attribute that composes the object is a proper bound property as well.

The astute reader will note the absence of a read completion event. An OBJECTOBDATE event is posted to notify the component of a read completion.

OSF Exceptions

A comprehensive exception handling scheme handles all server-side exceptions, standardizes and normalizes them then transmits the exceptions via CORBA. When received at the client end or requesting server-side middleware, PersistentobjectEvent.COMPONENTEXCEPTION events are fired to all registered listeners in the PRO-OBJECT with all indicative data about the exception in a format presentable to the end-user.

A minor CORBA-2 limitation is that exceptions may only be thrown over the network when the synchronous, blocking remote accessors are used. Synchronous remote CORBA methods are available for all PRO-OBJECT server implementations, but no exceptions will be thrown over CORBA by default. This is because PRO-OBJECTS by default utilizes the asynchronous IIOP accessors, as identified by the Async suffix on the remote method call. Asynchronous IIOP remote method invocations are most commonly referred to as Distributed Callbacks and are the preferred way to invoke remote method calls via CORBA.

Thus a brief description of how ObjectServerFactory utilizes Distributed Callbacks is in order. A coherent mechanism to transport exceptions was needed which was independent of the type of remote method call used (asynchronous or synchronous). This is described in the next section.

Asynchronous Communications

OSF CORBA-style PRO-OBJECTS utilize by default asynchronous IIOP Distributed Callbacks. Early prototypes used standard synchronous method calls and this was not optimal. This is because the threads that issue the remote method call obviously block until the replies are received. If the thread that issued the remote IIOP method call was the AWT thread (a common occurrence), then the graphical interface would effectively be locked up until a reply was received from the server implementation.

An example will prove enlightening and will simultaneously in detail explain OSF-specific technical architecture.

Here is an excerpt from the IDL BaseObject class from which all OSF-generated PRO-OBJECTS derive:

```
// Enumeration for ORBStreamEvents
//
enum ORBStreamEvent
{
  GETOBJECT,
  GETOBJECTBLOCK,
```

-continued

```
  GETOBJECTBLOCKKEYSONLY,
  NEWOBJECT,
  DELETEOBJECT,
  UPDATEOBJECT,
  USEREVENT
};
<snip>
```

The above event Ids are used in the one-way xoxxObjectAsync method calls (where xxxx is get, delete, insert or new). That is, the event type identifying the method operation is passed as the last argument of each Async method.

Note the forward declaration of ORBStreamReply and locate the actual declaration at the end of the default IDL preamble. Observe the local (or client) reference of ORBStreamReply is a/ways sent as the first argument of an Async IIOP method call. And, as noted above the ORBStreamEventID is the last argument.

```
// base class definition. Note that distributed callbacks are used for
// this interface as optimal performance is required here.
//
// forward reference to ORB Stream callback:
interface ORBStreamReply;
interface BaseObject
{
// basic *stateless* Object I/O
// Persistent <-> Relational Object operations which pertain
//    to the entire PRO-OBJECT
OSFORBStream getObject(in string keylist)
    raises (GeneralException);
oneway void getObjectAsync(in ORBStreamReply returnstream,
    in string keylist, in long /* (ORBStreamEvent) */ event);
OSFORBStream getObjectBlock(in string keylist, in long count)
    raises (GeneralException, MultiDBSynchronisationException);
oneway void getObjectBlockAsync(in ORBStreamReply returnstream,
    in string keylist, in long count, in long /* (ORBStreamEvent) */
    event);
OSFORBStream getObjectBlockKeysOnly(in string startkeylist, in
long count)
    raises (GeneralException, MultiDBSynchronisationException);
oneway void newObjectAsync(in ORBStreamReply returnstream,
    in OSFORBStream orbstream, in long /* (ORBStreamEvent) */
    event);
void newObject(in OSFORBStream orbstream)
    raises (GeneralException, MultiDBSynchronisationException);
oneway void deleteObjectAsync(in ORBStreamReply returnstream,
    in OSFORBStream orbstream, in long /* (ORBstreamEvent) */
    event);
void deleteObject(in OSFORBStream orbstream)
    raises (GeneralException, MultiDBSynchronisationException);
void updateObject(in OSFORBStream orbstream)
    raises (GeneralException, MultiDBSynchronisationException);
oneway void updateObjectAsync(in ORBStreamReply returnstream,
    in OSFORBStream orbstream, in long /* (ORBStreamEvent) */
    event);
void setKeyFields(in string keyfields)
    raises (GeneralException);
boolean pingObject ( )
    raises (GeneralException);
};
// ORB Stream server-> client generalised callback operation
interface ORBStreamReply
{
    // exceptiondetail is null if OSFORBStream and ORBStreamEvent
    is valid
    oneway void returnORBStream(in OSFORBStream stream,
        in long /* ORBStreamEvent */ event, in string exceptiondetail);
};
```

Observe that one common callback object is used to reply to the requestor notwithstanding the type of remote operation (getobject( ), getobjectblock( ), newobjecto( )

updateobject( ) or deleteObject( )). The type of reply is always an OSFORBStream and the event type sent in the initial request is copied to the reply in the in long/* ORB-StreamEvent */event parameter of the ORBStreamReply callback object.

This generalized design pattern is highly efficient as only one client-end or server-middleware requestor callback object is required, and thus only one async IIOP event reply processing Thread is needed.

(7) CORBA 2 and AWT 1.1 Delegated Event Integration

If an exception occurred on the remote operation, details regarding that exception will be placed in the in string exceptiondetail parameter (see IDL example in the previous section). If the remote operation completed normally and the reply OSFORBStream is valid, then exceptiondetail is zero-terminated, that is containing only the 0×00 byte.

Finally, if exceptiondetail is not a zero-terminated string, an OSF PersistentObjectEvent object of type COMPONENTEXCEPTION is instantiated and the event fired to all listening components.

This is how exceptions are thrown over CORBA through asynchronous distributed non-blocking IIOP callbacks and how these events are propagated through the client or middleware requestor to all listeners through the standard lava 1.1 delegated event model. Thus CORBA events are tightly and cleanly integrated to lava events.

OSF is unique in implementing this non-traditional yet highly efficient approach.

OSF Object Servers

Combine intelligent multithreading with the use of OSFORBStreams and Deferred Object Assembly and fully asynchronous operation, and the result are very lightweight and fast object servers. This level of performance and scalability has been heretofore impossible using traditional distributed relational <-> object architectures. ORBStreams and Deferred Object Assembly with a coherent asynchronous event model make CORBA work properly, even over a slow 56K, voice grade, dialup PSTN connection.

Herein is a guiding principle of OSF: generate the code and then get out of the way. There is no TP Monitor requirement or Application Server component used or required by OSF object servers when the HTTP/servlet and CORBA architectures are selected. This reduces cost by eliminating unnecessary software product license fees. Lower server overhead permits a single server to concurrently service more client workstations than would otherwise be possible, reducing server hardware costs significantly. Response time is maximized for all concurrently connected end-user client workstations.

CORBA Server Implementation Activation Mode

All OSF-generated object servers are multithreaded, stateless implementations and are scheduled to run automatically depending on the desired architecture:

Ultra-thin client architecture. Here the web server invokes the appropriate stateless server class as specified in the HTML originally transmitted to the client, servlet.properties and other configuration files Thin client architecture. At _ bind( ) time the orbixdj Object Request Broker examines its Implementation Repository to determine the stateless .class server file to launch. See note below on activation mode.

Enterprise EJB Architecture. The application server invokes the appropriate class server file as defined by the Deployment Descriptor and other configuration files used by a J2EE-compliant EIB application server.

(8) Activation Mode with CORBA

Activation mode is not really a consideration with OSF-generated CORBA-style object servers as OSF CORBA object servers are essentially independent of CORBA activation mode.

Early on in the design of OSF it was decided to put each individual database I/O operation in a separate thread, so that one database request would not block or otherwise affect another request in any way. As a result the Persistence classes are multithreaded and by-design are guaranteed thread-safe. Since all types of object servers use the same persistence classes, all object servers are implicitly multithreaded.

Shared Activation Mode: Shared activation mode can be used when registering a CORBA object server implementation since shared activation mode saves memory and nominalizes ORB overhead. Since all object servers, regardless of architecture, start a thread each time a database has to be accessed, one user will not affect another in the server in shared activation mode. Per-client activation mode can also be used if lots of server resources are available and the absolute best performance is desired for the client workstations/end users. We recommend this option and it is the default used in the script that registers CORBA object servers with the ORB.

Stateless Operation

Persistent relational object data exists in two and only two places: within the RDB (its disks and cache) and in the client. There are no upstream caches or client specific data in the server implementations.

The underlying database(s) is/are queried each time a persistent object method is invoked. This facilitates load balancing and recovery in addition to improving server performance, as there is no client or remote object-specific context data to store and fetch. Also, there are no upstream caches to synchronize when updates, deletes and inserts are made to the underlying database.

In fact, the overhead, time delay and latency of database round-trips with recent releases of any database from any database vendor (such as ORACLE version 8 and 9) is quite nominal if the data is contained in the cache of the database server or member of a database server cluster that handles the data request. Latency of queries of one millesecond or less for recently accessed rows that are known to be available in an ORACLE version 8 or 9 cache are frequently observed. Thus the design decision to implement stateless object servers result in a relatively insignificant amount of incremental overhead in the RDBMS server backend.

(9) Security Implications

Stateless object servers (whether RMI with EJBs or CORBA) improve security significantly. This is because, by definition, there is no client data resident in the server middle tier between client requests. As a result:

1. The probability that client context can be inadvertently assigned to the wrong client is zero. So, for example, one client can not attain the security state and access rights of another.
2. The probability that one client can inadvertently alter that of another in the server is dramatically reduced since client context areas exist only in the servers for only a bit longer than the database round-trips required to satisfy the persistent object request. The memory for server-side client control blocks is freed and reclaimed as soon as the reply is sent to the client or requestor.
3. The possibility that a hacker can spoof a session into an object server and examine the client context blocks is zero since these context blocks are non-existent.

4. The possibility that a hacker can log in as a legitimate client then alter session security attributes to that of another user is again zero since there are no security attributes in the server to alter a session.

Given the improved performance associated with stateless object servers and improved security one gets as well, the design decision was made early-on to write stateless object servers. OSF Object Servers of all varieties are stateless, whether the object servers are HTRP servlets, CORBA implementations or Stateless Session EJBs.

Because there is no security context in object servers, true, nominal security information has to be transmitted along with each client request. However, security context by default is encrypted, the session security token is buried into an OSFORBStream when possible. Further, validation of a sequence number, client IP address, client hostname and timestamp is performed on each received session security token before the username contained therein is used for an access check.

Thus an incremental bit of network overhead is necessary to retransmit the client security context on each request. And an incremental amount of server overhead is necessary to ensure that the client is not being impersonated. In fact, a secure security infrastructure will revalidate a user internally on each request anyway so the net downside is an increment of network overhead, a few dozen bytes tops for each request.

(10) Definition of a Remote Object Reference

Given the understanding of stateless object servers, we can now define an OSF-based remote object reference from the standpoint of the client or requesting middleware object. On OSF remote object is a combination handle and JavaBean state object to a set of persistent, relational server methods which are an object-oriented window to the underlying RDB.

Since the server implementations never contain persistent data, failover and load balancing are facilitated using standard IP and DNS configuration techniques-no additional third party software-is-required, further reducing costs. Since failover is transparent and fast, web server reliability is not as important, thus one can further reduce costs by using generic INTEL hardware.

There are several additional advantages to using stateless object servers and these will be enumerated in subsequent sections where appropriate.

Locking

Traditional "optimistic locking" is used when updating objects with a few additional improvements beyond the prevailing prior state-of-the-art to maximize performance and simultaneously improve data integrity.

When a persistent relational object is to update the corresponding database tables, the PRO-OBJECT component first builds an OSFORBStream of type UPDATE with the ObjectID and the key field(s) required for fully qualified object access.

Then only the attributes that are to be changed in the persistent relational object are added to the OSFORBStream. In addition to the attribute ID and the new attribute value, the old attribute value is added to the OSFORBStream as well. Given that PRO-OBJECTS can take the form of JavaBean components, it makes sense to handle the persistent relational update in the same manner as the update of a JavaBean bound property (in fact, that'is precisely what occurs: the attribute property is changed and then the remote RDB is synchronized, with the old, previous value of the attribute being sent to the server in the OSFORBStream). The OSFORBStream is then transmitted to the server implementation. A remote server exception will restore any changes made to bound properties and fire a PersistentObjectEvent.COMPONENTEXCEPTION to all registered event listeners.

On the server side of the update, the OSFORBStream of type UPDATE is received. Then the key fields are extracted from the OSFORBStream. Using the attribute,. IDs, the new/revised object attributes are mapped to the correct underlying base table and column. A transaction is then started on the current connection object to the database. The underlying base tables of the object are read and the record rows are locked with intent to update via the persistence class.

The current values in the database then are compared between the object just read and the previous values in the OSFORBStream supplied by the client or requesting middleware.

These steps are taken if the attribute value as believed current by the client is not matched to the column value in the database:

A rollback( ) is issued against the current Connection object in the server implementation to roll out any partially completed updates and to free all locks an OSFDBValueUpdateCompareException is thrown over CORBA to the client PRO-OBJECT a COMPONENTEXCEPTION PersistentObjectEvent is thrown in the PRO-OBJECT to all interested and registered event listeners the end user notified that he or she was dealing with stale data If all updates are applied without error a commit( ) is issued on the RDB Connection object in the persistence object and a normal return status is returned via CORBA to the PRO-OBJECT.

Thus we see how updating is fast, efficient and secure in OSF-generated object servers and how the server backend integrates nicely to a client/requestor component model.

This locking scheme is particularly advantageous when the relational databases are being accessed concurrently by other applications.

Database Table Scan/Table Column Value Inversion

OSF performs an inversion of each database table at application build/generation time. That is, each table is read from top to bottom and each value of each column is inspected. This is possibly time-consuming scan is performed primarily for two reasons: picklist generation and data type determination.

Internationalized Resource Bundles, Picklist Generation

Data entry errors are minimized when a Choice or dropdown picklist is presented. If real-word descriptions rather than values are presented in the picklist, the interface is much easier to operate and understand. Internationalize the picklist descriptions and let the end-user select their preferred language and the application system then becomes even more successful. OSF generated UI components and client-end PRO-OBJECTS do just this. Also, ultra-thin clients benefit from OSF-generated HTML <select> pull down menus as OSF builds <option> statements for each pick list candidate element. Refer to the section entitled OSF Template-based Software Generation for an example of an OSF-built picklist. OSF fires a PickListScanThread for each base table during the PRO-OBJECT generation process. Column values are selected as pick list candidates based upon field length and count of unique values. This precludes picklists from being built from inappropriate columns, such as street addresses.

A java.util.ListResourceBundle-derived class is generated for each PRO-OBJECT and foreign language selected at PRO-OBJECT generation/build time. The translation file contains internationalized strings for each attribute descriptor and descriptors for each picklist in each object.

Please refer to the Appendix for an example resource bundle generated from a couple of the ORACLE DEMO starter tables.

(11) Language Translation sed Scripts

Since a given field descriptor or pick list descriptor can and probably will be used in many PRO-OBJECTS, a sed(IV) script is also generated which contains all unique foreign language strings to be translated for a given language. This is the file that is sent to a translator for implementation of a given language. When translation is complete, sed is run using the script as input and a mass exchange is performed to all resource bundle-derived class files at One time.

This is a real time-saver and avoids manual edit of each resource bundle or to download a singular huge translation file into the browser at runtime.

So it is the internationalized descriptors which are loaded into the java. awt.Choice. Thus we see how picklists are tightly coupled to internationalization by design.

OSF-generated PRO-OBJECTS are unique in this regard as it uniquely balances ease of translation and client memory utilization, thus minimizing translator expense and at the same time maximizing the efficiency of the applet or application.

Base Edit Rules

The schema definition of the column is used as the initial internal data type for each attribute in each PRO-OBJECT. However, while the columns are being scanned for picklists, alphanumeric and character datatypes are refined further by inspection of the actual data.

If a column in a database contains only alpha characters (A–Z, a–z), then the base edit rules contained in the PRO-OBJECT will not permit any characters other than alpha characters to be written into the column. Other OSF rules that can be enforced are alphanumeric, alphanumeric with punctuation, numeric, and date.

Note that all edit rules and business logic are implemented and executed in the browser, so data does not have to be sent back and forth to and from the server software simply to be edited. Nor will database constraint exceptions be generated in the backend DB server, database network round trips can be avoided. Further, the error messages built from the OSFRulesObject base class and presented to the terminal operator are far, far more precise and understandable than constraint violation messages built by relational database management servers.

The result is a further reduction in network traffic, far better response time and coherent and precise error messages from the perspective of the end-user.

Class Codefile Generation

The above functionality and more is implemented by a state-of-the-art expert system we call ObjectServerFactory.

OSF has several additional unique features, most significant of which are:

1. Unification of numerous RDBs in a vendor independent manner, creating a unified application view of what was to this point separate "stovepipe" applications
2. Automated object and attribute naming and normalization
3. Language-independent template based class codefile generation (programming language, that is)
4. Serialization of object views of databases to persistent disk files facilitates regeneration and change propagation when code templates change or definitions of databases change Consolidation of Multiple Relational Databases When OSF is started the DBConnect window is opened and presented to the developer. This window identifies the databases and the associated schema tables to be scanned by OSF.

When the RDB connect parameters are entered, a tool bar button entitled "Test Connect" attempts to open a database, build a connection pool and acquire a hotJDBC Connection object from the connection pool.

The developer can concurrently connect to as many databases as desired-there is no technical limit.

(12) Logical Display of Databases

Each database for which a connection has been successfully completed shows up on the subsequent DBSelect window as a tree control node under the root node. Table owners are displayed under each database node in the tree control. Tables by owner are displayed when a table owner node is opened and finally, the columns in a table are expanded when a table is clicked or selected in the DB Select tree control.

In this manner, OSF provides a consolidated view of numerous relational databases for easy selection.

Automated Object and Attribute Naming

OSF uses sophisticated algorithms to convert table names to proper object names and column names to attribute names.

In essence, all of the garbage (numerics, underscores, and other non-alphanumeric characters) is removed from the column and table names. Then, using the /usr/dict/words file from a Solaris 2.6 system, the words within each table and column name are capitalized. Special suffixes, such as 'id" are also capitalized.

Manual Correction of Object and Attribute Names

This process, though good, is not perfect. To permit precise adjustment of OSF's "best guess" of normalized object and attribute names, full editing capability is provided.

Using the OSF Object and Attribute Naming windows of the OSF expert computer graphical interface, the developer can add and delete words to and from the word list. Also each object name and attribute name can be manually corrected if so desired.

Refer to the section entitled "OSF Expert System Operation" for additional details.

Language-independent Template-based Class Codefile Generation

Though written in Java, the code generator can be used to generate class files and thus PRO-OBJECTS in any language, such as C++ or Basic. This is accomplished because no programming language specific functionality whatsoever is hard-coded in the OSFGenerate code generation object. Instead, template files are used with special tags used to identify points in the code where persistent relational object statements need to be inserted.. Replacement is recursive and nested code repeat blocks are supported.

Here is an example from the beginning of the PRO-OBJECT client-end CORBA component template:

```
/**
    * ##ObjectName##Object Java Component
    */
// Generated by ObjectServerFactory (TM)
// Copyright TriCoron Networks, Inc. 1998, Patent(s) Pending
package ##Package##.client;
import java.io.Serializable;
import java.awt.event.ActionListener;
import java.awt.event.ActionEvent;
import java.beans.PropertyChangeSupport;
import java.beans.PropertyChangeListener;
import org.omg.CORBA.ORB;
import IE.Iona.OrbixWeb._CORBA;
import org.omg.CORBA.SystemException;
import com.tricoron.OSFv13.OSFBaseObject;
import com.tricoron.OSFv13.OSFObject;
import com.tricoron.OSFv13.OSFORBStream;
import com.tricoron.OSFv13.OSFORBStreamObject;
import com.tricoron.OSFv12.OSFSyetemManagement;
import ##Package##.servercommon.Registry;
import com.tricoron.OSFv12.GeneralExceptionFormat;
import ##Package##.servercommon.##ObjectName##Package.##ObjectName##AttributeIDs;
import ##Package##.servercommon.ORBStreamEvent;
import ##Package##.servercommon._ORBStreamReplyImplBase;
import ##Package##.servercommon.GeneralException;
import ##Package##.servercommon.MultiDBSynchronisationException;
import ##Package##.servercommon.ORBStreamReply;
import ##Package##.servercommon.##ObjectName##;
import ##Package##.servercommon.ObjectID;
import ##Package##.servercommon.##ObjectName##Helper;
public class ##ObjectName##Object extends OSFObject implements Serializable
{
    // manifest constants
        final int MAXKEYCOUNT = ##MAXKEYCOUNT##;
    final int ATTRIBUTECOUNT = ##ATTRIBUTECOUNT##; // includes all key fields
    // primary object instance attributes
    ##attributeblock##
    public String ##attributeName## = "";
    ##endattributeblock##
    // other instance vars
    public String beanname__ ="";
    public String keylist__ [ ] = new String[MAXKEYCOUNT];
    public String keyliststring__ = "";
    // handy offsets for vectors and matrices or attributes and descriptors
    ##attributeblock##
    public int ##ATTRIBUTENAME##ATTRIBUTEID =
        ##ObjectName##AttributeIDs.__ ##ATTRIBUTENANE##AID;
    ##endattributeblock##
    // transient attributes
    protected static transient int instancecount__ = 0;
    protected transient ORBStreamReply returnstream__ = null;
    // ##ObjectName##-specific transient attributes
    // remote proxy object declaration.
    protected transient ##ObjectName## ##objectname##__ = null;
    // obligatory zero-arg ctor
    public ##ObjectName##Object ( )
        throws GeneralException
    {
        // create unique component instance name
        synchronized (this)
        {
            instancecount__++;
        }
        beanname__ = this.getClass( ).getName( ) + instancecount__;
        String hostname = locateServer( );
        try
        }
            // bind to IIOP proxy object
            ##objectname##__ = ##ObjectName##Helper.bind(
                ":" + "ObjectName##Server", hostname);
            // establish asynchronous callback object
            returnstream__ = new ##ObjectName##LocalImplementation(this);
        }
<snip>
```

OSFGenerate looks for the ##targets## and essentially fills in the targets. The parameters come in off the Generation Options property pages in the OSF graphical interface and from OSF-internal database normalization objects.

(13) Basic Target Insertion Example

When there is a one-to-many relationship between a singular ## target## and n lines of code, the OSFGenerate class is sufficiently intelligent to tidy up the punctuation. Example:

```
final static String[] COLUMNNAMES =
{
  "##COLUMNNAMES##",
};
```

Expands to:

```
final static String[] COLUMNNAMES =
{
  "CUSTOMER_ID",
  "NAME",
  "ADDRESS",
  "CITY",
  "STATE",
  "ZIP_CODE",
  "AREA_CODE",
  "PHONE_NUMBER",
  "SALESPERSON_ID",
  "CREDIT_LIMIT",
  "COMMENTS"
};
```

(14) Repeat Blocks

A powerful feature of the OSFGenerate class is that nested, repeating code blocks are supported.

This permits code to be generated that is a function of the next level of detail down from the current context of the software. For example, in the above OSFobject.skl template it is necessary to declare a JavaBean bound property for each attribute in the persistent relational object. This is defined through the use of three OSF tags:

1. ## attribute block## defines the start a repeat block where the context of the attribute in the current object changes on each iteration. If there are eight attributes in a given object, the attribute block is repeated eight times.
2. ## attributeName## tells OSFGenerate to take the name of the current attribute on this iteration of the repeat block, change the first character of the attribute name to lower case, then insert this attribute name in place of the ##attributeName## target.
3. ## endattributeblock## defines the end of the attribute repeat block Thus, using the DEMO Customer and Sales Order database tables shipped with version 7, 8 and 9 of ORACLE® and the three line repeat block above as an example:

```
##attributeblock##
public String ##attributeName## = "";
##endattributeblock##
```

. . . the CustomerSalesOrder persistent relational object (derived from the CUSTOMER and SALES_ ORDER tables) would expand to the following Java source code:

```
public String customerID = "";
public String name = "";
public String address = "";
public String city = "";
public String state = "";
public String zipCode = "";
public String areaCode = "";
public String phoneNumber = "";
public String salesPersonID = "";
public String creditLimit = "";
public String comments = "";
public String orderID = "";
public String orderDate = "";
public String shipDate = "";
public String total = "";
```

See the appendix for an example list of the special tag targets used by OSFGenerate to create persistent relational objects.

(15)Template Use Summary

Here are a few examples of templates that are read in by OSFGenerate at object-generation time:

| Template file name: | Purpose: |
|---|---|
| OSFtestpersistence.skl | Command line test template for Persistence classes |
| OSFtestserver.skl | Command line test template for Server |
| OSFtestobject.skl | Implementation classes |
| OSFobject.skl | Command line test template for PRO-OBJECT |
| OSFrules.skl | JavaBean classes |
| OSFresourcebundle.skl | PRO-OBJECT JavaBean state class template |
| OSFlanguagesedscript. skl | PRO-OBJECT business and edit rules class template |
| | Foreign language translation file template |
| OSFdbio.skl | Language specific master translation file (sed scripting |
| OSFtestdbio.skl | language) |
| OSFpersistence.skl | Template for low-level DBIO |
| | Command line test program template for low-level |
| OSFserver.skl | DBIO classes |
| OSFregistry.skl | Template for server side object <-> relational translation classes (CORBA) |
| | Template for stateless CORBA server implementation |
| OSFservlet.skl | classes |
| | Template for the application-specific registry class |
| OSFedithtml.skl | containing all parameters for a given set of PRO-OBJECTS and support classes including registry accessor methods and the object map |
| | Template for the Java servlet PRO-OBJECTS used by |
| OSFtablehtml.skl | the ultra-thin browser clients |
| | Basic form used for display and editing of singular |

-continued

| Template file name: | Purpose: |
|---|---|
| OSFinquiryhtml.skl | objects by ultra-thin browser clients. Read in by the servlet PRO-OBJECTS. When the form is completed it is also read in and processed by the servlet PRO- |
| OSFejb.skl | OBJECT classes. Output template used by the servlet PRO-OBJECTS |
| OSFejbobject.skl | when more than more object is to the displayed in tabular format Template used by servlets to generate dynamic HTML to ultrathin browser clients for advanced, mult-object filter inquiries. Template used to dynamically entity Enterprise Java Bean-style PRO-OBJECTS using SQL-free bean-managed persistence. Template used to encapsulate the client-end home and client stubs / state objects of Enterprise Java Bean-style PRO-OBJECTS |

(16) Rapid Software Change Propagation

Think of OSF as a super-fast intelligent software editor. If a one-line change is to be made to all CORBA object server classes, for example, the OSFserver.skl template can be changed in one place and OSFGenerate run in standalone mode from a command line. The change will be propagated via OSF to all server implementation classes in a matter of moments.

Thus, the error-prone process of manually applying the same change and testing to a related group of similar programs is no longer necessary. OSF performs the requisite change(s) rapidly and accurately. Recompilation is expedited since a build script is generated as well to recompile all modified programs.

(17) Faster Relational <-> Object Translation

The overhead of using a generalized programming model to handle different database relations is avoided because a native code object is built to operate on a specific relation. This is what makes ObjectServerFactory unique as an Object-Oriented Software Engineering product.

(18) Language-Independent Code Generation

If C++ servers and Java clients are required, OSF C++ server templates can easily be created from a stable, released, production C++ server source class. Or an example from a vendor or a prototype can be easily converted to a PRO-OBJECT template and prepared for input to ObjectServerFactory.

Thus a full set C++ server side persistent, relational objects can be generated in a very short period of time if the Java skeleton templates we supply are deemed to be somehow less than desirable.

As an example of this language-independent code generation capability of OSF, observe in the Template Use Summary table above, UNIX sedlanguage translation files are generated to apply a single foreign language translation to multiple resource bundle class files..Also, several sets of HTML files are also created from templates as well for use in ultra-thin clients. For EJBs, XML deployment descriptors and are also generated.

Thus we see OSF is not limited just to object-oriented languages such as C++ and Java, but to any language which has to be customized as a function of the contents of a given set of relational databases.

Regeneration via State Serialization

The graphical interface component of OSFGenerate has File/Save and File/Open pulldown menu items and a Save and Open buttons on the toolbar for the window frame. This functionality permits the state of a given run of OSF to be saved and restored using flat files via Java object serialization.

This makes it easy to, say, change one attribute name in a given persistent relational object someplace and be absolutely certain that all of the necessary changes are made in each of the appropriate server or client class modules. The OSF software is far faster, more precise, and thus more efficient than even a team of skilled software engineers. This is why we refer to ObjectServerFactory as an expert system

Summary

It should now be apparent how ObjectServerFactory and the PRO-OBJECTS it creates to effectively and successfully address today's heretofore unsolved problems associated with building coherent, distributed persistent remote objects from relational database tables. Recall these problems involved distribution and communication mechanisms, performance, object lifecycle, locking, integration to legacy applications, recovery, scalability, and fault tolerance.

To summarize, here is how OSF solves these problems.

Distribution and Communication Mechanisms

OSFORBStreams are the key to distributing objects through CORBA, RMI, raw sockets or other communications media. Object elements or attributes are blocked up and multiple objects are subsequently blocked into a singular network packet. Object oriented interfaces and views are preserved on each end of the OSFORBStream.

Use of OSFORBStreams permits data streams to be encrypted and compressed, contributing to further network efficiencies and adding additional security.

All OSF-supported server types (servlet, CORBA implementation and EJB) rely on OSFORBStreams to provide a level of performance efficiency which is at least one and perhaps two orders of magnitude greater than competing solutions. Industry standard interfaces are used, while at the same time, portability, vendor independence and transport independence is maintained to protect the software investment of our customers.

Performance

OSF does not need a TP monitor or an Application Server as it generates native CORBA server implementations or servlets. However, use of an EJB application server is needed for OSF built Enterprise Java Stateless Session bean generated components by definition.

Both synchronous and asynchronous IIOP and RMI methods are supported; asynchronous methods are supported via familiar CORBA distributed callback objects. Stateless server operation improves performance at the beginning and end of each HTTP, IIOP or RMI invocation. Stateless server operation permits far more efficient and dynamic fault tolerance and load balancing.

Object Lifecycle

Object lifecycle issues are irrelevant for OSF-built persistent relational objects by-design. The reasons for this are:

1. OSF object servers do not use any caches upstream from the underlying RDB cache
2. Remote object server implementations are stateless and thus do not need to contain any client data
3. Any data in the client that is modified is first checked for currency on the server side, making sure the terminal operator is working with the most recent data when making changes.

4. An effective publish-and-subscribe model is employed to keep client data current when in changes in the underlying database In the case of Java Beans, the previous value of a bound property has to be supplied to update a bound property. We transmit this old or current value along with the new or revised value in an OSFORBStream of type update when modified object attributes are sent to the server. If the value has changed since it was last fetched from the client, then we know the user is looking at stale data and a DBUpdateValueCompareException is thrown.

Thus object lifecycle issues are moot by design.

Locking

Optimistic locking is employed so as to preclude the possibility of deadlocks by minimizing the time the locks are held.

Note OSFORBStreams of type UPDATE contain only the object attributes changed by the end-user, further easing locking requirements. Complete underlying DB table records are almost never completely rewritten.

Integration to Legacy Applications

PRO-OBJECTS and their support classes were designed to run along side of the existing legacy applications from day one and share the same databases in real time.

The idea was to simplify testing and expedite release planning and migration to production of OSF-based solutions, an arduous process in some large, enterprise environments, which can be painfully bureaucratic.

Thus there are nominal issues associated with legacy applications; the most significant of which is transferring domain or business logic and rules from the legacy application to the new OSF-created solution. If OSF could automate business rule transfer it would be more than an expert system, it would be telepathic.

Recovery

Since the OSF-generated object servers are stateless, a PRO-OBJECT application can lose a connection to one WWW or middle tier server and reconnect to the original server or another in mid-stream with no loss of data or functionality to the user.

In fact, a server can be rebooted when the end-user is but to lunch and the applet will continue running as though web server had been running uninterrupted.

Scalability

Scalability by definition is the characteristic of a distributed client-server architecture that permits additional hardware capacity to be added to efficiently service large additional load increments without change to the application software.

Solutions built using ObjectServerFactory are highly scalable, though each of the architecture options provides scalability in different ways.

Because of stateless object servers, full multithreaded design, no upstream database caches and deferred object assembly, server side overhead is thus nominalized, providing a basis for scalability for each of the OSF application architecture options.

(19) Ultrathin Client Architecture Scalability

To reiterate, this architecture option uses a Java-aware Web Server to schedule Java Servlets for processing of HTTP streams received from client browsers. Multithreaded Servlets read the database(s), perform the requisite relational to object translation, generate a dynamic HTML reply and then transmit the HTTP stream to the client browser.

So let's assume a web server bogs down with combined server and OSF object server overhead. How is capacity added?

The solution is simple. Create another WWW server, install the servlet .class files, register the servlets and configure the servlet.properties and other properties needed by the web server and test.

Then set up the local DNS server to perform round-robin address translation between the two web servers. That is one www.servername.com addresses is mapped to two IP addresses through DNS.

Off-the-shelf functionality shipped with any coherent DNS server can be used to load-balance requests between multiple OSF-generated object server hardware platforms.

Thus, using simple round-robin DNS or a TCP/IP load balancer, one can create a pool of Web Servers with one name, such as www.domainname.com. Browser requests to www.domainname.com are then assigned to all web servers in a pool. If the current pool of web servers become busy, additional web servers can be configured and added to the pool without changes to the OSF-built servlet backend software.

Since no application software changes are needed to add additional capacity, the application software solution is deemed scalable.

(20) Thin Client/CORBA Architecture Scalability

Thin Client architecture uses CORBA-2 object servers to distribute persistent, relational PRO-OBJECTS to clients or server middleware implementing domain or business logic. The Object Request Broker is contacted when a remote object is needed and the ORB via the IDL-generated stub code in the requester or client returns an object reference to the application.

One can configure a pool of Web servers using DNS in an identical manner like the Ultra-thin client architecture. Alternately, with certain CORBA-2 implementations such as OrbixWeb one can use an IIOP proxy to add a layer of object servers between the web servers and database servers (refer to the WonderWall product at http://www.iona.ie).

Thus by moving the CORBA object server implementations off the webservers, a multi-tier distributed architecture can be implemented that has the ability to withstand large, random bursts of arriving traffic and still maintain acceptable response time.

So we see how the CORBA-2 architecture can have an incrementally higher level of scalability than the HTTP Servlet architecture. Again the OSF-built application object server software does not have to be changed to take advantage of this additional capability.

(21) Enterprise/EJB Architecture Scalability

Because an application server is used to house the OSF-built Enterprise Java Beans, there is additional capability provided with these monitors that increase the ability to scale backend servers built using Enterprise Java Bean components.

Consider the WEBLOGIC EJB server from BEA. One can setup clusters of WEBLOGIC servers and add additional object servers, as additional capacity is needed.

The trade-off with this architecture option is that the application servers user more overhead and consume more system resources by their presence. Yet the capability added with a product such as WEBLOGIC (clustering is an example) can provide a higher overall level of throughput and simultaneously better response times if properly configured.

We endorse EJB architecture accordingly as capacity can be easily added without any changes to the business application or OSF-built PRO-OBJECT components.

(22) Scalability Synopsis

Thus, no matter which hardware configuration is chosen the underlying OSF-built application software is unchanged. Any QSF distributed object solution is thus highly scalable; due primarily because of the object servers are stateless. This also permits individual requests within a session to move around from server to server.

Other advantages to stateless object server design will soon become apparent.

Fault Tolerance and Load Balancing

Many applications built today require a user to terminate and restart the application when a network, hardware or software failure occurs. Also users may have to logoff and login/reauthenticate when a network, hardware or software problem occurs. We consider both of these methods of human, end-user recovery to be not at all acceptable.

Each ObjectServerFactory architecture solution offers transparent recovery in the event of network, hardware or server software component failure. In addition, server load can be easily balanced between servers within a given login session. How this capability is enabled through solid design is and intelligent design patterns are outlined in the following sections.

(23) Ultrathin Client Architecture Rule #1 in the distributed component business is to "Never let the users fall asleep in front of their workstations".

Since the OSF-built servlets are stateless, conversations can move from one web server to another during a session without difficulty. For example, a browser session can be started on Web Server A and Web Server A will send a dynamic HTTP reply. The end-user can fill out a form or perform an inquiry and the next inbound HTTP stream can be directed or transmitted to Web Server C transparently.

This is possible because there is no client data or state information on Web Server A needed to process the request sent to Web Server C and process correctly.

Round-robin DNS, though simple and inexpensive, has technical problems. Most significant of which is if one of the Web Servers pack it in, lock up or otherwise crash, a timeout has to occur before the next server in the address list is contacted. These delays can be noticeable and thus significantly adversely affect response time.

Third party front-end redirector hardware and TCP/IP load balancers can be used to maintain constant contact with a pool of WWW servers. Thus traffic is dynamically redirected in the event of failure without perceptible delay by the end-user.

Round-robin DNS also does not take into account the load on a given system when the address is resolved to start a session. Machines are assigned in sequence, almost guaranteeing that certain machines will be running flat-out while others have spare capacity.

The better web server routers and redirectors can take into account the load of a given server before making the redirection assignment.

Further, since the default language is Java, one WWW server can be a SUN SPARC and others INTEL- OSF object server code is totally portable to numerous hardware vendor platforms without recompilation of the server source code. And since this portable object server code is stateless, elements of a session can move from one hardware or operating architecture in the event of failure. Sessions can move and be load-balanced dynamically from hardware platform to another.

Also, numerous third party WWW server allocation products work with PRO-OBJECT backend server support classes without enhancement or modification.

(24) Out-of-Process v. In-Process HTTP Stream Processing

A word on web server architecture and processing is in order.

In-Process vs. Out-of-Process. With the ultra-thin architecture option, the HTTP Servlet server objects must reside on the same physical machine as the web server because the servlets run in-process with the web server, but in their own processing threads. In-process means that the servlets run in the same address space or process as the web server software itself (examples of web servers are the Microsoft Internet Information Server, Apache, the Sun Java Web Server, the Oracle WWW Service, among others).

Running in-process is far, far more efficient than running out-of-process. Perl scripts, for example, run out-of-process to process form browser input. What this means is that, for each HTRP transmission from a browser, the web server must start a new operating system process, transfer the end-user input into the environment of this new process and then start an interpreter to process the environment and build the HTTP reply. This scheme is known as the Common Gateway Interface, or CGI.

With servlets, the web server has to only start a thread and transfer the input stream via the stack. Further, if the servlet class is already loaded, multiple browser requests can concurrently processed in multiple threads. This scheme is usually two orders of magnitude faster than the CGI. In addition, lava interpreters are far more efficient than their perl equivalents and will get faster given the annual ten figure investments in lava technology by most large software'corporations. Further, Java is a pure object language where perl is flat and procedural, making a library of Java servlet classes significantly cheaper to maintain and far easier to reuse and adapt than a collection of perl scripts.

(25) Thin Client and Enterprise Architectures

Fault tolerance and load balancing is similar between thin client/enterprise architectures and the ultra-thin client described in the previous section, with one major exception: an additional tier of processing servers can optionally be deployed behind the web servers for faster processing and increased scalability.

Ultra-thin, thin and enterprise architectures all use web servers. Thus pools of web servers can be used with either round-robin DNS or with redirection/balancing hardware and software.

Thin clients execute Java applets in the web browser or use a web server to maintain Java applications on the client machine (these are referred to as Zero Administration Clients). The Java applications or applets contact an Object Request Broker to obtain an object reference to the server-side object. At this point an architecture decision can be made. One can configure the ORB to start object servers as needed on the web server. Alternately, an IIOP can relay the IIOP object reference request to another machine different from that of the front-end web server. These object servers then connect to the various backend database servers. The effect is to implement a layer of CORBA middleware object servers, thus implementing a three-tier processing architecture (four if one counts the web browser on the client).

Enterprise solutions use HTTP pages and forms, lava applet and applications in combination to communicate with the server-side EJBeans as required by the business system application and end-user requirements. In the simplest of architectures, one can deploy session and entity EJBeans on the same machine as the web server(s). It is more customary to see EJBeans on a tier of systems between the web servers and the database servers. Further, clusters of EJBean application servers can be easily configured, as with the WEBLOGIC EJB server from BEA SYSTEMS. WEBLOGIC uses IP multicast so that one client/requester is in contact with all available servers in the cluster, an intelligent and efficient technique.

In both multi-tier architectures, Enterprise and Ultra-thin/CORBA, stateless persistent, relational object servers built by ObjectServerFactory take advantage of the inherent fault tolerant capabilities with all multi-tier architectures. The technology that takes maximum advantage of the inherent dynamic load balancing capability of these architectures is the stateless design of all OSF-generated and built object servers. Thus an individual client request can be dynamically directed to the optimal web or middleware server available at a given instant in time. This is extremely advantageous as it permits a higher transaction throughput rate given a fixed quantity of backend server hardware.

Summary

We have discussed here that, through the use of unique processes and technical innovation, ObjectServerFactory and its resultant PRO-OBJECTS create a pure Object-Oriented execution environment which is significantly beyond the prior technical state-of-the-art. To summarize, these inventions are:

Template-based, program language-independent and architecture independent software generation 1. Unique and innovative Relational <-> Object translation algorithms
2. Deferred Object Assembly
3. OSFORBStreams dramatically improve network performance and permit Database Inversion to build dynamic Pick Lists and to narrow edit rules
4. Stateless object server implementations The result of the above technologies is a set of object-oriented networked remote database access methods which uses generally accepted industry standard Internet-centric protocols and software engineering standards to extend persistent objects out from relational databases.

OSF-created PRO-OBJECTS permit rich user interfaces to be built that would otherwise would be inefficient, even on the fastest of networks. The net result is an application system with superior aesthetics and performance than would otherwise be possible using commercially available distributed object technologies.

SOFTWARE ORGANIZATION

This section outlines in detail the software organization of ObjectServerFactory and the resultant PRO-OBJECTS built by OSF.

Since OSF is a pure object-oriented application, the internal classes used to build the product will be explained and their relation to other classes defined.

In this manner, anyone familiar with object-oriented programming techniques and the lava programming language will easily understand how OSF is built, facilitating its use and effectiveness while expediting future maintenance and enhancements by providing a foundation for further, more detailed understanding of ObjectServerFactory and PRO-OBJECT technology.

Nomenclature

OSF objects are based upon and extensively use objects provided by the Java programming language. To avoid any confusion, all public OSF objects are all prefixed with "OSF". Example: OSFBaseTable refers to the class which contains all attribute data and methods which massage the data associated with a standardized view of a table in a relational database from which persistent, relational objects are constructed.

When Java classes are referenced, the entire Java package name will be used so that the reader at once knows that this is a lava language class. Example: rather than use the term hashtable, we will refer to a java.util.Hashtable to be absolutely clear.

Internal Class Overview

OSF classes and the resultant PRO-OBJECTS and the classes PRO-OBJECTS use fall into the following categories:

1. Database Normalization Objects OSF supports relational databases from numerous vendors. However, each vendor internally defines the database schema in different internal formats. OSF converts each database into a standard internal format for use by other OSF objects, such as the OSFGenerate code generation class. Each database OSF reads is converted internally into a standard set of Database Normalization Objects unique to OSF.
2. Object-Oriented User Interface: Through the OSF OOUI, the software developer selects the databases from which to build PRO-OBJECTS. Operation of the various windows, tree controls and selection elements of the OSF OOUI by the developer creates and modifies the underlying Data Normalization Objects, thus converting an external database into a standard internal format.
3. OSFGenerate and Template Code Skeletons, OSFGenerate is the class that generates the PRO-OBJECTS and their support classes. OSFGenerate reads in the Data Normalization Objects and the language-independent software template code skeletons to accomplish PRO-OBJECT codefile generation
4. OSFBase Object: PRO-OBJECTS are all derived from a set of base classes, all of which are derived from the OSFBaseObject master base class. Understanding of the organization of the runtime classes that PRO-OBJECTS extend is essential to the complete understanding of the software generated by OSF.
5. OSFORBStream is the helper class used with the underlying communications infrastructure to move persistent relational objects through a network, whether the network is CORBA over TCP/IP, BSD-style sockets or even serial lines. OSFORBStreams are sufficiently complex to deserve a separate discussion section and since they are used to move objects from the client-end PRO-OBJECTS to the backend server support classes, examples of their use are also enumerated.
6. Utility Objects are generic utility classes that are used throughout the aforementioned categories. Two examples of these utility classes are OSFSystemManagement and OSFDateTime.

Database Normalization Objects

OSF is designed to support relational, SQL-based databases from numerous database vendors.

Naturally, each vendor internally defines database schemas in different internal formats (database schemas are the internal and proprietary structures used by the RDB itself to define business-specific and application database tables, relationships, constraints, stored procedures, security/access control and other functionality of the particular vendor's implementation of an SQL database).

OSF converts each database into a standard internal format for use by subsequent OSF software components. To do so, OSF scans the tables which make up the database schema and then builds and modifies a set of OSF-specific Database Normalization Objects.

Once all databases from multiple vendors are converted to OSF Database Normalization Objects, a unified view that appears as one database is produced.

Figure 4:
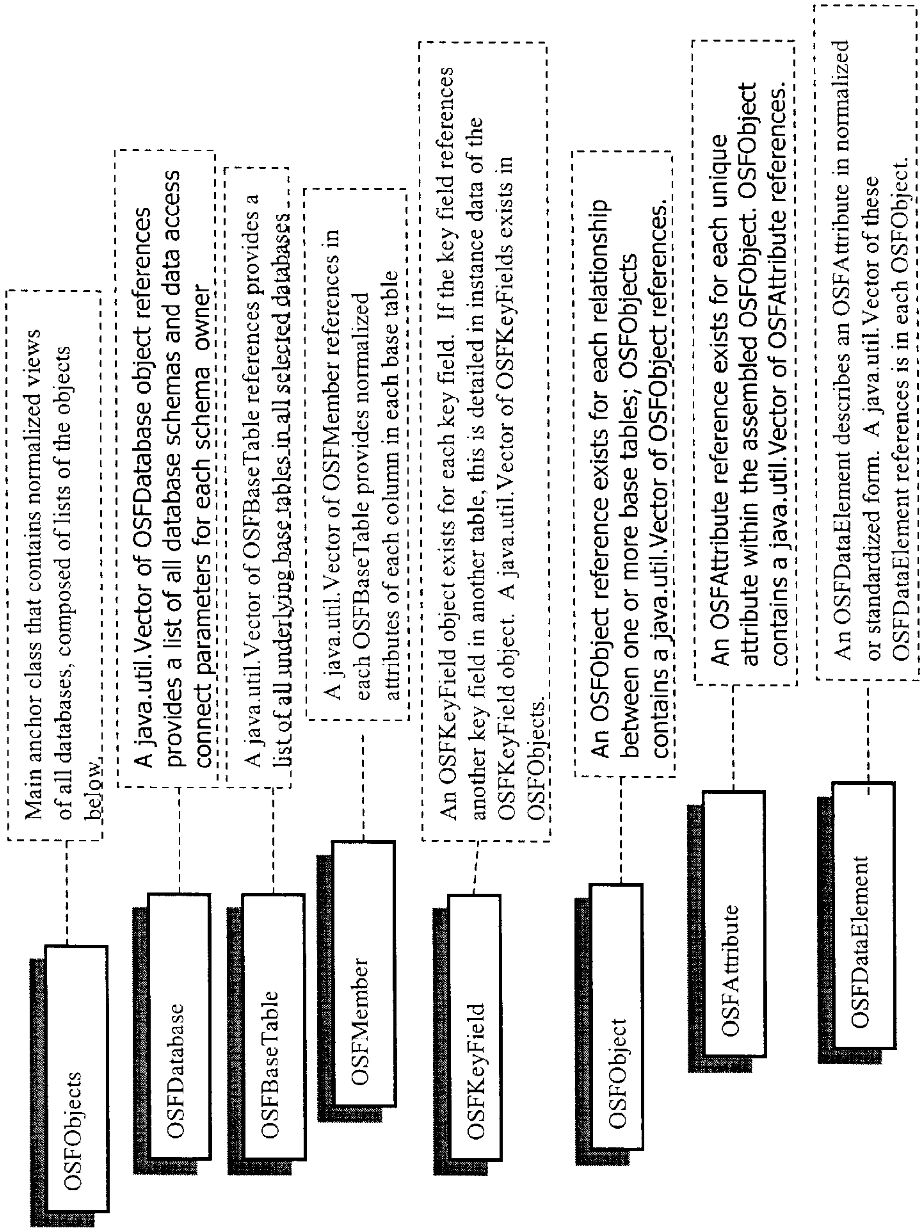
FIG. 4 is a chart showing Normalization Object Topology.

It is these normalization objects that are described in this section.Refer to FIG. 4. in the drawings for a class hierarchy diagram of the Normalization Object Topology.

Refer to the source code on the CD-ROM filed herewith for further details regarding the processing logic in these database normalization classes.

Object-Oriented User Interface

Through ObjectServerFactory's OOUI, the software developer connects to the database schemas from which to build PRO-OBJECTS. Objects and Attributes are named appropriately for use in the generated software components through the use of expert object and attribute naming algorithms. Generation options present various alternatives for both code generation and various runtime options.

Through the operation of these various windows, tree controls and selection elements of the OSF OOUI, the developer creates and modifies the underlying Data Normalization Objects enumerated in the previous section, thus converting external databases into a standard internal format.

Refer to the section OSF Expert System Operation for a list of configuration options and screen snaps of the OSF OOUI.

The entry point to OSF's OOUI is OSFMain.class.

(26) Class Details of OSFMain

Data Normalization Objects are instantiated by the various classes contained in OSFMain. These classes are as follows:

| Major classes making up the OSF OOUI | |
|---|---|
| ClientsTab.class | GenRuntimeTab.class |
| ClientsTabPanel1.class | GenRuntimeTabPanel1.class |
| ColumnNames.class | GenServersTab.class |
| DataAccessPassword.class | GenServersTabPanel1.class |
| DatabasesTab.class | JournalsTab.class |
| DatabaseaTabPanel1.class | JournalsTabPanel1.class |
| DBAdvancedConnectTab.class | MessageBox.class |
| DBAdvancedConnectTabPanel1.class | ModalQuestionBox.class |
| DBConnect.class | ObjectsTab.class |
| DBConnectPanel1.class | ObjectsTabPanel1.class |
| DBDriverTab.class | PerformanceTab.class |
| DBDriverTabPanel1.class | PerformanceTabPanel1.class |
| DBIconAndTextContent.class | SecurityTab.class |
| DBLoginTab.class | SecurityTabPanel1.class |
| DBLoginTabPanel1.class | ServersTab.class |
| DBSelect.class | ServersTabPanel1.class |
| DBSingleSelectedManager.class | SystemManagement.class |

-continued

| Major classes making up the OSF OOUI | |
|---|---|
| EmptySecurityManager.class | SystemManagementPanel1.class |
| GenClientsTab.class | TableNames.class |
| GenClientsTabPanel1.class | TreeControlEntry.class |
| GenerationOptions.class | WordListLoadThread.class |
| GenerationOptionsPanel1.class | |
| GenIDLTab.class | |
| GenIDLTabPanel1.class | |

Please refer to the CD-ROM filed herewith for a detailed source code in the appendices which outlines detailed processing specifics.

OSFGenerate and Template Code Skeletons

OSFGenerate is the class that reads in the Data Normalization Objects and the language-independent software template code skeletons to generate the PRO-OBJECTS and their support classes.

In addition to client-end and server-side persistent, relational object classes, OSF generates:

- OMG Interface Definition Language which exposes remote server methods to PRO-OBJECT based clients
- Build scripts for all generated code, including invocation of the IDL compiler and compiling IDL output
- A server registration script to register the CORBA server implementations with the Object Request Broker
- Master sedlanguage translation scripts to propagate translations to the various java.util.ListResourceBundle-derived objects
- HTML template files for data entry, inquiry and tabular display
- A Registry.java file containing all runtime parameters for a given installation, along with accessor classes and the object map
- Test programs for standalone testing of PRO-OBJECT component
- Other assorted utility and convenience scripts including a buildall script which builds everything in the proper sequence, interleaving builds into separate processes when possible (27)Standard IDL Interfaces, Synchronous and Asynchronous All CORBA distributed objects are derived from the BaseObject base IDL class, as outlined below. Note that this base class contains persistent relational distributed object accessors for reading objects, block object reads, object insertion, object update and object delete. Versions of these remote methods are supplied to the client PRO-OBJECT for both synchronous/blocking and asynchronous CORBA-based remote methods using familiar CORBA distributed callbacks. Asynchronous one-way persistent relational object methods use the ORBStreamReply callback object for all asynchronous remote object requests.

```
// NOTE: OSF object servers are stateless. . .
interface ORBStreamReply;
interface BaseObject
{
Core Persistent Object read operations:
    /// basic Object I/O \\\
```

-continued

```
    // operations which pertain to the entire object
    OSFORBStream getObject(in string keylist)
        raises (GeneralException);
    oneway void getObjectAsync(in ORBStreamReply returnstream,
        in string keylist, in long /* (ORBStreamEvent) */ event);
    OSFORBStream getObjectBlock(in string keylist, in long count)
        raises(GeneralException, MultiDBSynchronisationException);
    oneway void getObjectBlockAsync(in ORBStreamReply
    returnstream,
        in string keylist, in long count, in long /* (ORBStreamEvent) */
        event);
Core Persistent Object creation operations:
    oneway void newObjectAsync(in ORBStreamReply returnstream,
        in OSFORBStream orbstream, in long /* (ORBStreamEvent) */
        event);
    void newObject(in OSFORBStream orbstream)
        raises (GeneralException, MultiDBSynchronisationException);
Core Persistent Object removal operations:
    oneway void deleteObjectAsync(in ORBStreamReply returnstream,
        in OSFORBStream orbstream, in long /* (ORBStreamEvent) */
        event);
    void deleteObject(in OSFORBStream orbstream)
        raises (GeneralException, MultiDBSynchronisationException);
Core Persistent Object modification operations:
    void updateObject(in OSFORBStream orbstream)
        raises(GeneralException, MultiDBSynchronisationException);
    oneway void updateObjectAsync(in ORBStreamReply returnstream,
        in OSFORBStream orbstream, in long /* (ORBStreamEvent) */
        event);
Core Persistent Object support methods:
    void setKeyFields(in string keyfields)
        raises (GeneralException);
    boolean pingObject( )
        raises (GeneralException);
};
// ORB Stream server-> client generalised callback operation
interface ORBStreamReply
{
    // exceptiondetail is null if OSFORBStream and ORBStreamEvent
    is valid
    oneway void returnORBStream(in OSFORBStream stream,
        in long /* ORBStreamEvent */ event, in string exceptiondetail);
};
```

OSFORBStream client—server intercommunication is performed in this manner.

(28) PRO-OBJECT—Server Initialization Synchronization

The pingObject( ) remote server method defined in the IDL excerpt above is used to synchronize initialization of the server by the PRO-OBJECT client component. This is because the _ bind( ) method to acquire a remote object reference has stopped blocking client code execution during server implementation in CORBA implementations. As a result, server methods could be invoked before the server implementation constructors completed. Thus methods which relied upon object references set by a constructor threw java.lang.NullPointerExceptions until the constructors completed.

After a _ bind( ) is issued in the client-end PRO-OBJECT, the pingObject( ) server method is invoked every 250 ms. When the server's constructor has completed, pingObject( ) returns true PRO-OBJECT initialization can then carry on and the PRO-OBJECT can then safely invoke server methods.

(29) IDL-Defined OSF OSFORBStream Events

In the above IDL excerpt, the astute reader will notice that, for efficiency purposes, one generalized asynchronous callback object is used for all server replies to the client based PRO-OBJECT.

To differentiate the replies in the PRO-OBJECT, an IDL-defined event is passed along with the reference to the asynchronous callback object. Thus, when the client reply method is invoked from the server/backend utility code, the event type is passed so the requesting PRO-OBJECT can match the reply to the outstanding request element.

These IDL-Defined OSF OSFORBStream events are defined as follows

```
// enumeration for ORBStreamEvents
//
enum ORBStreamEvent
{
    GETOBJECT,
    GETOBJECTBLOCK,
    GETOBJECTBLOCKKEYSONLY,
    NEWOBJECT,
    DELETEOBJECT,
    UPDATEOBJECT,
    USEREVENT
};
```

(30) File References

For further details, please refer to the prefix.idlfile which OSFGenerate writes out ahead of any data object-specific IDL generated as a result of developer interaction with OSF's OOUI.

Template files read in by OSFGenerate all end with the .sklsuffix. Also please refer to the Appendix section PRO-Object Template Targets for details about what target results in what context insertion is performed by OSFGenerate.

OSF Runtime Object Model

PRO-OBJECTS are derived from a set base classes, all of which are derived from the OSFBaseObject master base class. (The one exception to this precise hierarchy is that OSFServletObject extends javax.servlet.http.HttpServlet rather than OSFBaseObject).

Knowledge of the organization of the runtime classes from which PRO-OBJECTS is built is essential to the complete understanding of the code written by OSF.

Figure 5:
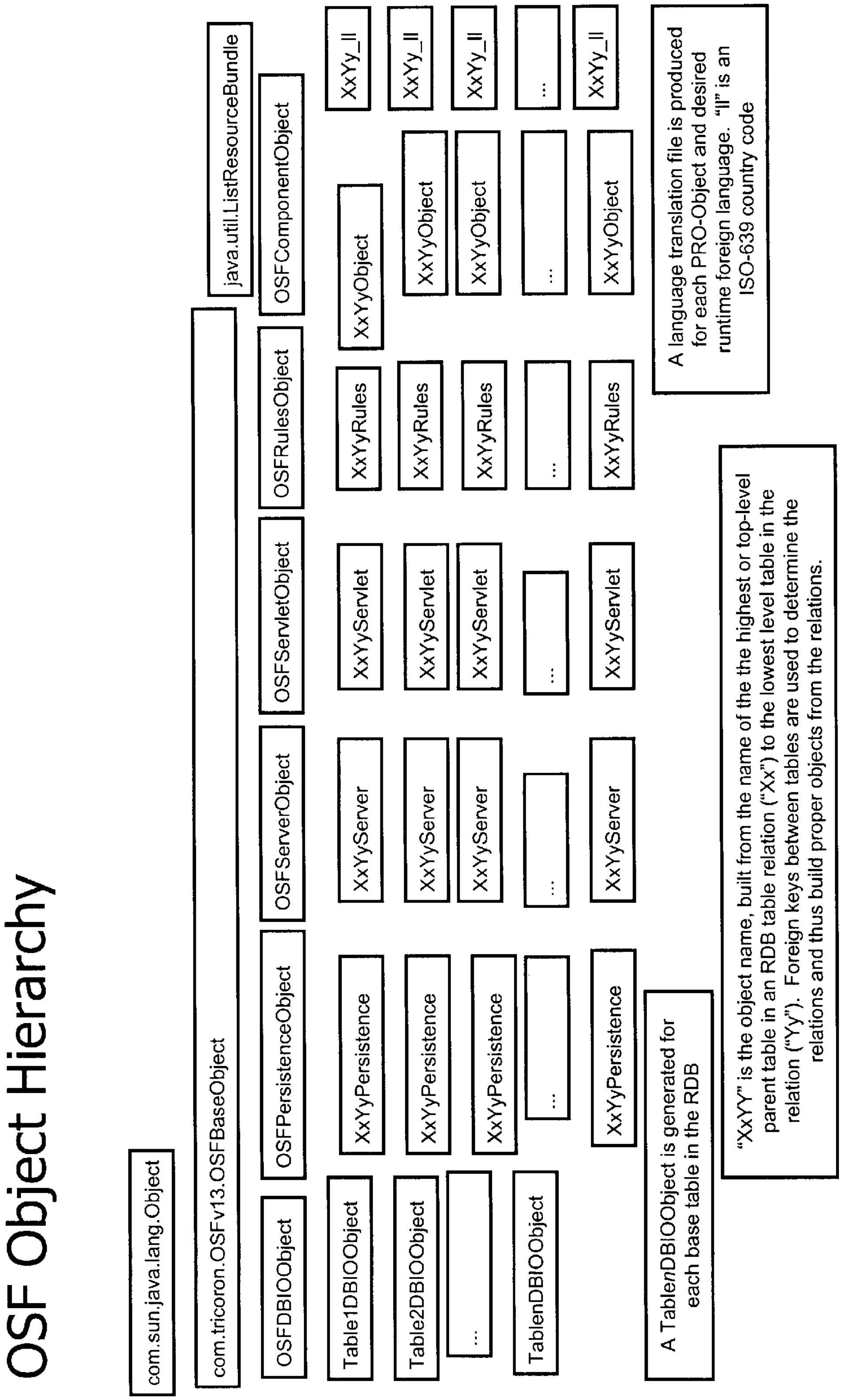
FIG. 5 is a chart showing OSF Object Hierarchy.

Refer to FIG. 5. in the drawings for a pictorial representation of the OSF object hierarchy Each base class will now be described in further detail as understanding of these core, base classes are essential to the understanding of ObjectServerFactory and the PRO-OBJECTS it creates.

(31) Programming Standards

As we embark into examination of the base classes from which all PRO-OBJECTS and backend server support classes derive, the astute reader will notice that all code in the ObjectServerFactory product and the resultant generated objects reflect a strict set of programming and development standards.

In a product of this scale and complexity, we have found that the incremental time needed to initially use and enforce tight development standards pays off dramatically in faster debugging and easier longer term maintenance. Our software reads like a book, that is the idea.

(32) OSFBaseObject

This is the base class from which all client/requestor PRO-OBJECTS and server-side base classes extend. With the exception of servlets, nearly all OSF-created persistent, relational objects and support classes inherit from OSFBaseObject.

The criteria used to add a static instance var, manifest constant or method to OSFBaseObject is that the instance var, constant or method is to be used in both clients/requestors of PRO-OBJECTS and server-side support objects.

Here is a detailed annotated description of OSFBaseObject.java. Note that the documentation for the class is where it belongs: in the source code. Note that Javadoc comments are not used, as it is our opinion that these comment blocks clutter up the code. A singular, one-line Javadoc style comment is used for each method because IDEs pick up this text in their interactive completion and prompting schemes. See Program called OSFBaseObject.java which is on the CD-ROM'filed herewith.

(33)OSFDBIOObject

OSFDBIOObject is the base class from which all OSF-created XxxxDBIOObjects are derived.

OSF builds a XxxxDBIOObject for each table in the database selected by the PRO-OBJECT designer or developer through the OSF OOUI.

OSFDBIOObject contains the constants used by all DBIOObjects and also contains utility methods which do not have anything to do with a given OSF-generated XxxxDBIOObject created from a normalized OSF-internal database schema, thus these methods belong in the base class, not the derived classes.

This criteria of placement of constants, common methods and common instance data into the appropriate base class is used consistently throughout all OSF base objects. See Program called OSFDBIOObject.java which is on the CD-ROM filed herewith.

(34)OSFPersistenceObject

All OSF-built persistence classes inherit from OSFPersistenceObject. A persistence class is built for each foreign key chain that is found in all of the relational database schemas scanned by ObjectServerFactory.

The persistence object for a given PRO-OBJECT is responsible instantiating the correct DBIO objects needed to build the persistent relational object. If a given PRO-OBJECT requires three database tables to make up the object, then a given Persistence class will have references to three DBIO objects.

The Persistence class is also responsible for performing the low-level database IO to the underlying base table(s) which make up a given PRO-OBJECT by invoking the proper methods in the table-specific DBIO object in the proper sequence.

Persistence objects are instantiated as necessary by the appropriate server-side class depending on the desired OSF architecture, as follows:

Ultrathin Client Architecture. The Persistence object is instantiated by the doPost( ) method override in the servlet thread for each HTTP request.

Thin Client Architecture. The Persistence object is instantiated by the CORBA server implementation. A thread is started for each IIOP persistent object request and the Persistence object is instantiated by the thread code. This way, waiting for a database network round-trip to complete will not block any other server threads hence no client will affect another or cause another to wait.

Enterprise Architecture. The Persistence object is instantiated by the entity Enterprise lava Bean for a given PRO-OBJECT server component.

Figure 6:
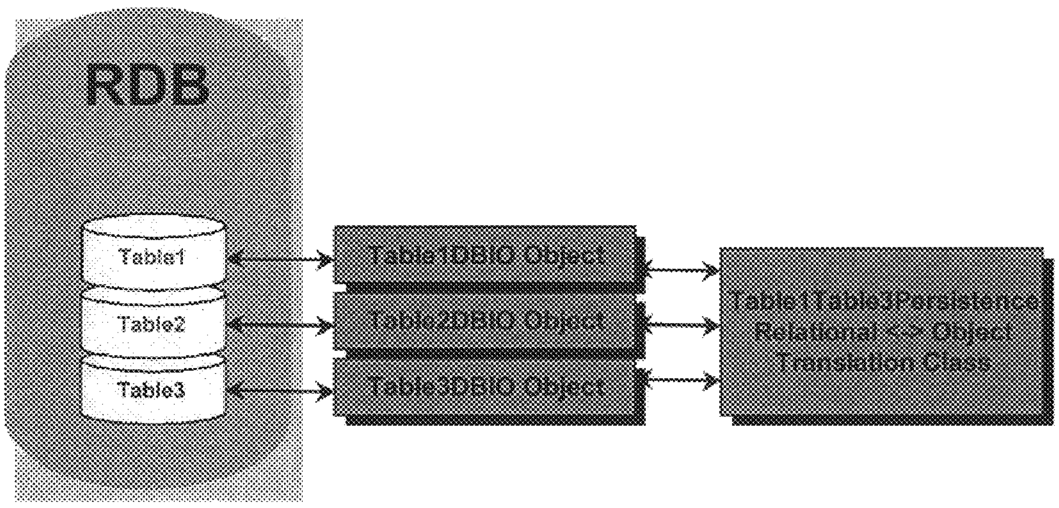
FIG. 6 is a model of Basic OSF Persistence.

Consider the diagram in the Drawings section, FIG. 6 entitled Basic OSF Persistence Model.

Assume three tables are related by foreign key constraints and the table names are named Table 1, Table2 and Table3. OSF will create three low-level dbio objects derived from OSFDBIOObject: Table1DBIO, Table2DBIO and Table3DBIO.

OSF also builds persistence classes. In this abbreviated example with three related database tables, we will get six (6) persistent, relational objects:

1. Table1Persistence, encapsulating objects from Table1
2. Table2Persistence, encapsulating objects from Table2
3. Table3Persistence, encapsulating objects from Table3
4. Table1Table2Persistence, encapsulating objects from Table1 and Table2
5. Table2Table3Persistence, encapsulating objects from Table2 and Table3
6. Table1Table3Persistence, encapsulating objects from Table1, Table2 and Table3

Thus, referring to the above diagram, the top-level parent table in the foreign key chain is Table1 and the lowest level child level table is named Table3, the name of the PRO-OBJECT will be Table1Table3 and the persistence class for Table1Table3 will be named Table1Table3Persistence.java which extends OSFPersistenceObject.java.

When instantiated, Table1Table3Persistence will then create an instance of Table1DBIO, Table2DBIO and Table3DBIO. Table1Table3Persistence will then be ready to process the persistent object readObject( ), readObjectBlock( ), insertObject( ), updateobject( ) or deleteobject( ) request as so directed by the instantiating servlet, server implementation or EJBean component object.

(a) Advantages of the OSF Persistence Model

Not that the significant advantages of this persistence model are:

1. Relational to Object and Object to Relational translation is independent from the network transport and runtime server environment or architecture
2. Persistence objects are inherently thread-safe by design
3. Blocking occurs only in one processing thread as a persistence processing thread is'started for each client request. Thus one client or object requester will not affect another.
4. When the thread containing the persistence object terminates, all data associated with the persistence object is immediately and explicitly garbage collected, satisfying numerous security audit requirements (because no client context data and security access parameters are left lurking about on the servers).

(b) Details of the OSFPersistenceObject Class

The OSFPersistenceObject base class contains the constants used by all XxxxYyyyPersistenceObjects. OSFPersistence Object also contains utility methods that do not have anything to do with a specific XxxxYyyyPersistenceObject created from a normalized OSF-internal database schema (where Xxxx is the top-level parent table in a foreign key relation and Yyyy is the lowest level child table).

OSFPersistenceObject extends OSFBaseObject. See Program called OSFPersistenceObject.java which is on the CD-ROM filed herewith.

(35) OSFServerObject

OSFServerObject is the base class from which all CORBA server implementations are derived.

There is not much here since virtually all of an OSF-generated CORBA persistent, relational object server is data-specific or architecture/protocol-specific. Thus not much of each derived server object can be moved up to a higher-level server base class. Refer to any XxxxYyyyServer.java class for details.

```
/* base class from which all OSF Server/Implementation classes
are derived */
package com.tricoron.OSFv13;
import com.tricoron.OSFv12.OSFSystemManagement;
import com.tricoron.OSFv13.OSFBaseObject;
public class OSFServerObject extends OSFBaseObject
{
    public final static String SHAREDREADCONNECTION =
    "single read connection";
    public final static String UNSHAREDREADCONNECTIONS =
    "multiple read connections";
    public static int deactivationinterval__ = 0;
    public final static int NODEACTIVATION = 0;
    public static boolean usingsharedreadconnection__ = false;
    public static OSFSystemManagement sysman__ = null;
}
```

(36) OSFServletObject

In contract to the rather thin OSFServerObject class, OSFServletObject has a lot to it. This is because we decided to not use a pre-built package of HTML page classes to build dynamic HTML streams (fact is we looked at a few and did not find one which satisfied our requirements). So we rolled our own. We are glad we did since the performance and flexibility we achieved was more than we expected.

(a) PRO-HTML Frame Mapping

Before examination of the OSFServletObject base class, a word is in order to show how input and output is mapped within a frameset in an OSF-generated dynamic HTML environment by the derived servlet class. The relationship of the derived servlet and OSFControlServlet is fundamental to this discussion.

Figure 7:
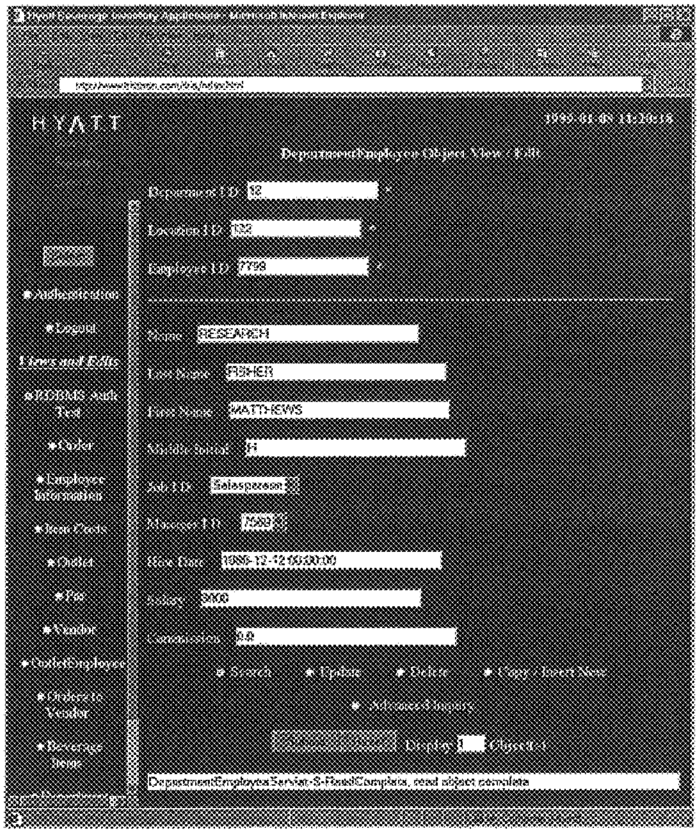
FIG. 7 is a screen shot of an example of a Generated HTML Page.

Consider the example HTML page in FIG. 7.

Note the three areas of the default HTML frame mapping built by OSF: banner (top-left), navigation (left of the scroll) and main (right). Input on the left (specifically, a click on the Select button) is directed to the OSFControlServlet that examines the selection and creates a stream of dynamic HTML for the desired persistent, relational object required for the page to be painted in the main area of the frame.

The generated HTTP stream destined for the main area of the frame contains a URL of the servlet to be invoked by the web server when either the Submit or Reset buttons are clicked.

This design is simple, efficient and effective.

Figure 8:
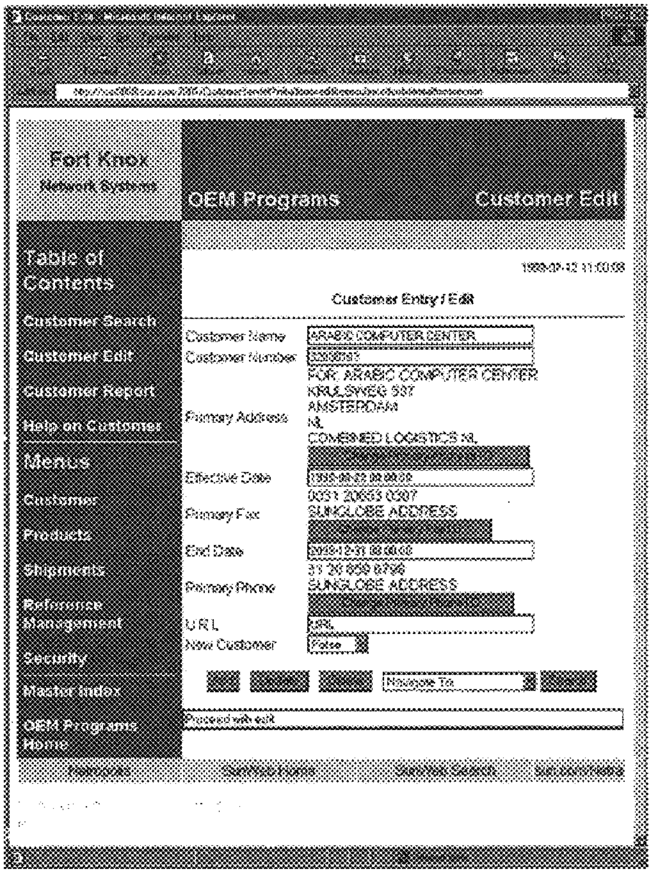
FIG. 8 is a screen shot of an example of a Non-Frames Generated HTML Page.

Refer to the Drawings section, FIG. 8 entitled Non-Frames Generated HTML Example for a real-world example of a generated HTML page.

The page in FIG. 8 is much more streamlined in appearance and functionality. In the previous example in FIG. 7, the three frame areas are separate html pages while here, everything is encapsulated within tables and data for the main section is dynamically generated by the generated servlet.

(b) Standardized Messages

The astute reader by now as undoubtedly noticed by now there is a coherent consistent messaging scheme used throughout ObjectServerFactory itself, PRO-OBJECTS and server-side support classes.

This scheme was originally needed so we could easily internationalize client-end messages and it made so much sense we went back and applied the same messaging standards to the server side code and OSF core logic.

All OSF messages are in the form Classname-L-MessageID, Text, additional info where:

Classname is the name acquired from a getClass( ).getName( ) which is nice because this returns the entire package. And since we bake our release numbers into the package ids, we know at once the exact module from which the message originated -L- is the severity level of the message, as follows:

1. W is a warning
2. I is information
3. E is an error, usually a user error
4. F is a failure, usually in software logic
5. S is success MessageID is a unique message identification string unique to the class file Text is a language-specific resource bundle translated message (if on the client end) which amplifies the MessageID (note all server-side messages are in English only)

Additional info is just that, qualification of the message for example if a file is missing the additional info would be something like "f-filename.dat" so that the reader of the message knows precisely what has occurred.

Please refer to the Appendix, section "Standardized Message Example" for what this scheme looks like in practice.

(c) Details of OSFServletObject

Note OSFServletObject does not extend OSFBaseObject; rather it extends SUN's javax.servlet.http.HttpServlet class from the Java Servlet Development Kit.

Further note that the implementation of OSF-built servlets is totally standard and portable and can run on any Java-aware web server or in any J2EE-standard container.

See Program called OSFServlet.java which is on the CD-ROM filed herewith

(37) OSFRuIesObject

OSFRulesObject is the base class from which all client-end rules and server-side rules classes are derived.

(a) Pre-Built OSF Rules

ObjectServerFactory builds a set of default attribute edit rules based upon:

The data type, scale and precision in the database schema for a given underlying column which a persistent, relational object is mapped (precision and scale refers to the overall width and decimal places in a column, for example, NUMBER(9,2))

An inversion or scan of the table column. What this means is that when ObjectServerFactory scans each table during object build time, the validation type for a given column or field can be narrowed from that contained in the database schema. For example, a column may be defined as VARCHAR2, so the initial validation type of the attribute will be alpha numeric with punctuation. When the OSFPickUstBuildThread scans the table each column value is examined. If no punctuation is found, then the validation type is narrowed to alpha-numeric. If no punctuation or numeric characters are found, the validation type is narrowed further to alpha only.

This is best shown by examination of the registry entries for a given underlying table field. Here is a NUMBER field:

```
// stow parameters for TABLE$CUSTOMER/CREDIT_LIMIT edit rules
table.put(TABLE$CUSTOMER$CREDIT_LIMIT$MIN,
"-9999999.99");
table.put(TABLE$CUSTOMER$CREDIT_LIMIT$MAX, "9999999.99");
table.put(TABLE$CUSTOMER$CREDIT_LIMIT$VALIDATIONTYPE,
    new
    Integer(OSFRulesObject.NUMERICVALIDATION).toString( ));
```

And here is an alpha (CHAR / VARCHAR) field:

```
// stow parameters for TABLE$CUSTOMER/NAME edit rules
table.put(TABLE$CUSTOMER$NAME$MIN, "A");
table.put(TABLE$CUSTOMER$NAME$MAX,
    "zzzzzzzzzzzzzzzzzzzzzzzzzzzzzzzzzzzzzzzzzzzzz");
table.put(TABLE$CUSTOMER$NAME$VALIDATIONTYPE,
    new Integer (OSFRulesObject.ALPHAVALIDATION).toString( ));
table.put(TABLE$CUSTOMER$NAME$MAXLENGTH, "45");
// stow picklist candidate values
table.put (TABLE$CUSTOMER$NAME$VALUEKEYLIST, " ");
```

The effect of all of this is:

Editing is performed as close to the end-user in familiar multi-tier architectures as is possible, resulting in significantly improved data entry efficiencies and reduced server load.

For client-end OSFRulesObject derived rules classes, a coherent set of edits can be performed in the browser or client computer application without having to send the data to the server over the network to be edited.

For server side OSFRulesObject derived server rules classes,.a coherent set of edits can be performed in the server, servlet or stateless session EJB object without having to send the data to the database management software, only to have a constraint violation generated or other error thrown by the RDBMS.

Error messages built from the Rules classes are much clearer and concise than those generated by RDBMS software Protect blocks are created for domain-specific relational edits at the attribute and object level, facilitating custom business rules that are also easily extensible.

It is the OSFRulesObject class that forms the basis for these features.

(b) Details of OSFRuIesObject

OSFRulesObject extends OSFBaseObject and is used to derive client side rules object classes and server rules objects. See Program called OSFRulesObject.java which is on the CD-ROM filed herewith.

(38) OSFComponentObject

OSFComponentObject is the class from which all Java component objects used in RMI and CORBA thin clients are derived. Note that Java component object'in this context means a JavaBean state object corresponding to the stateless CORBA server implementation.

It is suggested that at this point the reader is familiar with Java Beans, the Java component model, the 1.1 AWT delegated event model and use of Java Components in bean-aware Integrated Development Environments.

In a nutshell, OSFComponentObject contains:

common bound properties for all derived component objects accessor methods for common bound properties utilities to handle loading of the language-specific resource bundle for the component object event management for the synchronization of bound properties to other java component object beans which are consuming the persistent, relational objects accessed by the derived class exception handling including the creation of a java.awt-.Frame derived class to display a message box containing an exception or information message to the end-user.

the class which permits each IIOP request to be processed in a separate client thread.

See Program called OSFComponentObject.java which is on the CD-ROM filed herewith.

Utility Objects

Generic utility classes are used throughout the aforementioned categories. Two examples of this are OSFSystem-Management and OSFDateTime.

EXPERT SYSTEM OPERATION

This section outlines how internal OSF definition objects are assembled and organized through the OSF object-oriented interface as databases are opened, tables are selected for assembly into objects, objects/attributes are named and class generation options are chosen.

Relevant excerpts from the OSF object oriented user interface are used to demonstrate how a system designer converts relational database tables to persistent, distributed objects using OSF.

Summary

OSF does all of the difficult work and makes all difficult decisions required to produce persistent, relational distributed objects from n relational databases. However, a bit of setup is required by the system designer to ensure OSF creates the PRO-OBJECTS correctly.

The system designer is responsible to:

1. Connect to each relational database that is to supply raw, relational data to the new distributed object system.
2. Select the base tables from which to build distributed objects.
3. Ensure the object names and attribute names created by OSF are correct and reasonable for the target language (Java, C++).
4. Alter software build and generation as appropriate for the requirements of the current project.

OSF expert processing logic does the rest.

Connect to the Relational Databases

After authentication with the OSF master server, the system designer must connect to each of the relational databases of interest. For each database, the following is required for each relational database.

A User ID and password that can read the various schema tables which define the particular DB instance of interest. Note that OSF does not alter any data or configuration information in the relational database, only read-access is needed.

Instance name, database name, or SID of the database

Database vendor type

Host and port number for DB connection.

A descriptive logical name is needed for each database, preferably one that follows Java class naming conventions.

Database Connect Window and Panels

The Database Connect window contains three property pages used to enter the parameters needed to connect to the various relational databases: DB Login, Advanced Connect and Drivers/URL.

(39)DB Login Panel

Figure 9:
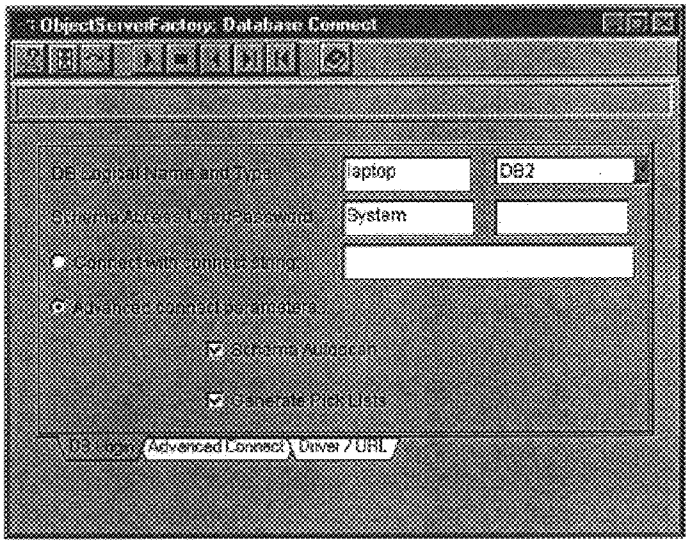
FIG. 9 is a screen shot of a Database Connect Panel—DB Login.

Select a more meaningful DB logical name that was input in FIG. 9 in the drawings section. The database type/vendor is selected using the drop-down picklist adjacent to the DB Logical Name text area.

Enter a userid and password in the next two text areas, which has read access to the schema tables of the relational database. Ensure the Advanced Connect Parameters radio button is clicked and then click on the Advanced Connect property page tab.

(40)Advanced Connect Panel

Figure 10:
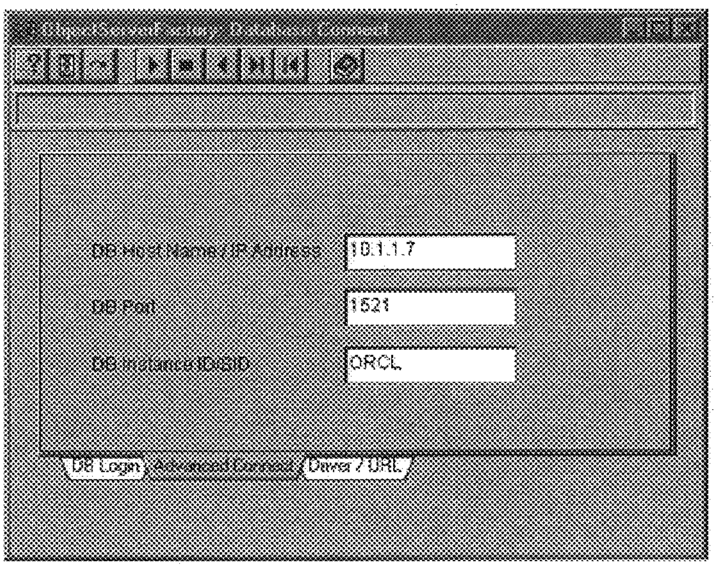
FIG. 10 is a screen shot of a Database Connect Panel—Advanced Connect.
Figure 11:
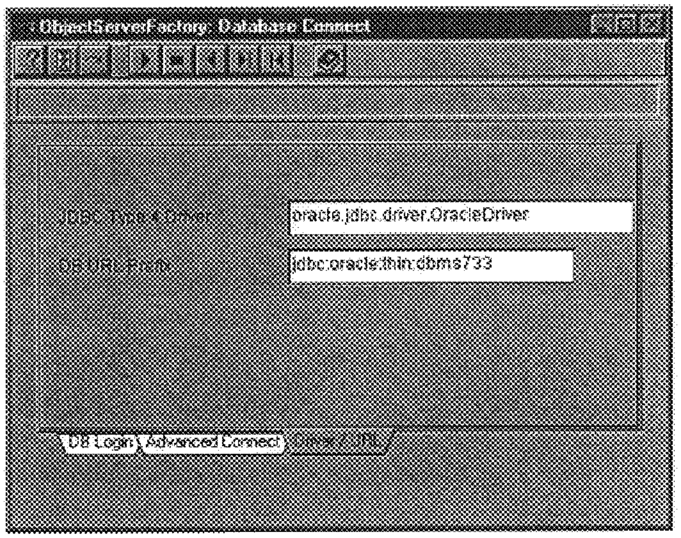
FIG. 11 is a screen shot of a Database Connect Panel—DB Driver and URL.

In this panel, as shown in FIG. 10 in the drawings section, specify the hostname or IP address of the database server the connect port the database is listening and the instance name or SID of the database Then click the Driver/URL property page tab. The drawing as shown in FIG. 11 outlines the parameters on the Driver/URL property page panel.

(41)DB Driver and URL

The above parameters are correct for an ORACLE® version7 database.

When the parameters outlined above have been entered, click the far-left toolbar icon. The parameters will be read from the above panels and a connect to the target database will proceed.

If the DB connect is successful, a schema scan will be initiated and a notification dialog box will be painted indicating success.

If a connect error occurs, the exception reason will be captured and displayed in the OSF System Management window. A stack trace will also be displayed in the window that initiated the OSF application.

Repeat the above connection process for each database that is desired to be accessed in the business application. Then click the green traffic-light icon to proceed to the DB Table Select window.

Select Base Tables

Figure 12:
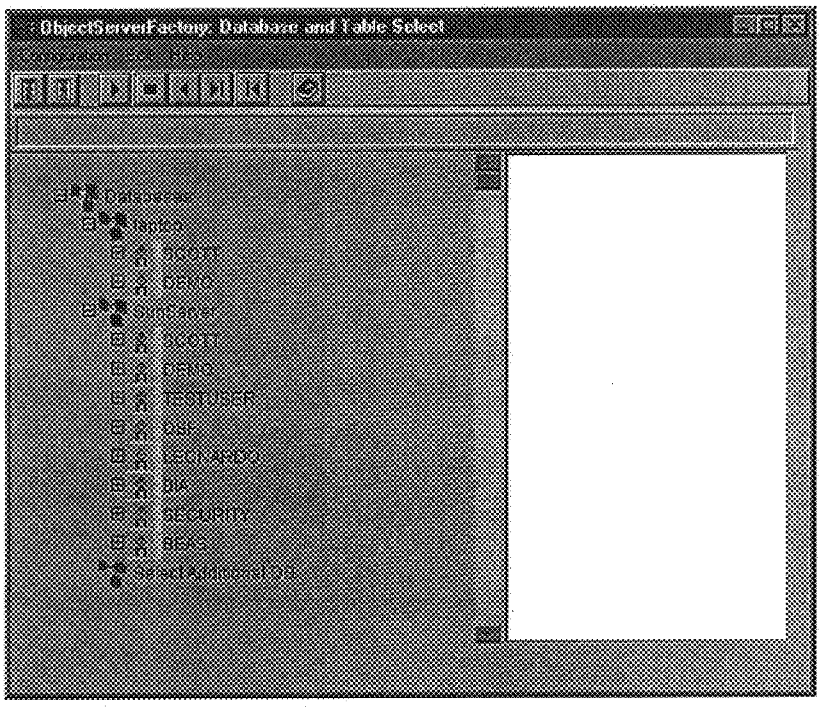
FIG. 12 is a screen shot of a Database and Table Select—No Selections Made.

A familiar tree control is used to display a unified view of all databases as is shown in the drawings section FIG. 12.

It is typical for database administrators to create database owner accounts/users to create and maintain related groups of tables. Thus if a second level database node is expanded, all table owners for user tables are displayed.

Figure 13:
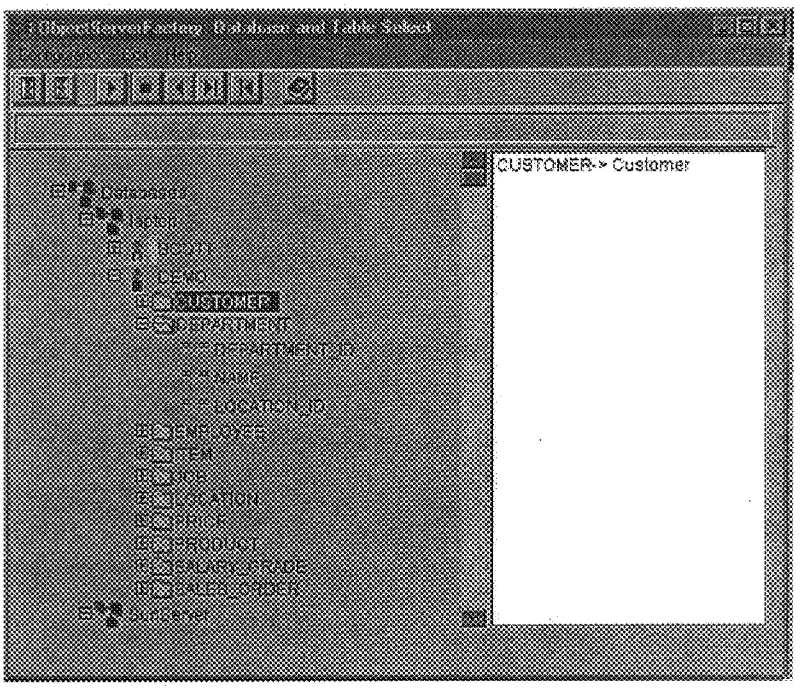
FIG. 13 is a screen shot of a Database and Table Select—CUSTOMER Table Selected.

If a table owner is expanded, a list of tables owned by that table owner would be displayed, as shown in FIG. 13 in the drawings section.

If a fourth-level table tree node is expanded, the columns in that table are displayed. To add the database table to the selected table list, click anywhere on the table name. That table will be then displayed in the right half of the Database and Table Select window. The mapping of the table name -> object name is shown in this text area.

Figure 14:
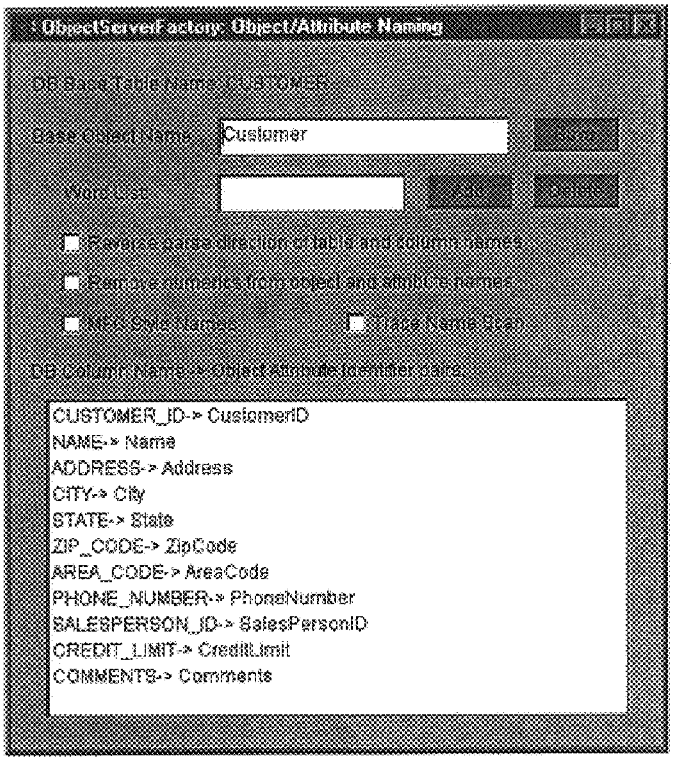
FIG. 14 is a screen shot of an Object and Attribute Naming.

When the first table is selected and added to the selected table list, the Object/Attribute Naming window is opened (FIG. 14 in the drawings section). It is in this window where the attribute and object names are verified.

It is very important to get these names correct, as they will be used in literally dozens of places: in the IDL, build scripts, XML files, server and client software. As a result, OSF has sophisticated algorithms to convert table names to base object names and to create attribute names from column names. However, the algorithms require quick review by the system designer to ensure that they are absolutely correct. Consider FIG. 14 in the drawings section.

In the example above, OSF has done a reasonable job converting table- > object and column-> attribute names and no edit is required. Refer to the next section for a quick overview on how these names are corrected.

Verify Object and Attribute Names

OSF reads in the /usr/dict/words file found on most if not all UNIX systems. In this word list is a compact English dictionary of common usage. After OSF gets rid of the garbage in table and column names (such as numerics, underscores and other needless punctuation), the column name is converted to lower case. Then the word list is used to capitalize the remaining alpha character text to create coherent object and attribute names. See the TextArea in FIG. 14 in the drawings section.

Figure 15:
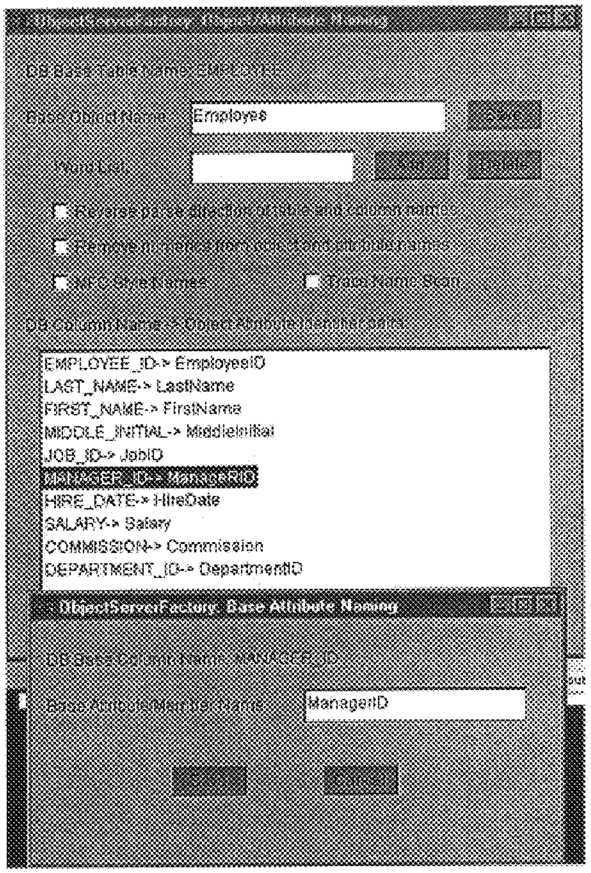
FIG. 15 is a screen shot of an Object and Attribute Naming—Attribute Name Correction.

Consider the following example as shown in FIG. 15 in the drawings section where OSF makes a bad guess at the attribute name.

The MANAGER_ID column is converted to an attribute name of ManageRID (this is because the word 'rid' is in the dictionary, thus the 'r' character is capitalized, ID is always capitalized if found at the end of a column name).

By clicking on the line containing the incorrect attribute mapping (highlighted in blue above) the Base Attribute Naming edit widow is opened where an alternate attribute name can be specified. In this window, the R is corrected to the proper lower case character and the Save button is clicked to store the revised attribute name.

Completion of Object and Attribute Naming

Figure 16:
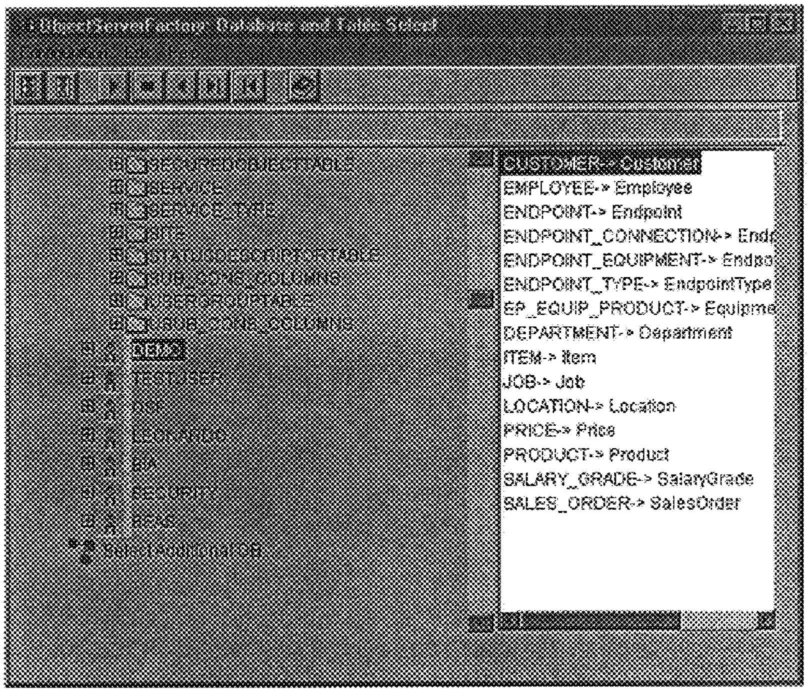
FIG. 16 is a screen shot of a Database and Table Select—All Tables Selected.

When all of the tables from all of the databases have been selected and their attribute and object names established we are finally ready to proceed to the final stage of persistent relational distributed object generation. At this point all selected tables are displayed in the right text area pane at this point as shown in the FIG. 16 of the drawings section. Click the green traffic signal to proceed to Generation Options.

Alter Software Generation Options

Last, the various options to be used during the final build of the persistent, relational distributed objects are to be verified.

Note that the defaults are coherent and are suitable in most cases.

Figure 17:
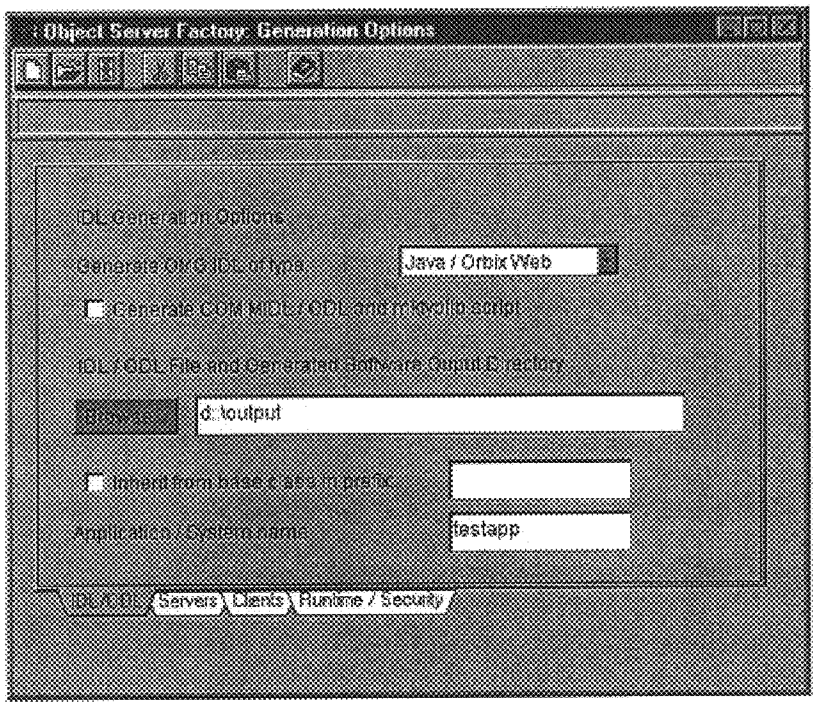
FIG. 17 is a screen shot of a Generation Options—Primary Options.

The graphic in the drawings section FIG. 17 displays the Generation Options window for primary generation options The first three toolbar buttons are notable.

The first button from the left saves the current work performed so far in this run of OSF. All database connection information, selected tables and object and attribute names will be stored through a customary File Save Dialog.

The second button loads the serialized OSF object structure saved by previous save operations.

The third button starts the distributed, persistent relational object build process.

Option Descriptions

This section contains a description of each software generation option.

(42) Operating System

This parameter determines the particulars of the various scripts that are built to compile OSF-generated components. For example, to detach a process on UNIX, one adds an ampersand ('&') character to the end of the command string containing a source command referring to a file of C-shell commands. On VMS one submits DCL command file with the SUB/NOPRINT command. On Windows NT, one uses the START command to initiate processing of a .cmd file.

Default is: OSNT

(43) Application Name

A name of the overall application is used in several places, should be eight bytes or less but his is not enforced. Default is: "osftest"

(44) Architecture

This option determines which classes are built in this run of OSF. Refer to FIG. 17 in the drawings section.

OSF supports three architectures:

1. HTML-based Ultra-thin Client, requires a servlet-aware web server
2. CORBA-based Thin Client, requires a CORBA package such as OrbixWeb or VisiBroker for Java
3. EJB-based Thin Client, requires and EJB-compliant server such as WEBLOGIC from BEA SYSTEMS There are no default selections for this menu.

Figure 18:
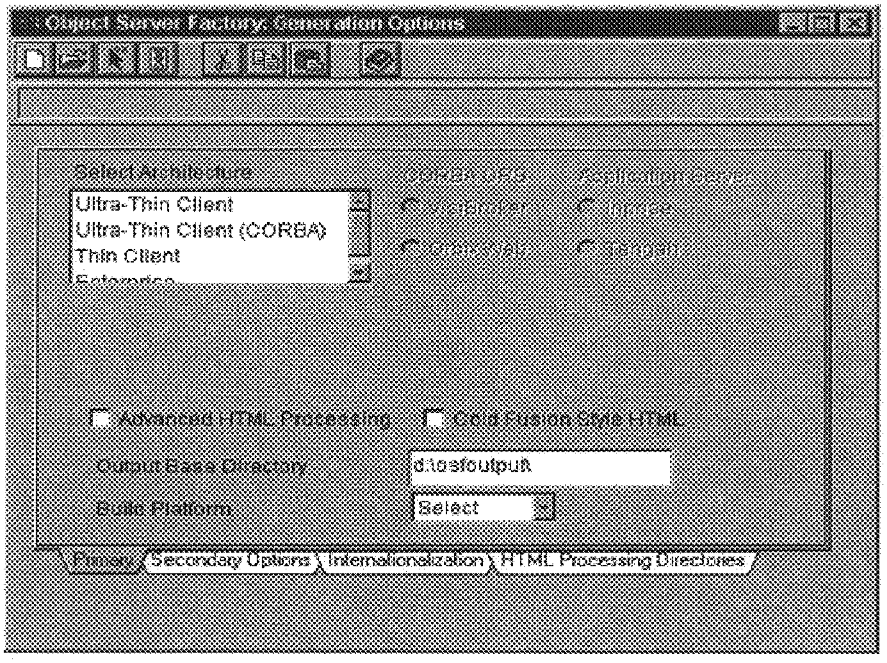
FIG. 18 is a screen shot of a Generation Options—Enterprise Architecture.

The options will be displayed according to the architecture selected. In FIG. 18 in the drawings section, Enterprise Architecture has been selected.

(45) Output Classes

Based upon the desired application architecture selected by the Architecture parameter above, certain classes will be built by default and others will not. The following table shows the default mapping between selected architecture and output classes.

Be advised that it is advisable to rebuild (and recompile) all of the classes required by a given architecture along with the application Registry class to ensure that all modules are consistent.

However, if you know what you are doing and want to save time, feel free to alter the defaults outlined below.

| | Architectures-> | | |
|---|---|---|---|
| Default Output Classes: | Ultra-Thin Client | Thin Client | Enterprise |
| DBIO | X | X | X |
| TestDBIO | X | X | X |
| Persistence | X | X | X |
| TestPersistence | X | X | X |
| Server | | X | X |
| TestServer | | X | X |
| Servlet | X | | |
| HTML | X | | |
| TestObject | | X | X |
| Object | | X | X |
| Rules | | X | X |

-continued

| | Architectures-> | | |
|---|---|---|---|
| Default Output Classes: | Ultra-Thin Client | Thin Client | Enterprise |
| Internationalization | | X | X |
| Registry | X | X | X |

Architecture to Output Class Mapping

(46) IDL Type

This option determines the type of CORBA package to use.

Default is: ORBIX (47)Template Directory

This is the directory where the various .java, .html, .cpp, .xml, .sed, .cmd, .sh, and other input templates are to be found. See the templates directory on the CD-ROM filed herewith.

Default is ".\templates\"

(48)IDL Prefix File Name

This is the file and directory where the IDL preamble, including the base class from which all persistent, relational objects derive.

Default is the template directory and default file name is "prefix.idl"

(49)Output directories

These parameters define the directory structure where OSF writes the codefiles. Consists of a base directory and various subdirectories.

Output base directory default is: "d:\\osfoutput\\"

Default output subdirectories are:

DBIO class subdirectory: default is: "dbio\\";

Persistence class subdirectory, default is: "persistence\\"

Server class subdirectory, default is: "server\\"

Servlet class output file subdirectory, default is: "servlet\\"

Rules class subdirectory, default is: "rules\\"

HTML output subdirectory, default is: "html\\"

Server Rules subdirectory, default is: "serverrules\\"

Client class output file subdirectory, default is: "client\\"

Resource bundle-derived classes, language translation file subdirectory, default is: "internationalization\\"

(50) Build Script File Names

A series of OS-dependent scripts are written to the base output directory, which will build all classes produced by OSF. The master build file name is the script which compiles the IDL and subsequently compiles the IDL and then starts the other build scripts, in parallel when possible.

Since the default operating system is Windows NT, the default build files reflect this OS, in name and content.

Master Build Filename default is: "buildall.cmd"

IDL Build Filename default is: "buildidloutput.cmd"

DBIO Classes Build File Name default is: "builddbio.cmd"

Persistence Classes Build Filename default is: "buildpersistence.cmd"

Server Classes Build File Name default is: "buildserver.cmd"

Rules Classes Build File Name default is: "buildrules.cmd"

Client Classes Build File Name default is: "buildclient.cmd"

ResourceBundle Classes Build File Name default is: "buildresourcebundles.cmd"

Servlet Classes Build File Name default is: "buildservlets.cmd"

Server Rules Classes Build File Name default is: "buildserverrules.cmd";

Where test programs are build to test a complete series of related classes in standalone console mode, the build file for these classes is the same as above with "test" as a prefix. These build script file names for test programs are:

Test DBIO Classes Build File Name default is: "testbuilddbio.cmd"

Test Persistence Classes Build Filename default is: "testbuildpersistence.cmd"

Test Server Classes Build File Name default is: "testbuildserver.cmd"

Test Client Classes Build File Name default is: "testbuildclient.cmd"

There are no servlet test classes because the PRO-HTML built by OSF can be used to test the servlets directly using either the web server or the OSFServletRunner.java sun.servlet.http.Httpserver-derived test class. See Program called OSFServletRunner.java which is on the CD-ROM filed herewith.

There are no test rules classes, as these will be loaded by either the client objects or server objects as appropriate.

The resource bundle classes are loaded by the client objects, so there are no explicit test programs for these classes either.

(51) Package Output Base Directory

Figure 19:
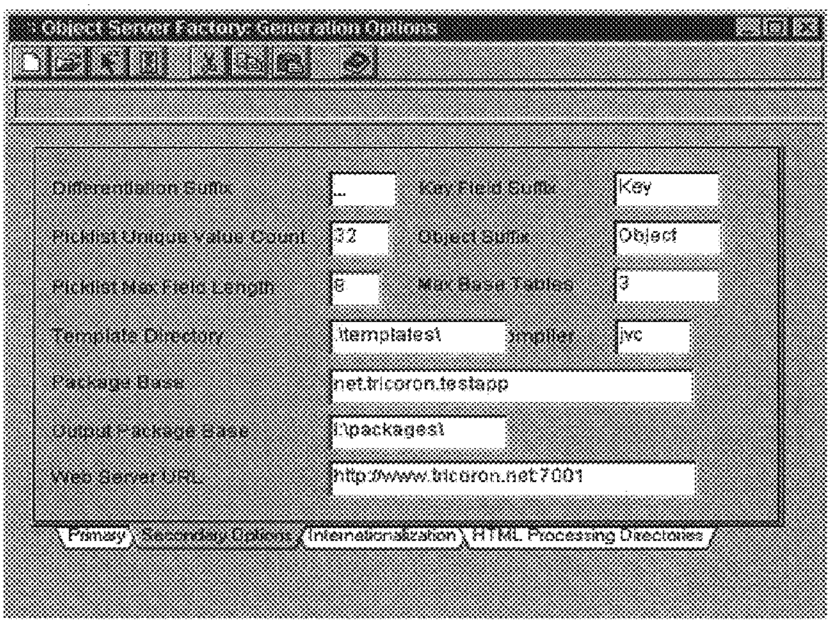
FIG. 19 is a screen shot of a Generation Options—Secondary Options.

Refer to the drawings section, FIG. 19. The text field entitled Output Package Base is the base directory where all output from the Java compiler is written and were all classes are imported during build time.

It is assumed that all support classes are in this directory hierarchy or on the classpath at compilation time.

Default is "i:\\packages"

(52) Package Output Base Prefix

As required by generally accepted standards, this is your reverse Internic domain name with the Application Name parameter above appended.

Default is: "net.tricoron.testapp" (which you probably do not want to use, though it is fine with us)

(53) Unique Object Suffix

At times objects will be created with the same name. Consider that if there are two databases and each of these databases have the same table name, it is quite likely that OSF will create two identical base table object names. It is subsequently possible that more identical object names will be created as the proper persistent, relational distributed objects are derived from the relationships between flat base table objects.

Thus a suffix character is appended to the duplicates to make them unique.

Default is: '_'

This character is also used to differentiate identical attribute names with in an object. Identical attribute names within an object are not likely, but we check for the possibility on every PRO-OBJECT and resolve duplicate attribute names as required.

(54) IDL Base Object

The base object from which all persistent relational distributed object classes are derived is configurable. This must match the class name in the IDL preamble as specified by the IDL Prefix File Name parameter or obviously the IDL will not compile.

Note if you create your own CORBA base class, be sure to include the Pro-Object access methods such as getObjectblock( ), insertObjectAsync( ) etc.

Default is: "BaseObject"

(55) Languages

OSF will build a resource bundle for each language for each client-end PRO-OBJECT.

Default language is "en" which equates to English.

See the Appendix for a comprehensive list of all languages supported by OSF.

OSF does not support country and variant, as further qualification of language has so far not proven necessary.

(56) PickList MAX Field Length

The OSFPickListBuildThread class will reject a series of unique values as possible picklist candidates if any singular data item found in a column exceeds the parameter PickList MAX Field Length.

Default is 8. That is, no pick list candidate value can exceed 8 bytes in length.

(57) PickList MAX Unique Value Count

The OSFPickListBuildThread class will reject a series of unique values as possible picklist candidates if more than n different values are found in a given underlying base table column.

Default is 64. That is, no pick list can have more than 64 values.

Code Build Statistics

Based upon the output classes and architecture selected, OSF displays statistics on each run.

1998-12-23 02:13:37 com.tricoron.OSFv13.OSFGenerate-I-RunStatistics, Module and linecount statistics follow:

| | |
|---|---|
| 1998-12-23 02:13:37 | DBIO Objects: 10 (8668 source lines) |
| 1998-12-23 02:13:37 | DBIO Test Objects: 10 (4304 source lines) |
| 1998-12-23 02:13:38 | Persistence Objects: 32 (28414 source lines) |
| 1998-12-23 02:13:36 | Persistence Test Objects: 32 (18208 source lines) |
| 1998-12-23 02:13:38 | Server/Impl Objects: 32 (33519 source lines) |
| 1998-12-23 02:13:38 | Server/Impl Test Objects: 32 (19429 source lines) |
| 1998-12-23 02:13:38 | Business Logic/Rule Objects: 32 (28006 source lines) |
| 1998-12-23 02:13:39 | Business Logic/Rule Test Objects: 0 (0 source lines) |
| 1998-12-23 02:13:39 | Component/Bean Objects: 32 (54842 source lines) |
| 1998-12-23 02:13:39 | Component/Bean Test Objects: 32 (6149 source lines) |
| 1998-12-23 02:13:39 | Resource Bundle Objects: 192 (38703 source lines) |
| 1998-12-23 02:13:39 | Language Translation Scripts: 6 (14394 source lines) |
| 1998-12-23 02:13:40 | Other, miscellaneous modules: 1 (9512 source lines) |
| 1998-12-23 02:13:40 | Other, miscellaneous test modules: 0 (0 source lines) |
| 1998-12-23 02:13:40 | |
| 1998-12-23 02:13:40 | Total Generated Objects: 443 (264148 source lines) |

OSF TEMPLATE-BASED SOFTWARE GENERATION

The section in the Introduction entitled Language-independent Template-based Class Code File Generation provided a brief but thorough overview of this core functionality of ObjectServerFactory. This section expands on this introductory overview with a complete end-to-end example.

The OSFGenerate class is the class that reads in Database Normalization Objects and Software Templates to produce PRO-OBJECTS, support classes and utility files. OSFGenerate can create .java and C++ classes, scripts, HTML, or any other language filet ype for any operating system platform.

Figure 20:
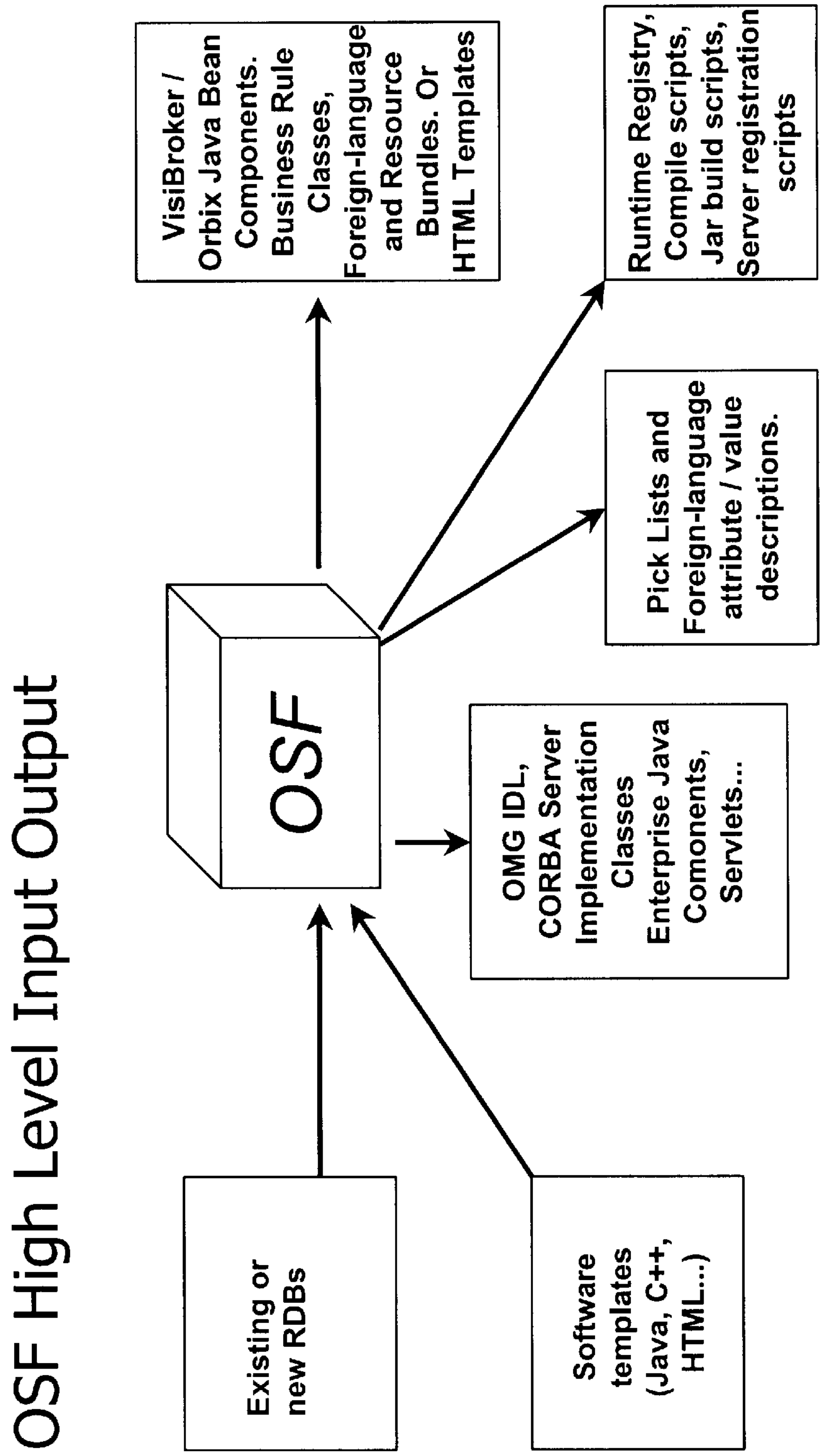
FIG. 20 is a graph of an OSF High Level Input Output.

FIG. 20 in the drawings section shows OSF high-level input and output:

OSFGenerate Principles

The OSFGenerate class embodies several basic though powerful software component-building principles:

- Lines without any ##replacementtargets## are written out to the code file being generated as-is with no changes.
- Multiple ##replacementtargets## be present on one line. Replacements are made left-to-right recursively.
- Certain targets cause the line to be repeated. If other targets are on the line, the line is copied internally, all replacement targets are satisfied then the line written out.
- Repeat blocks permit blocks of code to be repeated. Targets within the repeat blocks are replaced as the block is repeated.
- Repeat blocks can be nested and are resolved inside-out recursively.
- In most cases an output file is produced for each OSF-generated object per template. That is, if 10 database tables produce 32 objects because of their foreign key relations, then 32 output files will be written based off a given template.

With these principles in mind, all replacement targets in the following example will be explained in detail to provide comprehensive insight into the operation of the OSFGenerate class.

Complete Example

Design objectives of this template are as follows:

- This HTML template is used to produce edit forms for each PRO-OBJECT built in this run of OSF.
- Place the object name at the top of the form as a title and in a hidden field for the servlet to read.
- Key fields are to be located at the top of the form. Non-key attributes are placed below a horizontal line.
- For each non-key attribute, create a commented out picklist for the system designer to evaluate. If the picklist is to be used, the adjacent input area for the attribute is to be commented out and the picklist uncommented and thus activated. Default descriptions for each picklist choice option are to be generated in the form 'D: picklist value" where the value is to be unique across all objects. The value is unique so that a sed script can insert a given description into all occurrences in all generated html files.

Figure 21:
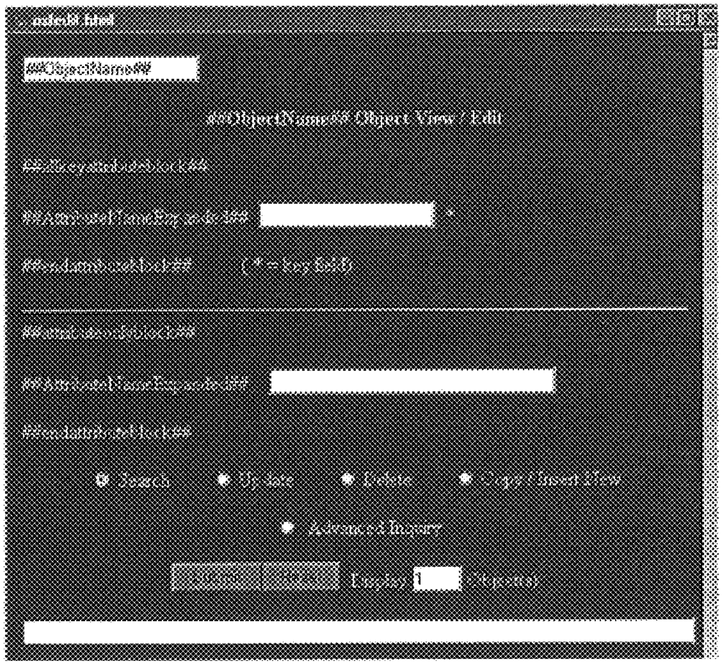
FIG. 21 is a screen shot of an IDE Design Mode HTML. Template.

FIG. 21 in the drawings section shows a very simple example of howan HTML form template appears in an IDE in design-mode that implements the above-mentioned objectives.

Consider the following template OSFedit.html, with attention to the ##targets##:

```
<!DOCTYPE HTML PUBLIC "-//IETF//DTD HTML//EN">
<html>
<head>
```

-continued

```
<meta NAME="GENERATOR" Content="Microsoft FrontPage 3.0">
<meta HTTP-EQUIV="Content-Type" content="text/html;
charset=iso-8859-1">
<title>##ObjectName## Object View / Edit</title>
</head>
<body bgColor=darkblue text=silver Link=blue vLink=fuchsia aLink=red>
<form action="http://www.##domainname##:8081/servlet/
##ObjectName##" method="post">
    <input type="hidden" name="posteventsource" value=
    "##ObjectName##">
        <div align="center"><center><p><STRONG>##ObjectName##
        Object View / Edit
</STRONG> </p>
        </center></div>
        ##allkeyattributeblock##
        <p>##AttributeNameExpanded##  <input name=
        "##attributename##key" >   *</p>
        ##endattributeblock##
         ( * = key field)
<P></P>
        <hr>
        ##attributeonlyblock##
        <p>##AttributeNameExpanded##   
        <input name="##attributename##" size="35" >
        <!- picklist candidates for the for the ##attributename##
        attribute>
    <comment>
            <select name="##attributename##" size="1">
                <option value="##picklistvalues##">D:
                ##picklistvalue_##</option>
            </select>
    </comment>
        </p>
        ##endattributeblock##
        <div align="center"><center><p>
        <input type-"radio" name="operation" value-"search"
        checked>Search
      
        <input type="radio" name="operation"value="update"> Update
      
        <input type="radio"name="operation" value="delete"> Delete
      
        <input type="radio"name="operation" value="insert">
        Copy / Insert
New </p>
        <center><p> <input type="radio" name="operation"
        value="advanced">  Advanced
Inquiry</p>
        </center></div><div align="center"><center><p>
        <input type="submit" value=" Submit ">
        <input type="reset" value="Reset "> 
        Display <input name="objectcount" size="3" value=
        "1"> Object(s)</p>
        </center></div>
        <div align="left"><p><input name="messagearea" size=
        "87" style="BORDER-BOTTOM:
outset"></p>
        </div>
</form></CENTER>
</body>
</html>
```

Each installation of ORACLE® shipped since version 6 contains a starter database with two table owners: SCOTT and DEMO. Two DEMO tables, DEPARTMENT and EMPLOYEE are defined as follows:

| Name | Null? | Type |
|---|---|---|
| SQL> desc DEPARTMENT; | | |
| DEPARTMENT_ID | NOT NULL | NUMBER(2) |
| NAME | | VARCHAR2(14) |
| LOCATION_ID | | NUMBER(3) |

-continued

| Name | Null? | Type |
|---|---|---|
| SQL> desc EMPLOYEE; | | |
| EMPLOYEE_ID | NOT NULL | NUMBER(4) |
| LAST_NAME | | VARCHAR2(15) |
| FIRST_NAME | | VARCHAR2(15) |
| MIDDLE_INITIAL | | VARCHAR2(1) |
| JOB_ID | | NUMBER(3) |
| MANAGER_ID | | NUMBER(4) |
| HIRE_DATE | | DATE |
| SALARY | | NUMBER(7,2) |
| COMMISSION | | NUMBER(7,2) |
| DEPARTMENT_ID | | NUMBER(2) |
| SQL> | | |

On the EMPLOYEE table, the DEPARTMENT_ID is a foreign key to the DEPARTMENT_ID primary key column of DEPARTMENT table. During its schema scan of the starter database, ObjectServerFactory sees that these two tables are related thusly and builds a DepartmentEmployee PRO-OBJECT. The resultant IDL best describes the DepartmentEmployee PRO-OBJECT:

```
// Equivalent derivation:
// DepartmentEmployee: DEPARTMENT, EMPLOYEE
//
interface DepartmentEmployee : BaseObject
{
  readonly attribute string DepartmentID;
  readonly attribute string Name;
  readonly attribute string LocationID;
  readonly attribute string EmployeeID;
  readonly attribute string LastName;
  readonly attribute string FirstName;
  readonly attribute string MiddleInitial;
  readonly attribute string JobID;
  readonly attribute string ManagerID;
  readonly attribute string HireDate;
  readonly attribute string Salary;
  readonly attribute string Commission;
  // Attribute identifiers used in clients and servers
  enum DepartmentEmployeeAttributeIDs
{
    DEPARTMENTIDAID,
<snip>
    COMMISSIONAID
  };
};
```

Figure 22:
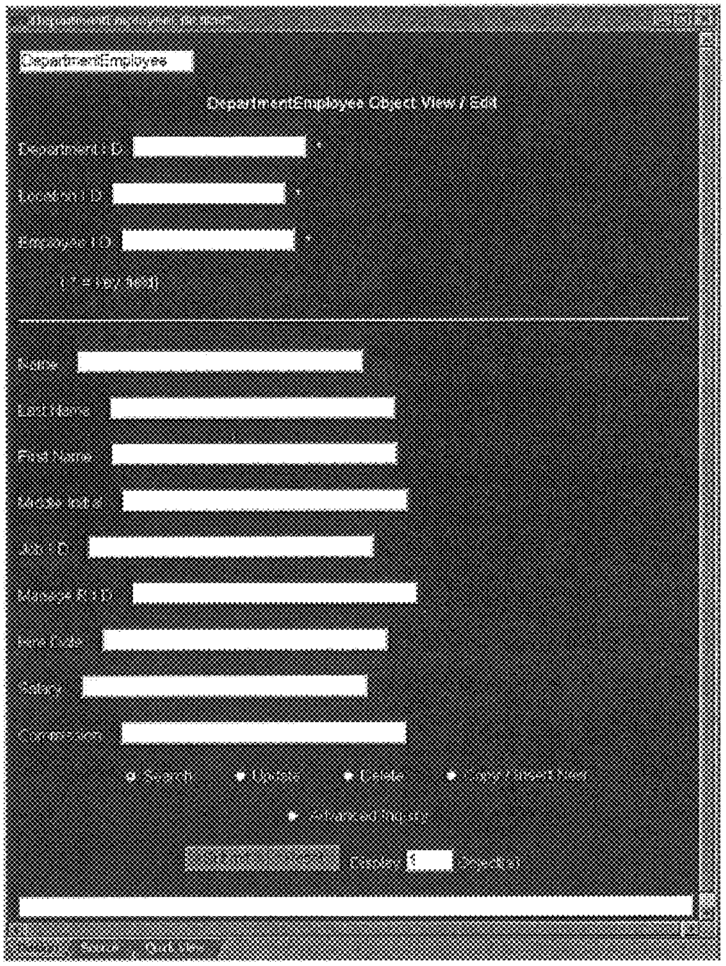
FIG. 22 is a screen shot of a Generated HTML Subframe.

Let's examine what the OSFGenerate class produces given the above DepartmentEmployee object when processed with the OSFedit.html template described above as shown in FIG. 22 in the drawings section.

Title Line

```
<title>##ObjectName## Object View / Edit</title>
```

The ObjectName for this object is DepartmentEmployee, so this title line is written out as:

```
<title>DepartmentEmployee Object View / Edit</title>
```

URL Line

Here we see where multiple replacements are performed on one input line . . .

```
<form action="http://www.##domainname##:8081/servlet/
##ObjectName##"
method="post">
```

. . . is written out as:

```
<form action="http://localhost:8081/servlet/DepartmentEmployee"
method="post">
```

Post Event Source and Title

The above <title> tag sets the caption of window frame title. An additional title is desired within the frame and a hidden field is needed to verify the source of the input to the servlet:

```
<input type="hidden" name="posteventsource"
value="##ObjectName##">
<div align="center"><center><p><STRONG>##ObjectName##
Object View / Edit
```

Expands to:

```
<input type="hidden" name="posteventsource"
value="DepartmentEmployee">
<div align="center"><center><p><STRONG>DepartmentEmployee
Object View / Edit
```

Keys-only repeat block

Here we want to create an input text area for each key field in the object. This key-only repeat block repeats all code up to the end of block line, performing expansions and replacements of all code as it is repeated.

```
##allkeyattributeblock##
    <p>##AttributeNameExpanded##  <input name=
    "##attributename##key" >
 *</p>
##endattributeblock##
```

Expands to:

```
<p>Department I D  <input name="departmentidkey" > 
*</p>
<p>Location I D  <input name="locationidkey" > 
*</p>
<p>Employee I D  <input name="employeeidkey" > 
*</p>
```

The ##AttributeNameExpanded## tag takes the current attribute name and inserts a space before each capital letter. ##attributename## takes the current attribute name, converts it to lower case and inserts it into the output file. The name of the output file is DepartmentEmployeeEdit.html.

Attribute-only repeat block

Here we want to create an input text area for each non-key field in the object. Also, we want to create a possible picklist for examination by the developer which is commented-out.

```
##attributeonlyblock##
    <p>##AttributeNameExpanded##   
    <input name="##attributename##" size="35" >
    <!- picklist candidates for the for the ##attributename##
    attribute>
    <comment>
        <select name="##attributename##" size="1">
            <option value="##picklistvalues##">D:
            ##picklistvalue_##</option>
        </select>
</comment>
    </p>
    ##endattributeblock##
```

The above expands to:

```
<p>Name   
<input name="name" size="35" >
    <!- picklist candidates for the for the name attribute>
<comment>
        <select name="name" size="1">
        </select>
    </comment>
</p>
<p>Last Name   
<input name="lastname" size="35" >
    <!- picklist candidates for the for the lastname ttribute>
<comment>
    <select name="lastname" size="1">
</select>
</comment>
</p>
<p>First Name   
<input name="firstname" size="35" >
    <!- picklist candidates for the for the firstname attribute>
<comment>
        <select name="firstname" size="1">
        </select>
</comment>
</p>
<p>Middle Initial   
<input name="middleinitial" size="35" >
    <!- picklist candidates for the for the middleinitial attribute>
<comment>
    <select name="middleinitial" size="1">
        <option value="z">D: z</option>
        <option value="Y">D: Y</option>
        <option value="T">D: T</option>
        <option value="S">D: S</Option>
        <option value="P">D: P</option>
        <option value="N">D: N</option>
        <option value="M">D: M</option>
        <option value="L">D: L</option>
        <option value="K">D: K</option>
        <option value="J">D: J</option>
        <option value="G">D: G</option>
        <option value="F">D: F</option>
        <option value="D">D: D</option>
        <option value="B">D: B</option>
        <option value="A">D: A</option>
    </select>
</comment>
</p>
<p>Job I D   
<input name="jobid" size="35" >
    <!- picklist candidates for the for the jobid attribute>
<comment>
    <select name="jobid" size="1">
        <option value="669">D: 669</option>
        <option value="668">D: 668</option>
```

-continued

```
        <option value="667">D: 667</option>
        <option value="672">D: 672</Option>
        <option value="671">D: 671</option>
        <option value="670">D: 670</option>
        <option value="999">D: 999</option>
    <select>
</comment>
</p>
<p>Manager I D   
<input name="managerid" size="35"
<!- picklist candidates for the for the managerid attribute>
<comment>
    <select name="managerid" size="1">
        <option value="9999">D: 9999_</option>
        <option value="7698">D: 7698</option>
        <option value="7799">D: 7799</option>
        <option value="7569">D: 7569</option>
        <option value="7507">D: 7507</option>
        <option value="7506">D: 7506</option>
        <option value="7505">D: 7505</option>
        <option value="7566">D: 7566</option>
        <option value="7839">D: 7839</option>
        <option value="7788">D: 7788</option>
        </select>
    </comment>
    </p>
    <p>Hire Date   
    <input name="hiredate" size="35" ><!- picklist candidates for
    the for the hiredate
attribute>
    <comment>
        <select name="hiredate" size="1">
        <select>
</comment>
</p>
<p>Salary   
<input name="salary" size="35" >
    <!- picklist candidates for the for the salary attribute>
<comment>
    <select name="salary" size="1">
        <option value="99999.93">D: 99999.93</option>
        <option value="1850">D: 1850</option>
        <option value="2850">D: 2850</option>
        <option value="1500">D: 1500</option>
        <option value="750">D: 750</option>
        <option value="800">D: 800</option>
        <option value="2450">D: 2450</option>
        <option value="3000">D: 3000_</option>
        <option value="1100">D: 1100</option>
        <option value="1600">D: 1600</option>
        <option value="5000">D: 5000_21 /option>
        <option value="2200">D: 2200</option>
        <option value="2875">D: 2875</option>
        <option value="950">D: 950</option>
        <option value="1300">D: 1300</option>
        <option value="1250">D: 1250</option>
        <option value="99999.99">D: 99999.99</option>
        <option value="1800">D: 1800</option>
        <option value="2975">D: 2975</option>
        <option value="2750">D: 2750</option>
    </select>
</comment>
</p>
<p>Commission   
<input name="commission" size="35"
<!- picklist candidates for the for the commission attribute>
<comment>
    <select name="commission" size="1">
        <option value="1000">D: 1000</option>
        <option value="300">D: 300</option>
        <option value="800">D: 800#</option>
        <option value="900">D: 900</option>
        <option value="1200">D: 1200</option>
        <option value="500">D: 500</option>
        <option value="0.0">D: 0.0</option>
        <option value="99999.99">D: 99999.99_</option>
        <option value="1400">D: 1400</option>
```

-continued

```
   </select>
</comment>
</p>
```

We see why the picklists are referred to as candidates and are commented out.

No picklist was generated for the (First) Name or Last Name attributes because text was found in a column during the table scan which exceeded the MAXFieldLength parameter (the default of which is 8 bytes). OSF assumes that any column containing a value with a length greater than this parameter can not be a picklist.

A rather useless picklist was generated for the Middle Initial attribute and would probably not be released by the designer.

The Job ID picklist is possibly useful, but only after a bit of enhancement. Specifically the default descriptions "D: JJJ" should be replaced with real world descriptions of what the otherwise unintelligible values mean.

Consider the original generated picklist:

```
<select name="jobid" size="1">
   <option value="669">D: 669</option>
   <option value="668">D: 668</option>
   <option value="667">D: 667</option>
   <option value="672">D: 672</option>
   <option value="671">D: 671</option>
   <option value="670">D: 670</option>
   <option value="999">D: 999</option>
<select>
```

If one dumps the JOB table we find:

```
SQL> select * from JOB;
JOB_ID FUNCTION
667 CLERK
   668 STAFF
   669 ANALYST
   670 SALESPERSON
   671 MANAGER
   672 PRESIDENT
   999 documenting sucks
7 rows selected.
SQL>
```

Thus we can update the picklist as follows:

```
<select name="jobid" size="1">
   <option value="669">Analyst</option>
   <option value="668">Staff</option>
   <option value="667">Clerk</option>
   <option value="672">President</option>
   <option value="671">Manager</option>
   <option value="670">Salesperson</option>
   <option value="999">Unknown</option>
<select>
```

This works well as it provides user-readable value choices and the browser sends the Value=" string to the servlet as though the end-user had keyed in the value.

Also when the servlet writes the initial HTML stream out the browser, the value in the base table column is batched to the appropriate pick list element and a "selected" clause is added to the correct pick <option> record. This way, when the form containing an object is written, the pick list is set to the description which matches the correct value in the RDBMS.

As is the case with the language translation strings in the ListResourceBundle-derived classes, the generated picklist descriptors >D: xxxx< are unique so a sed script can run over all HTML files to update all picklists which share a common description.

Note in the Manager_ID picklist the underscore in the first descriptor:

```
<select name="managerid" size="1">
   <option value="9999">D: 9999_</option>
   <option value="7698">D: 7698</option>
```

The >D: 9999< description was assigned elsewhere as another pick list descriptor, so to permit a sed script can differentiate between the two entries, permitting the designer and maintenance personnel to easily create and maintain picklist descriptions.

OSFORBSTREAMS

OSFORBStream is the helper class used with the underlying communications infrastructure to assist with the transfer of persistent relational objects through a network, whether that network is CORBA over TCP/IP, RMI, BSD-style sockets or even serial lines.

Without a bulk-object transport scheme similar to OSFORBStreams, it would prove impractical to build rich client-end interfaces containing, for example, grids and tree controls. The reason is obvious: performance.

OSFORBStreams are sufficiently complex to deserve a separate discussion section and since they are used to move objects from the client-end PRO-OBJECTS to the backend server support classes. Examples of their use are also enumerated.

Primary Problem Addressed by OSFORBStreams: Speed

For purposes of discussion, let's assume an end-user wants to display a very small grid of a dozen objects, with each object containing eight attributes. CORBA is used as the distributed object transport.

First, the client application has to request a dozen remote object references. In CORBA-land this is typically received as a sequence of object references. Network round trip count: 1.

Then with each object reference, one can dereference and use the object ref to access each attribute of the remote object. This requires an IIOP round-trip for each attribute in the object. There's eight attributes per object, thus network round trip count increases by eight per object or 96, plus the original sequence of refs is 97 or 194 network packets total to fill the 12*8 grid with data.

Even with a very fast network, this could take a long time since a server-side operation has to be scheduled and executed for each request. If the server gets busy for even a few dozen milliseconds, the latency will be noticeable by the end-user that, if using a PSTN dial-up connection, could be fast asleep at their terminal at this point. If the server code is written so that a database network-level round-trip is needed to access the RDBMS to build each object, the total network round trips increases by a greater amount still.

Network Performance Improvements from OSFORBStreams

Through the use of OSFORBStreams and optimized RDBMS access, total network I/O operations are easy to forecast for a block object read using OSFORBStreams: one RDBMS round-trip for each base table which makes up the persistent relational object and one IIOP round from and back to the client.

How is this possible? Simple, all of the objects and their attributes are blocked up into an OSFORBStream and transmitted to the client in a single reply.

Further, the OSFORBStream is compressed, reducing the size of the network packet and further improving the probability that the IIOP or RMI packet will fit into one underlying TCP/IP packet, given a maximum transmission unit packet size over a given network connection.

Further the OSFORBStream can be encrypted as well using a lightweight unpublished asymmetric dual random key encryption algorithm. Indeed, the IIOP or RMI packet does grow an amount that varies depending on what keys the Random.nextInt( ) method calls generate. But since this encryption algorithm uses a small fraction of the overhead as is the case with SSL, it is used to encrypt each OSFORBStream, even if SSL is subsequently used. One can never have enough security with Internet-based applications, in our opinion.

The net effect is to reduce the network round trips, including RDBMS network I/O, by at least one order of magnitude. Depending on the graphical objects used by the client, network round-trips can be reduced by two orders of magnitude, or a factor of 100 (or more). The performance improvement from the perception of the end-user can be, and usually is, dramatic.

An analogous problem was addressed in the 60s with the first disk drives. Until groups of similar records were placed into blocks on the direct access storage devices, program performance was very slow and improved dramatically when count-key-data blocked input output was implemented. OSFORBStreams operates in a similar manner as it blocks up attributes of an object together then blocks similar or related objects together for transmission into a logical single network transmission.

Standard CORBA-2 Accessor Support

Although OSFORBStreams increase performance significantly, the IDL-defined accessor methods to the remote object are still available by the familiar getAttributeName( ) method calls.

Setter methods are not supported by individual attribute via the CORBA remote object reference because transaction synchronization over multiple IIOP network hops would leave records locked in the underlying RDBs for far too long of a time interval. The only solution which had reasonable performance and had nominal consequences was to set autocommit on a but this made rollback impossible when multiple attributes required update in a single transaction.

Thus, a far more coherent transaction bracketing scheme was implemented (refer to the OSFPersistenceObject base class in a previous section) and all remote object attributes in the OMG IDL are defined as read-only as a result.

Remote Persistent Object Requests with OSFORBStreams

One symmetrical OSFORBStream.java class handles both server and client/requestor streams of types receive and transmit.

To make a persistent object request using OSFORBStreams, one has to know:

The object Id of the desired object

Key fields, either partially qualified or fully qualified sets

If an object read, the number of object desired

If an object attribute update, the attribute ID with current and revised values of the attribute.

The type of persistent object request to make, either synchronous (blocking) or asynchronous (non-blocking).

That is all. Object server locations, transport, location of database servers, error recovery are all handled internally in a transparent manner.

Remote Persistent Object Reply Processing with OSFORBStreams

A familiar java.util.Enumeration interface is implemented when multiple objects are returned. Each enumeration element returns a String[ ] list of attributes via an OSFORBStreamObject. The count of attributes in a given object is provided by instance data set into this OSFORBStreamObject. The Enumeration interface is used for all underlying transports, either CORBA, RMI or sockets.

Single object reads, deletes, updates either work as expected, return OBJECTNOTFOUND or throw an OSFDBIOException.

Persistent object updates either work as expected, return OBJECTNOTFOUND or throw either an OSFDBIOException or an OSFDBUpdateValueCompareException.

Again, the interfaces are consistent and are used for all underlying transports.

Persistent, Relational Object Access Examples

Two DEMO tables from all versions of ORACLE since 1992, DEPARTMENT and EMPLOYEE, will be used for detailed examples of persistent object reads, block reads, object inserts, deletes and updates.

| Name | Null? | Type |
|---|---|---|
| SQL> desc DEPARTMENT; | | |
| DEPARTMENT_ID | NOT NULL | NUMBER(2) |
| NAME | | VARCHAR2(14) |
| LOCATION_ID | | NUMBER(3) |
| SQL> desc EMPLOYEE; | | |
| EMPLOYEE_ID | NOT NULL | NUMBER(4) |
| LAST_NAME | | VARCHAR2(15) |
| FIRST_NAME | | VARCHAR2(15) |
| MIDDLE_INITIAL | | VARCHAR2(1) |
| JOB_ID | | NUMBER(3) |
| MANAGER_ID | | NUMBER(4) |
| HIRE_DATE | | DATE |
| SALARY | | NUMBER(7,2) |
| COMMISSION | | NUMBER(7,2) |
| DEPARTMENT_ID | | NUMBER(2) |
| SQL> | | |

On the EMPLOYEE table, the DEPARTMENT_ID is a foreign key to the DEPARTMENT table. During its schema scan of the DEMO starter database, ObjectServerFactory sees that these two tables are related thusly and builds a DepartmentEmployee PRO-OBJECT. The resultant IDL best describes the DepartmentEmployee PRO-OBJECT:

```
// Equivalent derivation:
// DepartmentEmployee: DEPARTMENT, EMPLOYEE
//
interface DepartmentEmployee : BaseObject
{
    readonly attribute string DepartmentID;
    readonly attribute string Name;
    readonly attribute string LocationID;
    readonly attribute string EmployeeID;
    readonly attribute string LastName;
    readonly attribute string FirstName;
    readonly attribute string MiddleInitial;
    readonly attribute string JobID;
    readonly attribute string ManagerID;
    readonly attribute string HireDate;
    readonly attribute string Salary;
    readonly attribute string Commission;
    // Attribute identifiers used in clients and servers
    enum DepartmentEmployeeAttributeIDs
    {
        DEPARTMENTIDAID,
        NAMEAID,
        LOCATIONIDAID,
        EMPLOYEEIDAID,
        LASTNAMEAID,
        FIRSTNAMEAID,
        MIDDLEINITIALAID,
        JOBIDAID,
        MANAGERIDAID,
        HIREDATEAID,
        SALARYAID,
        COMMISSIONAID
    };
};
```

The easiest way to demonstrate OSFORBStreams is to examine in detail the execution of the TestDepartmentEmployeePersistence class that runs the DepartmentEmployeePersistence class in standalone test mode from a command line. (ObjectServerFactory automatically builds standalone test programs for each DBIO, Persistence, Server and component Object class built from a given set of databases).

Package/Deployment Details

The Generations Options window of ObjectServerFactory permits the developer to specify a Package Base. In most cases this will be in the form of the reverse Internic domainname of the customer+a project name or subsystem name. To this, depending on the output module being built, OSF appends server, servercommon, or client.

As an example, assume Ford Motor Company is using ObjectServerFactory to web-enable a database used to distribute and track details of Cobras sold: owner details, problems, comments, and manufacturing information (such as number and types of Cobras built, colors, options and other interest areas Cobra owners may wish to access form the Web).

Ford's Internic domain name is ford.com and the name of the application is Cobra Track. Thus OSF will write out source code to the following packages:

ford.com.cobratrack.server—Server-side classes ford.com.cobratrack.servercommon—Server-side classes which can be used by client components and classes ford.com.cobratrack.client—Client-side, object requestor classes.

In the examples below we will assume com.company.project is the Package Base.

Read Persistent Object Operation Examples

This example demonstrates how to perform the most basic persistent object I/O operation using OSF ORBStreams: an object read of the DepartmentEmployee object outlined above.

Consider the standalone console-mode test program for the DepartmentEmployee persistent object, TestDepartmentEmployeePersistence.java. ObjectServerFactory builds a test program for each persistence object so that the relational <-> object translation for a given persistent, relational object can be tested in standalone mode. TestDepartmentEmployeePersistence.java instantiated and runs DepartmentEmployeePersistence.class, performing relational <-> object translation for the DepartmentEmployee PRO-OBJECT described above.

A description of the setup for a PRO-OBJECT operation is in order.

(58) Setup for Pro-Object Operations

The following describes the setup required for PRO-OBJECT operations via OSFORBStreams.

```
package com.company.project.server;
```

First, specify the output package and import the classes required. Java-standard package names based off the Internic domainname appended with the project name and 'server' (in this example) are recommended and used consistently within OSF.

Throughout OSF software, we avoid the use of the import package.name.* wildcard statements. We always import classes explicitly for both efficiency and readability purposes.

```
import java.util.Enumeration;
```

The OSFORBStream class implements a java.util.Enumeration interface to present the objects received to the consumer of the objects

```
import com.tricoron.OSFv12.OSFSystemManagement;
```

An OSFSystemManagement object is always required and supplies such services such as centralized logging, logical database connection pooling, encryption and compression, to name a few services.

```
import com.tricoron.OSFv13.OSFBaseObject;
```

This is the base class from which all OSF objects are derived, including TestDepartmentEmployeePersistence.

```
import com.tricoron.OSFV12.OSFDBIOException;
import con.tricoron.OSFv12.OSFDBUpdateValueCompareException;
```

These are the two exceptions that the low-level DBIO classes utilize to communicate errors up to the higher-level persistence classes. In this example the DepartmentEmployeePersistence class utilizes two database tables and thus two DBIO classes: DepartmentDBIO and EmployeeDBIO:

```
import com.tricoron.OSFv13.OSFDatabase;
```

This is the object that encapsulates all aspects of a database: hostname, port, sid, JDBC type-4 driver name, connection pool instance data management methods and more.

```
import com.tricoron.OSFv13.OSFORBStream;
import com.tricoron.OSFv13.OSFORBStreamObject;
import com.tricoron.OSFv13.OSFORBStreamException;
```

These are the three classes associated with OSFORBStreams:

OSFORBstream is the core OSFORBStream class used on client and server ends to create and process OSFORBStreams OSFORBStreamObject is the object returned by the Enumeration interface used to retrieve objects in receive-style OSFORBStreams OSFORBStreamException is the java.lang.Throwable-derived class used to originate and report OSFORBStream errors

```
import com.company.project.servercommon.Registry;
```

The Registry contains all parameters specific to a given customer installation of ObjectServerFactory-created objects. This class, as one would image, in quite involved and is therefore given a separate section. Please refer to the Support Class Organization section for details about the application Registry class. Suffice to say at this point that, for this example, the Registry provides database connection details for a given database table in addition to the all-important object map.

```
import com.company.project.server.DepartmentEmployeePersistence;
```

This is the import for the DepartmentEmployeePersistence class we are instantiating and running in this example.

```
// classes generated by the IDL compiler
import com.company.project.servercommon.ObjectID;
```

In the Object and Attribute Identification section above, an IDL enumeration called ObjectID was described. This is the enum that uniquely identifies all objects. The output of the IDL compiler is a com.company.project.servercommon.ObjectID class and that class is imported here.

```
class TestDepartmentEmployeePersistence extends OSFBaseObject
{
```

Class declaration of this demonstration class; note that it extends OSFBaseObject

```
// test authentication through underlying RDBMS
final static String UID = "DEMO";
final static String PASSWORD = "DEMO";
```

ObjectServerFactory comes with a comprehensive attribute/column-level fine-grained runtime authorization system. We also provide a template OSFSecurity.java class that can easily be integrated to an existing security scheme at a given customer's installation. One customization of OSFSecurity.java is a mapping of authentication and runtime authorization to the security in the native RDBMS that has the base tables. Native RDBMS security is used in this example. The owner of the Employee and Department tables in ORACLE is DEMO, password DEMO.

```
public static void main(String[ ] arguments)
{
    OSFSystemManagement sysman = new
    OSFSystemManagement(CLASSNAME);
    DepartmentEmployeePersistence departmentemployee = null;
    final Registry registry = new Registry( );
```

Here is the entry point of the demonstration test program and declaration of the OSFSystemManagement, Registry and declaration of the persistence object.

```
// instantiate test persistence object
try
{
    departmentemployee = new DepartmentEmployeePersistence(
        sysman, registry, UID, PASSWORD);
}
catch (OSFDBIOException e)
{
    sysman.logMessage (CLASSNAME +
        "-F-PeristenceException, DepartmentEmployeePersistence" +
            "create Exception, e-" + e.getMessage( ));
    e.printStackTrace ( );
    System.exit (ABNORMALCOMPLETION);
}
```

DepartmentEmployeePersistence is instantiated here. The Persistence class translates all exceptions that can occur into a standardized OSFDBIOException.

```
// orb stream declarations,
// note the ORBStream class both creates
// and processes the streams
OSFORBStream receiveorbstream = null;
OSFORBStream transmitorbstream = null;
```

As stated on numerous occasions, OSFORBStreams are bi-directional, thus one is used to send the request, the other is used to process the reply.

```
// turn on tracing?
boolean tracingorbstreams = false;
if (arguments.length > 0 &&
    arguments[FIRSTOPTION].equals(TRACEOPTION) == true)
    {
    departmentemployee.setTrace(
        TRACEORBSTREAM | TRACEDBIO |
        TRACEPERSISTENCE | TRACEPERFORMANCE);
}
```

Examination of the OSFBaseObject core base class in a previous section will reveal constants, instance data and methods for runtime execution tracing. Experience has shown that tracing is absolutely necessary for efficient diagnosis of problems of production deployments in the field. PRO-OBJECTS has this capability. The TRACEPERFORMANCE trace bit enables display of various timers used to create execution profiles of PRO-OBJECTS at all stages of execution.

The command line string -trace enables various levels of tracing in various PRO-OBJECT supports classes from the TestDepartmentEmployeePersistence standalone test program.

Setup of OSFORBStream persistent object read, update, insert and delete operations is now complete.

Single Object Read Example

The Fully Qualified Object Access section above outlined how many keys were needed to read a single object. To reiterate, to read a single object one must supply a keyfield for each primary key on each base table which comprises the PRO-OBJECT.

Foreign keys between the tables can be ignored, as they are redundant; that is, a foreign key on a given table is either a foreign key or primary key on its adjacent parent table, Consider the following example from the TestDepartmentEmployeePersistence class:

```
try
{
    orbstream = departmentemployee.readObject (fullyqualifiedkeylist);
}
catch (final OSFORBStreamException e)
{
    sysman.logMessage(CLASSNAME +
        "-E-ORBStreamException, ORB Stream create error Exception,
    e-" +
    e.getMessage( ));
    e.printStackTrace( );
}
```

The orbstream returned by readObject( ) is a "raw" stream and is compressed, encrypted and stringified. As such the stream is ready to be transmitted over whatever media and distribution mechanism. However we are going to process the stream locally in this test class, so we first see if the object was found:

```
// object present ?
if (orbstream.compareTo(NOTFOUND) ! = 0)
{
  // prompt for overwrite
```

NOTFOUND is returned if any of the reads to individual base tables which make up the persistent, relational object are not found.

In this example, the test object was present on the database.

To access each attribute, consider the following code example from TestDepartmentEmployeePersistence:

```
// display object
try
{
    // assemble objects in 2-d grid form
    receiveorbstream =
        new OSFORBStream(sysman, orbstream,
        OSFORBStream.GRIDFORMAT);
}
catch (OSFORBStreamException e)
{
    sysman.logMessage (CLASSNAME +
        "-F-ORBStreamException, OSFORBStream create exception
        (grid)" +
            e.getMessage( ));
    e.printStackTrace( );
}
OSFORBStreamObject object = null;
while (receiveorbstream.hasMoreElements( ) == true)
{
    object = (OSFORBStreamObject) receiveorbstream.nextElement ( );
    for (int i = 0; i < object.attribute_.length; i++)
    {
        sysman.logMessage("-" + fieldnames[i] + "=" +
        object.attribute_[i]);
    }
    // only one object requested, stop here
    break;
}
```

See the following sections on Block Object Reads for a more detailed description of GRIDFORMAT object assembly.

OSFORBStreamObject is the class returned by the implementation of java.util.Enumeration by the OSFORBStream class. Each OSFORBStreamObject contains one object with all redundant foreign key fields eliminated. The attribute_[ ] list contains each attribute of the object.

Output of the above is:

```
1999-01-01 18:01:16 -departmentIDKey=99
1999-01-01 18:01:16 -name=zzzzzzzzzzzzz1
1999-01-01 18:01:16 -locationIDKey=999
1999-01-01 18:01:16 -employeeIDKey=9999
1999-01-01 18:01:16 -lastName=zzzzzzzzzzzzzz1
1999-01-01 18:01:16 -firstName=zzzzzzzzzzzzzzz
1999-01-01 18:01:16 -middleInitial=z
1999-01-01 18:01:16 -jobID=999
1999-01-01 18:01:16 -managerID=9999
1999-01-01 18:01:16 -hireDate=1998-12-04 00:00:00
1999-01-01 18:01:16 -salary=99999.99
1999-01-01 18:01:16 -commission=99999.99
```

Object Block Read Example, Grid Assembly

The Partially Qualified Object Access section above outlined how many keys were needed to read a block of objects. To reiterate, to read a block of objects one must supply a key field for each Primary Key on the top-level parent base table that comprises the PRO-OBJECT.

In the case of the DepartmentEmployee object, the department ID key attribute maps to the only primary key on the DEPARTMENT table in the database. If the Department table had no parent tables, this would be it, yet the locationID column is a foreign key to the LOCATION table. But the LOCATION table is not part of this object, so the locationID field can be ignored in this case, as it is not necessary to qualify the top level parent table, in this case, the DEAPRTMENT table. Some tables require multiple keys to differentiate them and in this case there would be more than one explicit primary key and a value would be needed to perform a fully qualified object read.

Thus only one key is needed to read a block of DepartmentEmployee objects. In this example, we really do not care what specific block of objects we get so a null key list is allocated and created. This is the nullpartiallyqualifiedkeylist passed to the ReadObjects( ) method call below. DEFAULTREADBLOCKSIZE is 8.

```
// request a block of objects and get a basic orbstream back
String orbstream = " ";
try
{
    orbstreamn = departmentemployee.readObjects(
        nullpartiallyqualifiedkeylist, DEFAULTREADBLOCKSIZE);
}
catch (OSFORBStreamException e)
{
    sysman.logMessage(CLASSNAME +
        "-E-ORBStreamException, read object block exception: " +
        e.getMessage( ));
    e.printStackTrace ( );
}
```

The DepartmentEmployeePersistence class catches all OSFDBIOExceptions (hence all exceptions) thrown in the lower level Persistence and DBIO objects and normalizes all those exceptions into OSFORBStreamExceptions. Thus exceptions are standardized at each layer of software (recall the low-level DBIO classes normalized all exceptions and presents OSFDBIO-style exceptions to the next layer up, the Persistence class in this case).

If no objects matching the starting primary key(s) of the top-level parent table are found along with at least one corresponding child record in each child table OBJECTNOTFOUND is set into the "raw" return OSFORBStream. This "raw" orbstream is compressed, encrypted and stringified and is ready for transmission over the desired communications media.

The "raw" OSFORBStream looks like this:

```
1999-01-01 15:40:54   completed stream-|1|6d555b8ea33010bcca1e6032b20d3678a4f9f08
0092460b2864c943b8cf66f7f567df8ede68d43841076cd5afea368f4040043cfae402f867f476b
bbe1505be417c7236ad0e1f060970e00c4c96b577d757ee0c5c08da13e06d678dcfca792782ced4b
69b9731b437eb4d5fb56ede136c0b8a6967050dcb00447b115b8e501c49920ac86ae3af9019dfd65
0804a382469a481eb549e983a31fd8bb18fe141ac9e0cfdf9f1f0a438ce7ae1447e18dcbaa0e0ce
2c57482f09c9f78b2e225633bbc541a4cfd657ddf41567a24a8430762f46125885602410049a6bc8d
bfbb9361d3455561a5b930f2ac1d0f440919c18479695220d1914f87674e1ed4d66a141bc1e7d3bc
28b34915b02b253545d693d34a6ef4bfbe8a0dc51a81317f80451b07736314826318867 6de1628d8
3eb410a76f6971a0c25d4b8bc58d75987a9acd0ffaf317e629dfde772c5277bb894126eb6b7be83d
cb80af3d7a37db6e0d17e748af88ae7420e112cf804bad23ce06a3cba700bc1e8bc08c05c2c68855
fb7d6a379f0e6d9b42e87e72bc3d6fd8141afe659025fe68a7854755d59c85f15ccd9267b62297f4
cf8084bd435555fc2a52d1dfc1e73a79920743c142e39d08e98e4ab10e6b09d3000ff24e5bc546e1
3bcd0b372463859295a9f53f95c55600cf9ac1b35b58fc0ec1fa97f2448130526370d96ae32cec27
9527e9aae95df269fefe174aecbdabe47f53953e754f98df941b6dbee0fcd4ba62027d7b16d9fce4
117862f7795138bf2c6d9231583fcee32947c67bc29073c1b6967fc8bf076f8186ae3ce18b7b7e71
6f37f0909707a1d29574c8d134373f7a83bb898868a38378e5ad3a70e1a67806bad05fcdbfde2608
dff6f1975ba6f65451c5abfe68fed00bb50aa8f8eb3aa4d644cde30f58ed47265dc5363cd353c6cd
7435d7d57065c98b1fdace192e6c4999621afbec8105f7346c51ba342cd3b10d97edde48caf1d3
3b45bac69e0d73828aef6bb7273c5944e27b838894db77235ca8eee2daab8e0f020abd9d3f525ba9
f1fc0c3692317b8a2821b8f172f5a77ce52d38704fa24d2705cc52b039efbaa71dc100f5eab4792d
f2a6e9dd5d1d4f16cd25ae16d4e68aae16236877bd07a7710cfdddbbe1a241b59b57df591ad48e2
e1944a37be97f|57|797,2344,0|
```

-

(Alternately, it would have been possible to throw an exception if no matching objects are found, as is done in many Enterprise JavaBeans we've examined, but for ultra-thin and thin CORBA clients we decided to follow generally-accepted development guidelines and return OBJECTNOTFOUND if no matching objects were present and only throw exceptions when an error or software failure occurs. OSF generated EJBs also follow generally expected guidelines during use of those objects.)

```
// display ?
if (orbstream.equals
(DepartmentEmployeePersistence.OBJECTNOTFOUND) == true)
{
    sysman.logMessage(CLASSNAME + "-I-NoObjects, Objects not
        found");
    return;
}
```

If at least one object is found we can now take the stringified, compressed and encrypted orbstream above and process it. This entails the creation of:

A receive OSFORBStream to stringify, decrypt and decompress the stream shown above Processing the java.util.Enumeration provided by the receive orbstream to hand off the objects and attributes to the requestor.

In this example we want to assemble the objects onto grid format, so we tell the receive OSFORBStream constructor this as the third parameter:

```
// process orbstream
try
{
    // assemble objects in 2-d grid form
    receiveorbstream = new OSFORBStream(sysman, orbstream,
        OSFORBStream.GRIDFORMAT);
}
catch (final OSFORBStreamException ose)
{
    sysman.logMessage (CLASSNAME +
```

-continued

```
        "-E-ORBStreamException, OSFORBStream create exception,
        grid, e-"
+
        ose.getMessage( ));
    ose.printStackTrace( );
}
```

Here we see a major advantage of deferred object assembly. Only the client or the requestor of the PRO-OBJECT knows the desired display format, not the server middleware software or the database. In the example above, the user interface needs the objects in grid format. Note that the other commonly used alternative in business systems is OSFORBStream.TREEFORMAT, so as to format blocks of objects into tree control visual objects in user interfaces, a common requirement easily accomplished deferred object assembly The familiar java.util.Enumeration interface is implemented by the OSFORBStream class to present each object to the client in the format desired by the client. The return object including its ID and its attributes are encapsulated into the OSFORBStreamObject class.

```
object = null;
boolean firstobject = true;
while (receiveorbstream.hasMoreElements( ) == true)
{
    object = (OSFORBStreamobject) receiveorbstream.nextElement ( );
    if (firstobject == true)
    {
        // display object id of the assembled object
        sysman.logMessage (CLASSNAME + "-I-ObjectID, object id is-" + object.id_);
        // display attribute names as pseudo column headers
        for (int i = 0; i < object.attribute_.length; i++)
        {
            System.out.print (fieldnames[i] + " = ");
        }
        System.out.println ("");
        firstobject = false;
    }
    // display attributes
    for (int i = 0; i < object.attribute_.length; i++)
    {
        System.out.print (object.attribute_[i] + " = ");
    }
    System.out.println ("");
}
```

The output of the above is as follows:

```
1999-01-01 15:40:55 TestDepartmentEmployeePersistence-I-ObjectID, object id is-
13
departmentIDKey = name = locationIDKey = employeeIDKey = lastName = firstName =
middleInitial = jobID = managerID = hireDate = salary = commission =
10 = ACCOUNTING = 122 = 7782 = CLARK = CAROL = F = 671 = 7839 = 1985-06-09 00:00:
00 = 2450 = null =
10 = ACCOUNTING = 122 = 7839 = KING = FRANCIS = A = 672 = null = 1985-11-17 00:0
0:00 = 5000 = null =
12 = RESEARCH = 122 = 7569 = ALBERTS = CHRIS = L = 671 = 7839 = 1985-04-06 00:00:
00 = 3000 = null =
12 = RESEARCH = 122 = 7919 = DOUGLAS = MICHAEL = A = 667 = 7799 = 1987-01-04 00:
00:00 = 800 = null =
12 = RESEARCH = 122 = 7916 = ROBERTS = GRACE = M = 669 = 7569 = 1987-01-04 00:00:
00 = 2875 = null =
12 = RESEARCH = 122 = 7799 = FISHER = MATTHEWS = H = 669 = 7569 = 1986-12-12 00:
00:00 = 3000 = 0.0 =
13 = SALES = 122 = 7505 = DOYLE = JEAN = K = 671 = 7839 = 1985-04-04 00:00:00 =
2850 = null =
13 = SALES = 122 = 7950 = JENSEN = ALICE = B = 667 = 7505 = 1987-01-15 00:00:00 =
750 = null =
13 = SALES = 122 = 7555 = PETERS = DANIEL = T = 670 = 7505 = 1985-03-31 00:00:00 =
1250 = 300 =
13 = SALES = 122 = 7557 = SHAW = KAREN = P = 670 = 7505 = 1985-04-02 00:00:00 =
1250 = 1200 =
13 = SALES = 122 = 7600 = PORTER = RAYMOND = Y = 670 = 7505 = 1985-04-15 00:00:0
0 = 1250 = 900 =
14 = OPERATIONS = 122 = 7507 = BAKER = LESLIE = D = 671 = 7839 = 1985-06-10 00:0
0:00 = 2200 = null =
20 = RESEARCH = 124 = 7369 = SMITH = JOHH = Q = 667 = 7902 = 1984-12-17 00:00:00 =
800 = null =
```

-continued

```
20 = RESEARCH = 124 = 7566 = JONES = TERRY = M = 671 = 7839 = 1985-04-02 00:00:0
0 = 2975 = null =
20 = RESEARCH = 124 = 7902 = FORD = JENNIFER = D = 669 = 7566 = 1985-12-03 00:00:
00 = 3000 = null =
20 = RESEARCH = 124 = 7876 = ADAMS = DIANE = G = 667 = 7788 = 1987-01-12 00:00:0
0 = 1100 = null =
20 = RESEARCH = 124 = 7788 = SCOTT = DONALD = T = 669 = 7566 = 1986-12-09 00:00:
00 = 3000 = null =
23 = SALES = 124 = 7506 = DENNIS = LYNN = S = 671 = 7839 = 1985-05-15 00:00:00 =
2750 = null =
23 = SALES = 124 = 7560 = DUNCAN = SARAH = S = 670 = 7506 = 1985-05-31 00:00:00 =
1250 = null =
23 = SALES = 124 = 7564 = LANGE = GREGORY = J = 670 = 7506 = 1985-06-01 00:00:00 =
1250 = 300 =
23 = SALES = 124 = 7954 = MURRAY = JAMES = T = 667 = 7506 = 1987-01-16 00:00:00 =
750 = null =
23 = SALES = 124 = 9992 = zzzzzzzzzzzzzz4 = zzzzzzzzzzzzzz2 = z = 667 = 7506 = 1
998-04-04 00:00:06 = 99999.93 = 99999.99 =
23 = SALES = 124 = 9996 = zzzzzzzzzzzzzz1 = zzzzzzzzzzzzzz1 = z =667 = 7506 = 1
998-09-04 14:10:05 = 99999.99 = 99999.99 =
23 = SALES = 124 = 7789 = WEST = LIVIA = N = 670 = 7506 = 1985-04-04 00:00:00 =
1500 = 1000 =
24 = OPERATIONS = 124 = 7609 = LEWIS = RICHARD = M = 668 = 7507 = 1985-04-16 00:
00:00 = 1800 = null =
30 = SALES = 123 = 7499 = ALLEN = KEVIN = J = 670 = 7696 = 1985-02-20 00:00:00 =
1600 = 300 =
30 = SALES = 123 = 7521 = WARD = CYNTHIA = D = 670 = 7698 = 1985-02-22 00:00:00 =
1250 = 500 =
30 = SALES = 123 = 7654 = MARTIN = KENNETH = J = 670 = 7698 = 1985-09-28 00:00:0
0 = 1250 = 1400 =
30 = SALES = 123 = 7698 = BLAKE = MARION = S = 671 = 7839 = 1965-05-01 00:00:00 =
2850 = null =
30 = SALES = 123 = 7900 = JAMES = FRED = S = 667 = 7698 = 1985-12-03 00:00:00 =
950 = null =
30 = SALES = 123 = 7844 = TURNER = MARY = A = 670 = 7698 = 1985-09-08 00:00:00 =
1500 = 0.0 =
```

It should be apparent to the astute reader that more than DEFAULTREADBLOCKSIZE or 8 objects have been returned. Indeed, 31 rows are displayed above and this is because 31 rows are required to display eight complete objects.

This is not a distinction without a difference. The number of objects is determined by the number of top-level parent rows read not the number of child records to be mated to their corresponding parents. Since the TRACEORBSTREAM bit was set, the following is displayed when the low-level DepartmentDBIO object was assembling the "raw" orbstream:

```
1999-01-01 15:40:54   os.append-1
1999-01-01 15:40:54   os.append-10|ACCOUNTING|122
1999-01-01 15:40:54   os.append-1
1999-01-01 15:40:54   os.append-12|RESEARCH|122
```

-continued

```
1999-01-o1 15:40:54   os.append-1
1999-01-01 15:40:54   os.append-13|SALE5|122
1999-01-01 15:40:54   os.append-1
1999-01-01 15:40:54   os.append-14|OPERATIONS|122
1999-01-01 15:40:54   os.append-1
1999-01-01 15:40:54   os.append-20|RESEARCH|124
1999-01-01 15:40:54   os.append-1
1999-01-01 15:40:54   os.append-23|SALES|124
1999-01-01 15:40:54   os.append-1
1999-01-01 15:40:54   os.append-24|OPERATIONS|124
1999-01-01 15:40:54   os.append-1
1999-01-01 15:40:54   os.append-3O|SALES|123
```

So what happens internally is that 8 Department parent records are read. Then, as a function of the foreign key(s) to the immediate parent table, all matching Employee records are read as is outlined by the following trace entry:

```
1999-01-01 15:40:54 Employee-I-DBWaitTime, keyrange read block time ms-78
1999-01-01 15:40:54   os.append-2|7782|CLARK|CAROL|F|671|7839|1985-06-09
00:00:00
|2450|null|10|2|7839|KING|FRANCIS|A|672|null|1985-11-17
00:00:00|5000|null|10|2
7569|ALBERTS|CHRIS|L|671|7839|1985-04-06
00:00:00|3000|null|12|2|7919|DOUGLAS|MI
CHAEL|A|667|7799|1987-01-04
00:00:00|800|null|12|2|7916|ROBERTS|GRACE|M|669|7569
|1987-01-04 00:00:00|2875|null|12|2|7799|FISHER|MATTHEWS|H|669|7569|1986-12-
12 0
0:00:00|3000|0.0|12|2|7505|DOYLE|JEAN|K|671|7839|1985-04-04
```

-continued

```
00:00:00|2850|null |1
3|2|7950|JENSEN|ALICE|B|667|7505|1987-01-15
00:00:00|750|null|13|2|7555|PETERS|D
ANIEL|T|670|7505|1985-03-31
00:00:00|1250|300|13|2|7557|SHAW|KAREN|P|670|7505|19
85-04-02 00:00:00|1250|1200|13|2|7600|PORTER|RAYMOND|Y|670|7505|1985-04-15
00:00
:00|1250|900|13|2|7507|BAKER|LESLIE|D|671|7839|1985-06-10
00:00:00|2200|null|14
2|7369|SMITH|JOHN|Q|667|7902|1984-12-17
00:00:00|800|null|20|2|7566|JONES|TERRY|
M|671 7839|1985-04-02
00:00:00|2975|null|20|2|7902|FORD|JENNIFER|D|669|7566|1985-
12-03 00:00:00|3000|null|20|2|7876|ADAMS|DIANE|G|667|7788|1987-01-12
00:00:00|1
100|null|20|2|7788|SCOTT|DONALD|T|669|7566|1986-12-09
00:00:00|3000|null|20|2|75
06|DENNIS|LYNN|S|671|7839|1985-05-15
00:00:00|2750|null|23|2|7560|DUNCAN|SARAH|S
|670|7506|1985-05-31
00:00:00|1250|null|23|2|7564|LANGE|GREGORY|J|670|7506|1985-
06-01 00:00:00|1250|300|23|2|7954|MURRAY|JAMES|T|667|7506|1987-01-16
00:00:00|75
0|null|23|2|9992|zzzzzzzzzzzzzz4|zzzzzzzzzzzzzz2|z|667|7506|1998-04-04
00:00:06|
99999.93|99999.99|23|2|9996|zzzzzzzzzzzzzz1|zzzzzzzzzzzzzz1|z|667|7506|1998-
09-0
4 14:10:05|99999.99|99999.99|23|2|7789|WEST|LIVIA|N|670|7506|1985-04-04
00:00:00
|1500|1000|23|2|7609|LEWIS|RICHARD|M|668|7507|1985-04-16
00:00:00|1800|null|24|2
|7499|ALLEN|KEVIN|J|670|7698|1985-02-20
00:00:00|1600|300|30|2|7521|WARD|CYNTHIA
|D|670|7698|1985-02-22
00:00:00|1250|500|30|2|7654|MARTIN|KENNETH|J|670|7698|198
5-09-28 00:00:00|1250|1400|30|2|7698|BLAKE|MARION|S|671|7839|1985-05-01
00:00:00
|2850|null|30|2|7900|JAMES|FRED|S|667|7698|1985-12-03
00:00:00|950|null|30|2|784
4|TURNER|MARY|A|670|7698|1985-09-08 00:00:00|1500|0.0|30
```

Note that child tables are not appended to the "raw" OSFORBStream one record at a time, they are appended in one big chunk for efficiency purposes.

If there had been additional subtables, foreign keys would have been located on the records returned from the DB and a keyrange[ ][ ] list for a keyrange read on the child table the next level down. The records returned would have been appended to the "raw" OSFORBStream and the process repeated until all subtables associated with the child object were read.

This generalized model works for all table interrelationships, no matter how many foreign keys, primary keys or tables are involved in the creation (or insertion, update and delete) of the PRO-OBJECT.

The fact that eight objects were really created becomes more apparent when the same "raw" orbstream is assembled into a format suitable for display in the familiar TreeControl visual graphical object.

Object Block Read Example, Tree Assembly

Here we pass the TREECONTROLFORMAT manifest constant from the OSFORBStream class to the OSFORBStream constructor:

```
// assemble objects and display in treecontrol format
try
{
    // do not join base table objects
    receiveorbstream =
                new OSFORBStream (sysman, orbstream,
            OSFORBStream.TREECONTROLFORMAT);
        }
catch   (OSFORBStreamException e)
    sysman.logMessage ("OSFORBStream Create Exception (tree) " +
        e.getMessage ( ));
    e.printStackTrace ( );
}
```

In this code snippet which follows, each attribute is identified and displayed on a separate output line to simulate what the DepartmentEmployee object would look like in a tree control with all nodes expanded.

```
while   (receiveorbstream.hasMoreElements ( ) == true)
{
    object = (OSFORBStreamObject)   receiveorbstream.nextElement ( );
    sysman.logMessage ("**Object id-" + object.id_);;
```

-continued

```
        for (int i = 0; i < object.attribute__.length; i++)
        {
            sysman.logMessage (" " + object.attribute__[i]);
        }
        String tempname = "";
    }
}
```

Output from the above display/while loop is as follows (indents on object id-2/Employee added with the WinWord editor):

```
**Object id-1
  10
  ACCOUNTING
  122
    ** Object id-2
    7782
    CLARK
    CAROL
    F
    671
    7839
    1985-06-09 00:00:00
    2450
    null
    10
    **Object id-2
    7839
    KING
    FRANCIS
    A
    672
    null
    1985-11-17 00:00:00
    5000
    null
    10
**Object id-1
  12
  RESEARCH
  122
    **Object id-2
    7569
    ALBERTS
    CHRIS
    L
    671
    7839
    1985-04-06 00:00:00
    3000
    null
    12
  <snip> 5 objects removed for brevity,
  departments 13, 14, 20, 23 and 24
**Object id-1
  30
  SALES
  123
    **Object id-2
    7499
    ALLEN
    KEVIN
    J
    670
    7698
    1985-02-20 00:00:00
    1600
    300
    30
  **Object id-2
    7521
    WARD
```

-continued

```
    CYNTHIA
    D
    670
    7698
    1985-02-22 00:00:00
    1250
    500
    30
  **Object id-2
    7654
    MARTIN
    KENNETH
    J
    670
    7698
    1985-09-28 00:00:00
    1250
    1400
    30
  **Object id-2
    7698
    BLAKE
    MARION
    S
    671
    7839
    1985-05-01 00:00:00
    2850
    null
    30
  **Object id-2
    7900
    JAMES
    FRED
    S
    667
    7698
    1985-12-03 00:00:00
    950
    null
    30
  **Object id-2
    7844
    TURNER
    MARY
    A
    670
    7698
    1985-09-08 00:00:00
    1500
    0.0
    30
```

Thus we see the first level nodes are all eight Department records. Expansion of this node reveals the Employee records for that Department.

Refer to subsequent sections for a detailed description of all elements of the OSFORBStream shown above.

Persistent, Relational Object Insertion Example

Perhaps by comparison, adding a new object to the database is relatively easy: Create a transmit OSFORBStream of type INSERTSTREAM, specify the ObjectID and a value for each attribute in the new object.

Since ObjectServerFactory knows the datatype, precision and scale of each column, it writes into the TestDepartmentEmployeePersistence class a list of arbitrarily high values that are not likely to exist in the source database:

```
// array of new values for insertion testing
String [] insertvalues =
{
    // one value for each column in the table, maximum field lengths
    // are tested and fields are typed appropriately
    "99" ,
    "zzzzzzzzzzzzzz",
    "999" ,
    "9999" ,
    "zzzzzzzzzzzzzzz" ,
```

-continued

```
    "zzzzzzzzzzzzzzz" ,
    "z" ,
    "999" ,
    "9999" ,
    "1998-12-24" ,
    "99999.99" ,
    "99999.99" ,
};
```

Once the new values are obtained, we create an insert OSFORBStream of type transmit:

```
// insertion via OSFORBStream interface
boolean inserterror = false;
// perform object insertion
try
{
    // instantiate orbsream object
    transmitorbstream = new OSFORBStream (sysman,
        OSFORBStream.INSERTSTREAM,
        new Integer (ObjectID._DepartmentEmployeeObject).toString ( ),
        insertvalues);
```

And then execute the insertObject( ) method of the persistence class, passing the OSFORBStream object instantiated above in the previous step.

```
    // let 'er rip
    departmentemployee.insertObject (transmitorbstream.toString ( ));
}
catch (final OSFDBIOException dbioe)
{
    sysman.logMessage (CLASSNAME +
        "-E-DBIOException, exception during insert, e-" +
        dbioe.getMessage ( ));
    dbioe.printStackTrace ( );
    inserterror = true;
}
catch (final OSFORBStreamException ose)
{
    sysman.logMessage (CLASSNAME +
        "-E-ORBStreamException, stream insert exception, e-" +
    ose.getMessage ( ));
    ose.printStackTrace ( );
    inserterror = true;
}
if (inserterror == false)
{
    sysman.logMessage (CLASSNAME + "-S-Inserted, Insert succeeded") ;
}
```

Two types of java.lang.Throwable-derived exceptions can be intercepted:

OSFDBIOException if a runtime insertion error occurs resulting in a rollback of any partial object insertions OSFORBStreamException if an invalid format transmit orbstream is passed to the insertObject( ) method.

Given that tracing is still enabled for OSFORBStreams and the Persistence and DBIO objects, the following is displayed during execution of the above:

```
1999-01-01 18:40:52   stream before encryption-
|1|13|5|12|99|zzzzzzzzzzzzzz|999|9
999|zzzzzzzzzzzzzzz|zzzzzzzzzzzzzzz|z|999|9999|1999-01-
01|99999.99|99999.99|7|0|8
1999-01-01 18:40:52   completed stream-
|1|3334ae31ad3134aab1b4aca9420140114b10461
7afc2e423941a5a5a5ae81a1ae91a9980f9967a500930c3bcc6a0c60200|34|0,0,0
|
1999-01-01 18:40:52 Assembling object-313
1999-01-01 18:40:52
com.tricoron.osftest.server.DepartmentEmployeePersistence-I-
StartTransaction, begin update
1999-01-01 18:40:52 Department-I-SQLStatement, About to execute-
INSERT INTO DEPARTMENT VALUES  ( '99' ,  'zzzzzzzzzzzzzz' ,  '999' )
1999-01-01 18:40:52 Employee-I-SQLStatement, About to execute-
INSERT INTO EMPLOYEE VALUES  ( '9999' ,  'zzzzzzzzzzzzzzz' ,
'zzzzzzzzzzzzzzz' ,  'z' ,  '999' ,
    '9999' ,  TO_DATE('1999-01-01 00:00:00.0',  'YYYY/MM/DD
HH24:MI:55:.') ,  '9999
9.99' ,  '99999.99' ,  '99' )
1999-01-01 18:40:52 DepartmentEmployeePersistence-I-EndTransaction,
commit complete
1999-01-01 18:40:52 TestDepartmentEmployeePersistence-S-Inserted,
insert succeeded
```

Refer to subsequent sections for a detailed description of all elements of the Insert OSFORBStream.

Persistent, Relational Object Update Example

The following code snippet updates the object just inserted in the previous example. By taking the insertattributes[ ] list of new values, we locate the key fields and modify a couple of attributes in the object just inserted.

Update synopsis:

- create a transmit OSFORBStream of type UPDATESTREAM
- specify the ObjectID of the object to be updated
- specify a fully-qualified key list
- specify the attributeid, current value in the DB and new attribute value for each attribute to be updated and a value for each attribute in the new object
- pass the UPDATESTREAM to the .updateObject( ) method of the underlying Persistence class, DepartmentEmployeePersistence in this example Here are the relevant excerpts from TestDepartmentEmployeePersistence:

Create a transmit OSFORBStream of type UPDATESTREAM, using a fully-qualified keylist and specifying the ObjectID of the DepartmentEmployee object:

```
// instantiate orbsream object
transmitorbstream = new OSFORBStream (sysman,
    OSFORBStream.UPDATESTREAM,
    new Integer (ObjectID._DepartmentEmployeeObject) .toString ( ),
    fullyqualifiedkeylist);
// add a few attributes to the update stream
int updatecount = 0;
for (int i = 0; i < insertvalues.length; i++)
{
    // key field ?
    if (keyfield [i] == true)
    {
        // try next attribute as we modify only data attributes,
        // not object access keys
        continue;
    }
    // add attributeid, current value and new attribute
    //   value to update orbstream
    // again, ensure max column length is not exceeded
    String newvalue =
        insertvalues [i] .substring(
            0, insertvalues [i] .length ( ) - DATAMODIFACATIONSUFFIX.length ( ));
```

Specify the attributeID, current value in the DB and new attribute value for each attribute to be updated

```
// add to orbstream
transmitorbstream.appendAttribute (
    i, insertvalues [i] , newvalue + DATAMODIFACATIONSUFFIX) ;
// done ?
```

-continued

```
if (++updatecount == UPDATEATTRIBUTECOUNT)
{
    // yup
```

-continued

```
        break;
    }
}
```

Pass the UPDATESTREAM to the updateObject( ) method of the underlying Persistence class:

```
// done adding attibutes to update stream
transmitorbstream.terminate ( );
// let 'er rip
departmentemployee.updateObject (transmitorbstream.toString ( ));
}
catch (OSFDBIOException dbioe)
{
    sysman.logMessage (CLASSNAME +
        "-E-DBIOException, exception during update, e-" +
        dbioe.getMessage ( ));
    dbioe.printStackTrace ( );
    updateerror = true;
}
catch (OSFORBStreamException ose)
{
    sysman.logMessage (CLASSNAME +
        "-E-ORBStreamException, Stream delete exception, e-" +
        ose.getMessage ( ));
    ose.printStackTrace ( );
    updateerror = true;
}
if (updateerror == false)
{
    sysman.logMessage (CLASSNAME + "-S-Updated, update succeeded") ;
}
```

During execution of the above, the following output is produced:

```
1999-01-01 18:40:52    stream before encryption-
|1|13|4|3|99|999|9999|7|1|zzzzzzzz
zzzzzz|zzzzzzzzzzzzzz1|4|zzzzzzzzzzzzzzz|zzzzzzzzzzzzzzz1|2|8
1999-01-01 18:40:52    completed stream-
|1|3334ae31a931aeb1b4042230b6ac31af31aca94201a85c43a08e2a7c0a802a8c6a2c00|4
8|0,0,0|
1999-01-01 18:40:52 DepartmentEmployeePersistence-I-UpdateObject, begin
update object
1999-01-01 18:40:52 DepartmentEmployeePersistence-I-startTransaction, begin
update
1999-01-01 18:40:52 DepartmentEmployeePersistence-I-
BaseTableupdate, on base table ti-0 c-1 cv-zzzzzzzzzzzzzz nv-zzzzzzzzzzzzz1
1999-01-01 18:40:52 Department-I-Update, About to update a-1
c-zzzzzzzzzzzzz n-zzzzzzzzzzzzz1
1999-01-01 18:40:52 Employee-I-SQLStatement, About to execute- SELECT
t11.DEPARTMENT_ID, t11.NAME, t11.LOCATION_ID FROM    DEPARTMENT t11    WHERE
DEPARTMENT_ID = '99' and LOCATION_ID = '999'    ORDER BY    t11.DEPARTMENT_ID
ASC    ,    t11.LOCATION_ID ASC
1999-01-01 18:40:53 DepartmentEmployeePersistence-I-
BaseTableUpdate, on base table ti-1 c-1 cv-zzzzzzzzzzzzzzz nv-
zzzzzzzzzzzzzz1
1999-01-01 18:40:53 Employee-I-Update, About to update a-1 c-
zzzzzzzzzzzzzzz n-zzzzzzzzzzzzzz1
1999-01-01 18:40:53 Employee-I-SQLStatement, About to execute- SELECT
t13.EMPLOYEE_ID, t13.LAST_NAME, t13.FIRST_NAME, t13.MIDDLE_INITIAL,
t13.JOB_ID, t13.MANAGER_ID, t13.HIRE_DATE, t13.SALARY, t13.COMMISSION,
t13.DEPARTMENT_ID FROM EMPLOYEE t13    WHERE EMPLOYEE_ID = '9999' and
DEPARTMENT_ID = '99'    ORDER BY t13.DEPARTMENT_ID ASC
1999-01-01 18:40:53 DepartmentEmployeePersistence-I-UpdateComplete, on base
table ti-0
1999-01-01 18:40:53 Department-I-SQLStatement, About to execute- UPDATE
DEPARTMENT SET NAME =    'zzzzzzzzzzzzz1'    WHERE DEPARTMENT_ID = '99' and
LOCATION ID = '999'
1999-01-01 18:40:53 DepartmentEmployeePersistence-I-UpdateComplete, on base
```

-continued

```
table ti-1
1999-01-01 18:40:53 Employee-I-SQLStatement, About to execute- UPDATE
EMPLOYEE SET LAST_NAME = 'zzzzzzzzzzzzzz1' WHERE EMPLOYEE_ID = '9999' and
DEPARTMENT_ID = '99'
1999-01-01 18:40:53 DepartmentEmployeePersistence-I-EndTransaction, commit
complete
1999-01-01 18:40:53 TestDepartmentEmployeePersistence-S-Updated, update
succeeded
```

Refer to subsequent sections for a detailed description of all elements of the Update OSFORBStream.

Persistent, Relational Object Delete Example

The following code snippet deletes the object just updated in the previous update example. All that is needed to delete an object is a fully qualified key list and an ObjectID. The fully qualified key list and ObjectID from the update example are used here to delete the object, restoring the DB tables to their original state before this test program was executed.

Delete synopsis:

create a transmit OSFORBStream of type DELETESTREAM specify the ObjectID of the object to be deleted specify a fully-qualified key list pass the DELETESTREAM to the deleteObject( ) method of the underlying Persistence class, DepartmentEmployeePersistence in this example Here are the relevant excerpts from TestDepartmentEmployeePersistence:

Create a transmit OSFORBStream of type DELETESTREAM, using a fully-qualified keylist and specifying the ObjectID of the DepartmentEmployee object:

```
try
{
    // instantiate orbsream object of type delete
    transmitorbstream = new OSFORBStream (sysman,
        OSFORBStream.DELETESTREAM,
        new Integer (ObjectID._DepartmentEmployeeObject) .toString ( ) ,
        fullyqualifiedkeylist) ;
```

Pass the DELETESTREAM to the deleteObject( ) method of the underlying Persistence class:

```
    departmentemployee.deleteObject (transmitorbstream.toString ( ));
}
catch (final OSFDBIOException dbioe)
{
    sysman.logMessage (CLASSNAME +
        "-E-DBIOException, exception during delete, e-" +
        dbioe.getMessage ( ));
    dbioe.printStackTrace ( ) ;
    deleteerror = true;
}
catch (OSFORBStreamException ose)
{
    sysman.logMessage (CLASSNAME +
        "-E-ORBStreamException, stream delete exception, e-" +
        ose.getMessage ( ));
    ose.printStackTrace ( );
    deleteerror = true;
}
if (deleteerror == false)
{
    sysman.logMessage (CLASSNAME + "-S-Deleted, delete succeeded") ;
}
```

The output written to standard output from the above example is as follows:

```
Delete test object? (y/n) : y
1999-01-01 20:52:10   os.append-13
1999-01-01 20:52:10   os.append-3
1999-01-01 20:52:10   os.append-99
1999-01-01 20:S2:10   os.append-999
1999-01-01 20:52:10   os.append-9999
1999-01-01 20:52:10   stream before encryption-|1|13|6|3|99|999|9999|7|0|8
1999-01-01 20:52:10   completed stream-
|1|3334ae31ab31aeb1b4042230b6ac31af31a8b10000|4|0,0,0|
1999-01-01 20:52:10 Assembling object-313
1999-01-01 20:52:10 DepartmentEmployeePersistence-I-
StartTransaction, begin update
1999-01-01 20:52:10 Employee-I-SQLStatement, About to execute- SELECT t16.EMPLOY
EE_ID, t16.LAST_NAME, t16.FIRST_NAME, t16.MIDDLE_INITIAL, t16.JOB_ID, t16.MANAGE
R_ID, t16.HIRE_DATE, t16.SALARY, t16.COMMISSION, t16.DEPARTMENT_ID FROM   EMPLOYE
E t16   WHERE EMPLOYEE_ID = '9999' and DEPARTMENT_ID = '99' ORDER BY
t16.DEPARTMENT_ID ASC
1999-01-01 20:52:10 Employee-I-SQLStatement, About to execute- DELETE FROM
EMPLOYEE WHERE EMPLOYEE_ID = '9999' and DEPARTMENT_ID = '99'
1999-01-01 20:52:10 Employee-I-SQLStatement, About to execute- SELECT
t18.DEPARTMENT_ID, t18.NAME, t18.LOCATION_ID FROM   DEPARTMENT t18   WHERE
DEPARTMENT_ID = '99' and LOCATION_ID = '999'   ORDER BY   t18.DEPARTMENT_ID ASC   ,
t18.LOCATION_ID ASC
1999-01-01 20:52:10 Department-I-SQLStatement, About to execute- DELETE FROM
DEPARTMENT WHERE DEPARTMENT_ID = '99' and LOCATION_ID = '999'
1999-01-01 20:52:10 com.tricoron.osftest.server.DepartmentEmployeePersistence-I-
    EndTransaction, commit complete
    1999-01-01 20:52:10 Department-I-DBWaitTime, delete time ms-32
    1999-01-01 20:52:10 TestDepartmentEmployeePersistence-S-Deleted, delete
    succeeded
```

The astute reader will note:

Table records are read before the deletes are issued. This is because of the Optimistic Locking scheme employed in OSF-built PRO-OBJECT backend support classes. It is quite possible that one end-user could delete one or more of the base table records while another end-user has just the same object (or component of the object) in his or her browser being viewed. Thus if a pre-read fails, an OSFDBIOException is thrown.

Table records are deleted from the lowest, bottom-level child table up to the top-level parent. Otherwise constraint violations could occur.

Optionally, depending on security requirements, the keys of the object to be deleted are compressed and encrypted by default; this option can be changed or overridden as necessary.

Refer to subsequent sections for a detailed description of all elements of the Update OSFORBStream.

Optional Delete of Test Objects

The first line in the above example is:

```
Delete test object? (y/n): y
```

It is necessary for a through test cycle of all Persistence classes to, for a short period of time, leave certain database records in the database to enable other TestPersistence classes to execute correctly. This is because constraint violations will be thrown by the underlying RDBMS.

Consider the case of this example:

TestDepartmentEmployeePersistence. The DEPARTMENT table has a foreign key to the LOCATIONID column of the LOCATION table. Thus, if the TestDepartmentEmployeePersistence program is run first, the insertObject( ) method will fail because the parent LOCATION record with record key '999' will not be in the database. Oracle will throw a constraint violation and the insert will fail.

However, if TestLocationPersistence is first run and no is the reply to the interrogation Delete test object? (y/n):, then the LOCATION DB record with key '999' will be left in the DB. Then any TestXxxYyyyPersistence classes that rely upon parent records being present will execute correctly.

The correct procedure to follow to properly exercise all of the TestXxxYyyPersistence relational <-> object translation classes and underlying DBIO routines is to:

1. Run all TestXxxPersistence standalone test programs for the PRO-OBJECTS, which contain only one base table and run them top-down. That is first run the TestXxxPersistence programs for tables, which do not contain any foreign keys. Answer n to the interrogation Delete test object? (y/n):
2. Then run each TestXxxYyyPersistence test program. An Answer n to the interrogation Delete test object? (y/n):
3. Then rerun the single-table object TestXxxPersistence programs executed in step 1 above. Specify y to remove the objects after execution of the test.

ORBStreams Through IIOP or RMI

Use of ORBStreams in a distributed, remote object class is exactly the same as shown above in the Persistence class example. This is because the appropriate server implementation object (CORBA) or the javax.ejb.EntityBean-derived component server-side class uses the same Persistence interface as described above, providing a most practical, efficient and coherent separation between relational <-> object translation and the desired network transport scheme.

The OSFORBStream is wrapped in a String datatype provided by the underlying object transport. This works nicely because, after the OSFORBStream is compressed and encrypted, it is then stringified into hex and suitable for transport as a string of whatever protocol and media.

The client-end or requestor then makes the appropriate OSFORBStream request and injects the request into the underlying network transport. The client-end or requestor then blocks and waits (in the case of an synchronous persistent operation remote operation) or sets a reply event and carries on (asynchronous mode, very handy as it does not block import Java threads, such as the AWT thread).

The same examples as in the Persistence example above will now be demonstrated using OrbixWeb and the contents of each OSFORBStream '|'-delimited field described in detail. Be advised that this detail is hidden away from the developer since these remote persistent relational object method calls and event handlers are buried in the Java Bean component, which encapsulates the PRO-OBJECT. The developer only has to "wire" the events, methods and properties together using a JavaBean-aware IDE. However, if a developer desires to either understand the generated code exported by the IDE or desires to make a CORBA PRO-OBJECT request in server middleware (in a aserver-side only application with no GUI for example), demonstration of the Beans.instantiate( ) method and the underlying PRO-OBJECT access methods will prove informative and useful.

As should now be readily apparent, the vertical bar character '|' (Hex x'7c' decimal 124) is used to delimit control fields, objects and attributes in orbstreams.

However it is quite possible for this vertical bar character to naturally appear as data on a database record or for an end-user to type this character into a TextArea. In both of these cases, the orbstream delimiter would be in the data segment of the OSFORBStream.

Does this cause confusion in the OSFORBStream class when processing receive orbstreams? No, not at all.

Each attribute from a database table or user input field eventually ends up in the OSFORBStream. AppendAttribute( ) method:

```
public void appenAttribute (String_attribute)
{
    // if a delimiter is encountered, add an ajacent delimiter which
    // will be removed by the ORB Stream parser on the receiving end
    // null checks first
    if (_attribute == null)
    {
        append (NULLATTRIBUTE) ;
        return;
    }
    if (_attribute.length ( ) == 0)
    {
        append (NULLATTRIBUTE) ;
        return;
    }
    // scan for delims, if found replace delimiter
    _attribute.replace (STREAMDELIMITER, DELIMITERINSTREAM) ;
    append (_attribute) ;
}
```

Note the call to the java.lang.String.replace( ) method. Here any '|' characters are replaced by a character which can not appear in database tables or be typed in at the keyboard. Specifically this is a hex x'7e' byte or in binary b'01111110'.

When a receive orbstream is built, the following occurs immediately, after the stream is decrypted and a java.util.StringTokenizer object executed to break apart the OSFORBStream (ast is the attribute string tokenizer object):

```
// replace delimiters in-stream
String [] a = new String [count] ;
attribute_ = new String [count] ;
int ix = 0 ;
while (ast.hasMoreElements ( ) == true)
{
    a [ix] = ast.nextToken ( ) ;
    attribute_[ix] = a [ix].replace (DELIMITERINSTREAM, STREAMDELIMITER) ;
    ix++;
}
```

ORBStreams On-The-Wire

This section describes in detail how OSFORBStreams are written out onto the underlying network hardware. For brevity and readability, the blocksize for block object reads has been reduced from 8 in the examples above to 2.

The OSF OSFORBStream Delimiter and 'BitStuffing'

The following sections describe in detail the layout of each type of OSFORBStream.

Update OSFORBStream Layout

The layout of an uncompressed, unencrypted OSFORBStream.UPDATESTREAM is:

|SOS|OID|SSA, USERID, OPTDBPW|UPDATEARGCOUNT (n)|UA1|UA2| . . . UAn|EID +
|AID1|CVAL1|NVAL1|AID2|CVAL2|NVAL2|AIDn|CVALn|NVALn|AVCOUNT +
|EOS|ENCRYPT|STATS|

Where:

SOS is STARTORBSTREAM character

OID is the object ID

SSA is STARTSEARCHARGUMENTS character

USERID,OPTDBPW are the userid and optional password for RDBMS authentication

UPDATEARGCOUNT is the object search arg/key count which follows (n)

UA1 is the first update arg/object key, UA2 . . . n are the second through n keys EID is an END STREAM ID byte

|AID|CVAL|NVAL are attribute ID, old/Current Value and New Value triplets

AVCOUNT is the proceeding attribute/currentvalue/newvalue count

EOS is the End of Stream character

ENCRYPT is the random key used to encrypt the data after compression

STATS are in the form d,p,s RDMBS wait time in ms, persistence time in ms and total server time in ms. Each are cumulative, i.e. persistence time includes RDMBS time Updates are bi-directional as they are used for notifying subscribed clients of published updates.

Delete OSFORBStream Layout

The layout of an uncompressed, unencrypted OSFORBStream.DELETESTREAM is:

|SOS|OID|SDA, USERID, OPTDBPW|SEARCHARGCOUNT (n)|SSA1|SSA2| . . . SSAn|
EID|0|EOS|ENCRYPT|STATS|

Where:

SOS is STARTORBSTREAM character

OID is the object ID

SDA is STARTDELETEARGUMENTS byte

USERID,OPTDBPW are the userid and optional password for RDBMS authentication

SEARCHARGCOUNT is the object search arg/key count which follows (n)

SSA1 is the first search arg/object key, SSA2 . . . n are the second through n keys EID is an END STREAM ID byte EOS is the End of Stream character ENCRYPT is the random key used to encrypt the data after compression STATS are in the form d,p,s RDMBS wait time in ms, persistence time in ms and total server time in ms. Each are cumulative, ie persistence time includes RDMBS time OSFORBStream.DELETESTREAMs are bidirectional as well as they inform a client that an object for which the client has interest no longer exists or the subscription contract has terminated for that particular object.

Insert OSFORBStream Layout

The layout of an uncompressed OSFORBStream.INSERTSTREAM is:

|SOS|OID|SIA, USERID, OPTDBPW|ARGCOUNT (n)|IA1|IA2| . . . IAn|EID|0|EOS|ENCRYPT|STATS|

Where:

SOS is STARTORBSTREAM character

OID is the object ID

SIA is STARTINSERTARGUMENTS byte

USERID,OPTDBPW are the userid and optional password for RDBMS authentication

ARGCOUNT is the attribute count which follows(n)

IA1 is the first insertion attribute, IA2 . . . n are the second through n attributes EID is an END STREAM ID byte EOS is the End of Stream character ENCRYPT is the random key used to encrypt the data after compression STATS are in the form d,p,s RDMBS wait time in ms, persistence time in ms and total server time in ms. Each are cumulative, i.e. persistence time includes RDMBS time OSFORBStream.INSERTSTREAMs are unidirectional—they flow from the requestor/client toward the database in all cases.

Object/ObjectBlock OSFORBStream Layout

Finally, the most complex are the object block streams which may contain a single object or multiple objects and because these streams contain metadata about the objects used for final assembly of the objects in the format desired by the requestor.

```
|SOS|NOID|SID, USERID, OPTDBPW|OIDCOUNT (n) +
|OID1=AC1,AACE1,AACE2, . . . AACEn|OID2=AC2,EME1,KME2 . . . , KMEn +
| . . . OIDn=ACn, KME1, KME2 . . . , EMEn|EID +
|OID1|A|A|A|OID2|A|A|A|A|A|A|OID2|A|A|A|A|A|A|OID2|A|A|A|A|A|A . . . +
|OIDn|A|A|OIDn|A|A|OIDn|A|A|OIDn|A|A +
|OCOUNT|EOS|ENCRYPT|STATS|
```

SOS is STARTORBSTREAM character

NOID means there is no object id at this location in the stream

SID is STARTOBJECTIDS character indicating an object read return packet

USERID,OPTDBPW are the userid and optional password for native RDBMS authentication OIDCOUNT is the object id count which follows (n)

OIDn is an Object ID which maps to the OSF-generated ObjectID enumeration for application objects and Onn for OSF Internal objects.

OID1 is this object ID and OID2 . . . n is the derivation of the object, IE in IDL terms OID1:OID2, OID3, OIDn =ACn is the attribute count for that given object id AACE1,AACE2, . . . AACEn are the attribute access control elements for the object, n is the attribute count of the primary, final assembled object: OID1. These access elements are set by OSF's fine-grained authorization scheme the client/requestor which attributes a given authenticated end-user can access. Where access is not permitted, the attributes will not show up at all as though they did not exist.

KME1 . . . n are the key map elements for the base db tables OID2 . . . n which describe primary keys, datafields and foreign key relationships to adjacent/parent tables OID1|A|A|A|A is the Object ID and attribute/member/instance data. The data for a given base table is contiguous.

OCOUNT is the proceeding object count

EID is an END STREAM ID byte

EOS is the End of Stream character

ENCRYPT is the random key seed sequence used to encrypt the data after compression STATS are in the form d,p,s RDMBS wait time in ms, persistence time in ms and total server time in ms. Each are cumulative, i.e. persistence time includes RDMBS time Block object streams are unidirectional and flow only from the object servers toward the client or requestor.

SUPPORT CLASS ORGANIZATION

This section is reserved for important classes not built by OSF but used to support the various runtime environments. Examples of these classes are:

The Registry class contains all of the parameters which are unique to a given customer application. Database connect parameters and driver information, default database server IP addresses, initial object-> base table and column mapping parameters and basic rules edit parameters are contained in the Registry class. Also, a few parameters that were initially manifest constants were moved out of the code into the Registry so the values could be changed without recompiling the application modules.

The OSFControlServlet class is the servlet that invokes the OSFSecurity object to validate logins, perform runtime authorization and to switch the browser context from servlet to servlet.

OSFPickListBuildThread is the class that scans each database table to construct default edit rules and to build lists of possible pick list candidates.

OSFPickListBuildThread Class

This rather unique class is used to invert a database in the most efficient manner possible.

Database Inversion is a technique where a given column is reduced to a list of unique values. Such a list is known in software engineering parlance as an Inverted List. RDBMS management systems maintain inverted lists of all tables and segments to speed up inquiries, but some do not. The OSFPickListBuildThread implements this in a vendor-independent manner.

Most relational databases, by design, do not internally maintain inverted lists, so we have to create them with the OSFPickListBuildThread class.

Objectives of a Database Inversion

1. Find every unique column value in every database table for use in picklists and internationalized resource bundles
2. Narrow edit rules so as to not degrade the quality of data which exists in a given production relational database.

Generalized Design

What is unique about the OSFPickListBuildThread class is how one generalized object can read and properly process every table and column in any database, no matter What the definition of the tables and columns.

```
/** scans a db table, essentially inverting the table, returning a
    string of pick list candidates and narrowing edit rules based on
    data observed in the table */
package com.tricoron.OSFv13;
```

Note the wildcarded format import statements not used, example: import java.util.* is not congruent with generally accepted best practices.

```
import java.util.Hashtable;
import java.util.Vector;
import java.util.Enumeration;
```

Generic database access class declarations, used to implement vendor independence:

```
import com.roguewave.jdbtools.v2_0.jdbc.JDBCManager;
import com.roguewave.jdbtools.v2_0.Selector;
import com.roguewave.jdbtools.v2_0.Connection;
import com.roguewave.jdbtools.v2_0.Reader;
import com.roguewave.jdbtools.v2_0.DBTable;
import com.roguewave.jdbtools.v2_0.Column;
import com.roguewave.jdbtools.v2_0.Result;
import com.roguewave.jdbtools.v2_0.ResultTable;
import com.roguewave.jdbtools.v2_0.DatabaseException;
import com.roguewave.jdbtools.v2_0.LoginFailureException;
```

Data normalization and utility classes:

```
import com.tricoron.OSFv12.OSFSystemManagement;
import com.tricoron.OSFv12.OSFDBIOException;
import com.tricoron.O5Fv13.OSFMember;
import com.tricoron.OSFv13.OSFBaseTable;
import com.tricoron.O5Fv13.OSFDBIOObject;
import com.tricoron.OSFv13.OSFORBStream;
```

A good example of when to use multithreading is here. It would take a Long Time to scan each database table on at time. So we instantiate a Thread object for each table and invoke this thread code, so note OSFPickListBuildThread implements the Runnable interface. This way, while one thread is waiting for a database network-level round trip to complete, the result set in a database response can be processed in parallel. A multiple CPU machine can in fact process an entire database quite efficiently.

```
public class OSFPickListBuildThread extends
Selector implements Runnable
{
    private final static int BLOCKSIZE = 1024;
        private final static int VALUELISTINITIALBUFFERSIZE = 128;
        Thread   thread_ = null;
```

```
        String   dbname_ = "";
        Connection connection_ = null;
        private String    CLASSNAME = this.getClass( ).getName( );
        private int    maxvalues_ = 0;
        private int    maxvaluelength_ = 0;
        private int    statuscount_ = 0;
        private String   outlist_ = null;
        private OSFBaseTable table_ = null;
        OSFSystemManagement sysman_ = null;
        public OSFPickListBuildThread (OSFSystemManagement _sysman,
           OSFBaseTable _table, String _maxvalues,
           String _maxvaluelength, String _statuscount)
        {
           sysman_ = _sysman;
           table_ = _table;
```

The maxvalues_ and maxvaluelength_ instance vars control what is selected as a picklist candidate and what is rejected.

Consider a database column with a list of addresses. This column would be eliminated in two ways:

1. As soon as the first column value is found which was longer than maxvaluelength_, subsequent record reads would not examine this column. Default is 8 bytes for the maximum length of a pick list value.
2. As soon as maxvalues_ addresses are encountered, subsequent record reads do not examine this column. Default is 64 unique values in a coumn for a given picklist.

If all columns in a given table have exceeded maxvalues_ or maxvaluelength_, the thread for a given database table terminates.

```
           maxvalues_ = Integer.parseInt(_maxvalues);
           maxvaluelength_ = Integer.parseInt(_maxvaluelength);
           statuscount_ = Integer.parseInt(_statuscount);
        }
```

The Java Runnable interface implementation follows.

```
        public void start( )
        {
           if (thread_ = = null)
           {
              thread_ = new Thread(this, CLASSNAME);
              thread_.setPriority(Thread.NORM_PRIORITY - 1);
              thread_.start( );
           }
        }
        public void run( )
        {
           // start message
           sysman_.logMessage (CLASSNAME + "-I-PickListBuildThreadStart, scanning table-" +
              table_.getName( ));
           int recordcount = 0;
           // thread initialisation
           OSFDatabase database = table_.getOwningDatabase( );
           int iowner = table_.getOwner( );
           OSFTableOwner owner = database.getOwnerObject (iowner);
           String ownername = owner.getUserName( );
           dbname_ = database.getAccessDBName (ownername);
           Vector memberlist = table_.getMemberList( );
           int columncount = memberlist.size( );
           Hashtable [] hashtable = new Hashtable [columncount];
           OSFMember [] member = new OSFMember [columncount];
```

-continued

```
Column [ ] column = new Column [columncount];
String [ ] columnname = new String [columncount];
try
{
      // get connection object for data access
      connection__ = sysman__.getConnectionFromConnectionPool (dbname__);
      // create table object
      DBTable columnobjects = new DBTable (table__.getName( ));
      // create column objects and a value hashtables
      for (int i = 0; i < columncount; i++)
      {
            // init hastable
            hashtable [i] = new Hashtable(maxvalues__);
            // set up column and related objects . . .
            member[i] = (OSFMember) memberlist.elementAt(i);
            columnname[i] = new String (member[i].getColumnName( ));
            column[i] = new Column (columnname[i]).setTable(columnobjects) ;
            // . . . and add column to select list
            addToSelectList(column [i]);
      }
      // place generated SQL statement in string for IDE examination
      String tempname = this.toString (connection__.getPhraseBook( ));
      System.out.println (“select is-” + tempname);
      // execute and process result table and reader objects
      Result result = execute (connection__);
      ResultTable resulttable = null;
      Reader reader = null;
      // result set object created ?
      if (result = = null)
      {
            // no, issue warning and bail
            sysman__.logMessage (CLASSNAME + “-W-NullResultObject,   No records found ” +
                  “in table-” + table__.getName( ));
            return;
      }
      // pricess result object
      while (result.next( ) = = true)
      {
            resulttable = result.getResultTable( );
            reader = resulttable.getReader( );
            // get entry in result set and determine type of object acquired
            if (reader.nextRow( ) = = false)
            {
                  // all records read
                  break;
            }
            while (reader.nextRow( ) = = true)
            {
                  recordcount++ ;
                  if (recordcount % statuscount__ = = 0)
                  {
                        // completion message
                        sysman__.logMessage (CLASSNAME + “-I-PickListBuildThreadStatus, at record-” +
                              recordcount + “ in table-” + table__.getName( )) ;
                  }
                  // check each value in each column
                  for (int i = 0; i < columncount; i++)
                  {
                        // is hashtable valid for this column
                        if (hashtable[i] != null)
                        {
                              // has value count in column been exceeded ?
                              if (hashtable[i] .size( ) > maxvalues__)
                              {
                                    // yes, next column
                                    hashtable[i] = null;
                                    continue;
                              }
                              // get column from results set, normalise to a string
                              String field = reader.getString (columnname [i]);   // a mutable stringbuffer ?
                              // valid field in db column ?
                              if (field = = null)
                              {
                                    // next column
                                    continue;
                              }
                              /// here we try to set booleans to guess at validation type
                              //   when the Registry class is generated ///
                              // is column alpha ?
```

-continued

```
                        if (member[i] .isAlpha( ) = = true)
                        {
                            // has datatype already been narrowed ?
                            if (member[i] .isAlphaNumeric( ) = = false)
                            {
                                // no, check for numeric characters
                                char[ ] chars = field.toCharArray( );
                                for (int j = 0; j < field.length( ); j++)
                                {
                                    if (Character.isDigit(chars [j] ) = = true)
                                    {
                                    // found a numeric
                                    member[i] .setAlphaNumeric(true);
                                    break;
                                    }
                                }
                            }
                            // has datatype already been narrowed ?
                            if (member [i] .isPunctuated( ) = = false)
                            {
                                // no, check for punctuation characters
                                char [] chars = field.toCharArray( );
                                for (int j = 0; j < field.length( ); j++)
                                {
                                    if (OSFRulesObject .isCharacterPunctuation(chars [j] ) = = true)
                                    {
                                        // found a valid punctuation char
                                        member[i] .setPunctuated(true);
                                        break;
                                    }
                                }
                            }
                        }
                        // is field length longer than that considered to be a picklist
                        // key value or code/id element ?
                        if (field.length( ) > maxvaluelength__)
                        {
                            // yes, next column
                            hashtable[i] = null;
                            continue;
                        }
                        // is column value in hashtable ?
                        if (hashtable[i] .get(field) = = null)
                        {
                            // no add
                            hashtable[i] .put (field, field);
                            }
                        }
                    } // end for (int i . . .
                } // end while (reader . . .
            } // end while (result . . .
    } // end try
    catch (OSFDBIOException dbe)
    {
        sysman__.logMessage (CLASSNAME + "-I-ConnectException,   DB Connect Exception: " +
            "on table-" + table__.getName( ) + " m-" + dbe.getMessage( ));
        dbe.printStackTrace( );
        return;
    }
    catch (DatabaseException dbe)
    {
        sysman__.logMesssge (CLASSNAME + "-I-DBException,   Database Exception: " +
            "on table-" + table__.getName( ) + " m-" + dbe.getMessage( ));
        dbe.printStackTrace( );
        return;
    }
    /// process hashtable value lists
    // build output value list from hashtable, set return object in parent ?
    for (int i = 0; i < columncount; i++)
    {
        // scan complete
        member[i] .setColumnScanned (true);
        // is hashtable valid ?
        if (hashtable[i] != null)
        {
            // . . . and has elements ?
            if (hashtable[i] .size( ) > 0)
            {
                // sort underlying vector
```

-continued

```
                    // extract elements
                    StringBuffer valuelist = new StringBuffer(VALUELISTINITIALBUFFERSIZE);
                    Enumeration enum = hashtable[i] .elements( );
                    System.out.println (" t-" + table__.getName( ) + " cn-" + columnname[i] + ": ");
                    while (enum.hasMoreElements( ) = = true)
                    {
                        String value = (String) enum.nextElement( );
                        valuelist.append(value + OSFORBStream.STREAMDELIMITER);
                        System.out.print(value + " ");
                    }
                    System.out.print("\n");
                    // set value list in member object
                    member[i] .setValueList(valuelist.toString( ));
                }
            }
        }
        // completion message
        sysman__.logMessage (CLASSNAME +
            "-I-PickListBuildThreadEnd, completed scan of table-" +
            table__.getName( ) + " records processed-" + recordcount);
    } // end run( )
}
```

Performance, Monitoring and Execution Output

Here is an example of output from the picklist scan thread over a moderate-sized database with a few quarter-million record tables.

These 't-' records are written out every 2500 records so we can monitor the progress of each execution thread. The table name follows 't-' and the records read follows 'r-' thusly:

```
    t-ENDPOTNT__CONNECTION r-145000
1998-09-17 14:45:02 com.tricoron.OSFv13.OSFGenerate-I-ScanStatus, tables
remaining to be scanned- 10
1998-09-17 14:45:08 com.tricoron.OSFv13.OSFGenerate-I-ScanStatus, tables
remaining to be scanned- 10
    t-ENDPOINT__CONNECTION r-147500
```

Another status message is written out every five seconds indicating the number of tables where the scan threads have yet to complete. See above Picklist candidates found are also listed on separate lines for each relevant column before the thread terminates.

```
1998-09-17 14:49:50 com.tricoron.OSFv13.OSFGenerate-I-ScanStatus, tables
remaining to be scanned- 3
    t-CONNECTION cn-CONNECTION__TYPE:
S    A
    t-CONNECTION cn-CIRCUIT__TYPE:
TL VC FE BU IS DG DD IN DB PL PH ID PD T1 EN LL SL HW SD CH FT AH MS E1 DU
ML
    t-CONNECTION cn-CONNECTION__STATUS:
P A
1998-09-17 14:49:53 com.tricoron.OSFv13.OSFPickListBuildThread-I-
PickListBuildThreadEnd, completed scan of table-CONNECTION records processed-
76804
1998-09-17 14:49:57 com.tricoron.OSFv13.OSFGenerate-I-ScanStatus, tables
remaining to be scanned- 2
    t-ENDPOINT cn-ROTARY__DENSITY__CODE:
0 M L I H
    t-ENDPOINT cn-PUBLIC__PRIVATE__IND:
Y 1 N
    t-ENDPOIHT cn-EP__TYPE:
C  N  R  H  S
1998-09-17 14:56:28 com.tricoron.OSFv13.OSFPickListBuildThread-I-
PickListBuildThreadEnd, completed scan of table-ENDPOINT records processed-41213
```

Registry Class

When PRO-OBJECT support classes execute, they require a repository of parameters that is unique to a given installation and set of databases. Understanding of the Registry class and its various overloaded getValue( ) methods is essential to understanding the operation of PRO-OBJECT support classes.

Be advised that the common first reaction to seeing a generated Registry.java class is "WTF is going on here?" or "How does this work"? First keep in mind that a very fast way was needed to get parameters in both clients and servers. The most effective way to do this was to build a class that would build a hashtable, then provide a series of getValue( ) accessors to parameters.

Template-based Registry Class Example

Naturally, the OSFGenerate class creates a singular registry for a given set of database instances. As one would expect, OSFGenerate requires an input template to build the Registry and this is instructive and further demonstrates the power of template-based class generation provided by OSF:

```
/**
 * Stub class for what will ultimately be a distributed
 * application registry
*/
package ##Package##.servercommon;
```

-continued

```
import java.util.Hashtable;
import java.lang.IllegalArgumentException;
import com.roguewave.jdbtools.v2__0.jdbc.JDBCManager;
import com.tricoron.OSFv12.OSFSystemManagement;
import com.tricoron.OSFv13.OSFRulesObject;
public class Registry
{
  private Hashtable table = null;
  private OSFSystemManagement sysman__ = null;
  private final static float LOADFACTOR = 1.0 F;
  private final static String FALSE = "false";
  private final static String TRUE = "true";
```

(59) Database Parameters

Here a block of DB connect parameters are written out for each table owner in each database with tables selected for object build:

```
    ##databaseblock##
    public final static String ##DBLOGICALNAME##$##DBOWNER##$DBTYPE =
"##counter##";
    public final static String ##DBLOGICALNAME##$##DBOWNER##$DRIVER =
"##counter##";
    public final static String ##DBLOGICALNAME##$##DBOWNER##$URLPREFIX =
"##counter##";
    public final static String ##DBLOGICALNAME##$##DBOWNER##$DBSERVER =
"##counter##";
    public final static String ##DBLOGICALNAME##$##DBOWNER##$DBPORT =
"##counter##";
    public final static String ##DBLOGICALNAME##$##DBOWNER##$DBSID = "##counter##";
    public final static String ##DBLOGICALNAME##$##DBOWNER##$DBUSERNAME =
"##counter##";
    public final static String ##DBLOGICALNAME##$##DBOWNER##$DBPASSWORD =
"##counter##";
    public final static String ##DBLOGICALNAME##$##DBOWNER##$DBLOGICALNAME =
"##counter##";
        ##enddatabaseblock##
```

Thusly:

```
public final static String SunServer$DEMO$DBTYPE = "28";
public final static String SunServer$DEMO$DRIVER = "29";
public final static String SunServer$DEMO$URLPREFIX = "30";
public final static String SunServer$DEMO$DBSERVER = "31";
public final static String SunServer$DEMO$DBPORT = "32";
public final static String SunServer$DEMO$DBSID = "33";
public final static String SunServer$DEMO$DBUSERNAME = "34";
public final static String SunServer$DEMO$DBPASSWORD = "35";
public final static String SunServer$DEMO$DBLOGICALNAME = "36";
public final static String Laptop$BEAS$DBTYPE = "37";
public final static String Laptop$BEAS$DRIVER = "38";
public final static String Laptop$BEAS$URLPREFIX = "39";
public final static String Laptop$BEAS$DBSERVER = "40";
public final static String Laptop$BEAS$DBPORT = "41";
public final static String Laptop$BEAS$DBSID = "42";
public final static String Laptop$BEAS$DBUSERNAME = "43";
public final static String Laptop$BEAS$DBPASSWORD = "44";
public final static String Laptop$BEAS$DBLOGICALNAME = "45";
```

(60) Edit Rules and Object to Base Table Mapping

Next a block of entries that specify base edit rules for each attribute in ever object.

Note: These parameters map to the underlying base table columns. This way, if one edit rule is to be changed, it can be altered in one place in the registry and then all attributes in all objects derived from the underlying base table will pick up the change without further maintenance.

```
//// mapping of attribute names to column names here \\\\
/// attribute names \\\
##allattributeblock##
    // parameters for attribute   ##attributeName## in object OBJECT$##OBJECTNAME##,
rules and picklists public final static String
        OBJECT$##OBJECTNAME##$##ATTRIBUTENAME##$MIN = "##counter##" ;
    public final static String
        OBJECT$##OBJECTNAME##$##ATTRIBUTENAME##$MAX = "##counter##" ;
    public final static String
        OBJECT$##OBJECTNAME##$##ATTRIBUTENAME##$VALIDATIONTYPE = "##counter##" ;
    public final static String
        OBJECT$##OBJECTNAME##$##ATTRIBUTENAME##$MAXLENGTH = "##counter##" ;
    public final static String
        OBJECT$##OBJECTNAME##$##ATTRIBUTENAME##$VALUEKEYLIST = "##counter##" ;
    ##endallattributeblock##
    /// column name definitions \\\
    ##allcolumnblock##
    // column attribute names for ##COLUMNNAME## in table TABLE$##TABLE##
    public final static String
        TABLE$##TABLE##$##COLUMNNAME##$MIN = "##counter##";
    public final static String
        TABLE$##TABLE##$##COLUMNNAME##$MAX = "##counter##";
    public final static String
        TABLE$##TABLE##$##COLUMNNAME##$VALIDATIONTYPE = "##counter##";
    public final static String
        TABLE$##TABLE##$##COLUMNNAME##$MAXLENGTH = "##counter##";
    public final static String
        TABLE$##TABLE##$##COLUMNNAME##$VALUEKEYLIST = "##counter##";
    ##endallcolumnblock##
```

A few examples of the above follows, demonstrating a very, very fast way to translate attributes in objects to their underlying base table columns. We use the familiar DepartmentEmployee object as an example.

```
    // parametere for attribute jobID in object OBJECT$DEPARTMENTEMPLOYEE, rules
and picklist keys
    public final static String
        OBJECT$DEPARTMENTEMPLOYEE$JOBID$MIN = "550";
    public final static String
        OBJECT$DEPARTMENTEMPLOYEE$JOBID$MAX = "551";
    public final static String
        OBJECT$DEPARTMENTEMPLOYEE$JOBID$VALIDATIONTYPE = "552";
    public final static String
        OBJECT$DEPARTMENTEMPLOYEE$JOBID$MAXLENGTH = "553";
    public final static String
        OBJECT$DEPARTMENTEMPLOYEE$JOBID$VALUEKEYLIST = "550";
    public final static String
        OBJECT$DEPARTMENTEMPLOYEE$JOBID$KEYLISTDESCRIPTORS = "555";
<snip>
    // column attribute names for JOB_ID in table TABLE$JOB
    public final static String
        TABLE$JOB$JOB_ID$MIN = "3040";
    public final static String
        TABLE$JOB$JOB_ID$MAX = "3041";
    public final static String
        TABLE$JOB$JOB_ID$VALIDATIONTYPE = "3042";
    public final static String
        TABLE$JOB$JOB_ID$MAXLENGTH = "3043";
    public final static String
        TABLE$JOB$JOB_ID$VALUEKEYLIST = "3044";
    public final static String
        TABLE$JOB$JOB_ID$KEYLISTDESCRIPTORS = "3045";
```

At this point we know how many parameters are in the java.util.Hashtable, so it is stored here, the Registry class instance variables are instantiated in the constructor and we begin to make entries in the Hashtable.

```
// optimise hashtable size
private final static int INITIALENTRIES = ##registryentrycount##;
/** zero-arg constructor */
public Registry( )
{
      // create hashtable
      table = new Hashtable(INITIALENTRIES, LOADFACTOR);
```

(61) Registry Hashtable Build

Here the database parameters are written into the Hashtable . . .

```
##databaseblock##
table.put (##DBLOGICALNAME##$##DBOWNER##$DBTYPE,
            new Integer(JDBCManager.DATABASE_##DBTYPENAME##).toString( ));
table.put (##DBLOGICALNAME##$##DBOWNER##$DRIVER,
      "oracle.jdbc.driver.OracleDriver");
table.put (##DBLOGICALNAME##$##DBOWNER##$URLPREFIX,
      "jdbc:oracle:thin:dbms733");
table.put (##DBLOGICALNAME##$##DBOWNER##$DBSERVER, "##DBSERVER##");
table.put (##DBLOGICALNAME##$##DBOWNER##$DBPORT, "##DBPORT##");
table.put (##DBLOGICALNAME##$##DBOWNER##$DBSID, "##DBINSTANCE##");
table.put (##DBLOGICALNAME##$##DBOWNER##$DBUSERNAME, "##DBOWNER##");
table.put (##DBLOGICALNAME##$##DBOWNER##$DBPASSWORD, "##DBPASSWORD##");
table.put (##DBLOGICALNAME##$##DBOWNER##$DBLOGICALNAME, "##DBLOGICALNAME##");
##enddatabaseblock##
```

. . . thusly:

```
table.put (SunServer$DEMO$DBTYPE, new
      Integer(JDBCManager.DATABASE_ORACLE).toString( ));
table.put (SunServer$DEMO$DRIVER,
"oracle.jdbc.driver.OracleDriver");
table.put (SunServer$DEMO$URLPREFIX, "jdbc:oracle:thin:dbms733");
table.put (SunServer$DEMO$DBSERVER, "10.1.1.7")
table.put (SunServer$DEMO$DBPORT, "1521");
table.put (Sunserver$DEMO$DBSID, "ORCL");
table.put (Sunserver$DEMO$DBUSERNAME, "DEMO")
table.put (SunServer$DEMO$DBPASSWORD, "demo");
table.put (SunServer$DEMO$DBLDGICALNAME, "SunServer");
table.put (Laptop$BEAS$DBTYPE,
      new Integer (JDBCManager.DATABASE_ORACLE).toString( ));
table.put (Laptop$BEAS$DRIVER, "oracle.jdbc.driver.OracleDriver");
table.put (Laptop$BEAS$URLPREFIX, "jdbc:oracle:thin:dbma733");
table.put (Laptop$BEAS$DBSERVER, "10.1.1.128");
table.put (Laptop$BEAS$DBPORT, "1521");
table.put (Laptop$BEAS$DBSID, "ORCL");
table.put (Laptop$BEAS$DBUSERNAME, "DEMO");
table.put (Laptop$BEAS$DBPASSWORD, "demo");
table.put (Laptop$BEAS$DBLOGICALNAME, "Laptop");
```

The astute reader will note that using the ##counter## OSFGenerate replacement target rather than the actual string parameter name as keys to the Hashtable minimizes the overall size of the Hashtable and the resultant Registry.class file when compiled.

Here other miscellaneous parameters are loaded into the Registry hashtable:

```
table.put (SECURITYRDBMSPREFIX, ##DBLOGICALNAME##$##DBOWNER##);
table.put (IMAGEALIAS, "/images/");
table.put (DEFAULTOBJECTBLOCKSIZE, "8");
table.put (SHAREDREADCONNECTION, FALSE); // true is not recommended
table.put (SERVERDEACTIVATIDN, "0");
table.put (WWWSERVER, "10.1.1.7");
table.put (BINDWAITINTERVALMS, "250");
table.put (MAXPICKLISTVALUES, "32");
/* attribute -> column mappings permit use of one set of edit attributes
    in each object that column resides, resulting in a single point of
    maintenance below */
##allattributeblock##
// stow mappings of attributes -> columns for
// attribute ##attributeName## in object OBJECT$##OBJECTNAME##
table.put (OBJECT$##OBJECTNAME##$##ATTRIBUTENAME##$MIN,
    TABLE$##TABLE##$##COLUMNNAME##$MIN);
table.put (OBJECT$##OBJECTNAME##$##ATTRIBUTENAME##$MAX,
    TABLE$##TABLE##$##COLUMNNAME##$MAX);
table.put (OBJECT$##OBJECTNAME##$##ATTRIBUTENAME##$VALIDATIONTYPE,
        TABLE$##TABLE##$##COLUMNNAME##$VALIDATIONTYPE);
table.put (OBJECT$##OBJECTNAME##$##ATTRIBUTENAME##$MAXLENGTH,
        TABLE$##TABLE##$##COLUMNNAME##$MAXLENGTH);
table.put (OBJECT$##OBJECTNAME##$##ATTRIBUTENAME##$VALUEKEYLIST,
        TABLE$##TABLE##$##COLUMNNAME##$VALUEKEYLIST);
##endallattributeblock##
```

Continuing the example with the JOB attribute of the DepartmentEmployee object, the above block generates for this attribute:

```
// stow mappings of attributes -> columns for
// attribute jobID in object OBJECT$DEPARTMENTEMPLOYEE
table.put (OBJECT$DEPARTMENTEMPLOYEE$JOBID$MIN, TABLE$EMPLOYEE$JOB_ID$MIN);
table.put (OBJECT$DEPARTMENTEMPLOYEE$JOBID$MAX, TABLE$EMPLOYEE$JOB_ID$MAX);
table.put (OBJECT$DEPARTMENTEMPLOYEE$JOBID$VALIDATIONTYPE,
    TABLE$EMPLOYEE$JOB_ID$VALIDATIONTYPE);
table.put (OBJECT$DEPARTMENTEMPLOYEE$JOBID$MAXLENGTH,
    TABLE$EMPLOYEE$JOB_ID$MAXLENGTH);
table.put (OBJECT$DEPARTMENTEMPLOYEE$JOBID$VALUEKEYLIST,
    TABLE$EMPLOYEE$JOB_ID$VALUEKEYLIST);
table.put (OBJECT$DEPARTMENTEMPLOYEE$JOBID$KEYLISTDESCRIPTORS,
    TABLE$EMPLOYEE$JOB_ID$KEYLISTDESCRIPTORS);
```

Finally the actual parameters for the base table get stored in the Registry Hashtable . . .

```
/* these basic edit rules permit all attribute edits to be performed
    in the browser rather than in the server, thus reducing the amount
    of network traffic, permitting all input to be validated in one shot
    and improving response time and overall dataentry time */
##allcolumnblock##
// stow parameters for TABLE$##TABLE##/##COLUMNNAME## edit rules
table.put (TABLE$##TABLE##$##COLUMNNAME##$MIN, "##DEFAULTMIN##");
table.put (TABLE$##TABLE##$##COLUMNNAME##$MAX, "##DEFAULTMAX##");
table.put (TABLE$##TABLE##$##COLUMNNAME##$VALIDATIONTYPE,
    new Integer (OSFRulesObject.##VALIDATIONTYPE##).toString( ));
table.put (TABLE$##TABLE##$##COLUMNNAME##$MAXLENGTH, "##fieldlength##");
// stow picklist candidate values
```

-continued

```
table.put (TABLE$##TABLE##$##COLUMNNAME##$VALUEKEYLIST,
        "##picklistcandidates##");
    ##endallcolumnblock##
}
```

. . . for the JOB_ID column in the JOB table, as an example.

```
    // stow parameters for TABLE$EMPLOYEE/JOB_ID edit rules
    table.put (TABLE$EMPLOYEE$JOB_ID$MIN, "0");
    table.put (TABLE$EMPLOYEE$JOB_ID$MAX, "999.0");
    table.put (TABLE$EMPLOYEE$JOB_ID$VALIDATIONTYPE,
        new Integer
        (OSFRulesObject.NUMERICVALIDATION).toString( ));
    table.put (TABLE$EMPLOYEE$JOB_ID$MAXLENGTH, "3");
    // stow picklist candidate values
    table.put (TABLE$EMPLOYEE$JOB_ID$VALUEKEYLIST,
    "669|668|667|672|671|670|");
```

In this way, objects and their attributes can be translated to their corresponding elements in the most efficient manner, in practice, the described processes is very efficient in addition to being very flexible,

(62) Registry Parameter Accessor Methods

Methods to supply parameters of various datatypes are outlined below:

```
public string getParameter(String _searchargument)
    throws IllegalArgumentException
{
    String parameter = (string) table.get(_searchargument);
    if (parameter == null)
    {
        displayErrorMessage (_searchargument);
        throw new IllegalArgumentException(
            "Not found in registry: " + _searchargument);
    }
    return parameter;
}
public String getParameterAsString (String _searchargument)
    throws IllegalArgumentException
{
    return getParameter(_searchargument);
}
public int getParameterAsInt (String _searchargument)
    throws IllegalArgumentException
{
    String parameter = (String) table.get(_searchargument);
    if (parameter == null)
    {
        displayErrorMessage (_searchargument)
        throw new IllegalArgumentException(
            "Not found in registry: " + _searchargument);
    }
    int parsedparameter = 0;
    try
    {
        parsedparameter = Integer.parseInt(parameter);
    }
    catch (NumberFormatException nfe)
    {
        throw new IllegalArgumentException(
            "Registry arg format error, not an int-" +
            parameter + ", s-" + _searchargument);
        }
        return parsedparameter;
    }
    public double getParameterAsDouble (String _searchargument)
        throws IllegalArgumentException
    {
```

-continued

```
        String parameter = (String) table.get(_searchargument);
        if (parameter == null)
        {
            displayErrorMessage (_searchargument);
            throw new IllegalArgumentException(
                "Not found in registry: " + _searchargument);
        }
        double parsedparameter = 0.0;
        try
        {
            parsedparameter =
            Double.valueOf(parameter).doubleValue( );
        }
        catch (NumberFormatException nfe)
        {
            String message =
                "Registry arg format error, not a double-" +
                parameter + ", s-" + searchargument;
            throw new IllegalArgumentException(message);
        }
        return parsedparameter;
    }
    public boolean getParameterAsBoolean(String _searchargument)
        throws IllegalArgumentException
    {
        String parameter = (string) table.get(_searchargument);
        if (parameter == null)
        {
            displayErrorMessage (_searchargument);
            throw new IllegalArgumentException(
                "Not found in registry: " + _searchargument);
        }
        if (parameter.compareTo(TRUE) == 0)
        {
            return true;
            }
            return false;
    }
    private void displayErrorMessage (String _searchargument)
    {
        // build message
        String message = this.getClass( ).getName( ) +
                    "-E-NotInRegistry, paramater with internal
                    representation-" +
            _searchargument + "not found in Registry";
        // log message using sysman ref if available
        if (sysman_ != null)
        {
            sysman_.logMessage(message);
        }
        else
        {
            System.out.println(message);
        }
    }
}
```

Abbreviations and Terms

Attribute—a characteristic of an object carried as instance data.

EJB—Enterprise Java Beans provide services to network-enable applications so they may be easily deployed in Intranets, extranets and the Internet. EJB is the standard server component model for Java application servers.

IDE—Integrated Development Environment, a software tool which uses prepackaged reusable JavaBean components to enable a developer to build business and industry-specific applications. Examples: BORLAND JBUILDER, IBM VISUALAGE IIOP—The protocol used by CORBA over TCP/IP, specifically the Internet Inter-ORB Protocol JDBC—Java Database Connectivity, the Java API for accessing relational databases.

OO—Object-Oriented, a programming model which maximizes software investment by stressing reusability. Uses classes, methods, inheritance and CORBA communications rather than functions, structures, cut-and-paste and sockets.

OOUI—Object-oriented User Interface. An interface based upon graphical presentation of objects. This is opposed to a GUI or graphical user interface in which the data is presented and manipulated through low-level windowing constructs such as menus, buttons, fields and simple lists.

OSF—Object Server Factory, a product that reads relational database schemas and table contents, then generates PRO-OBJECTS, scripts and support classes Picklist—A drop-down, multiple choice list common in user interfaces to facilitate choice of a unique value.

PRO-OBJECT, a Persistent-Relational Object component confirming to JavaBean component model for easy integration to JavaBean-compliant IDEs PSTN—Public Switched Telephone Network. Otherwise known as a "dial-up" connection.

RDB—Relational Database which implements a version of SQL such as ORACLE, MICROSOFT SQL SERVER, IBM DB2, SYBASE sed—A UNIX utility program that performs edits on multifiles, also known as a stream editor.

SSL—Secure Sockets Layer. An security scheme implemented over TCP/IP that, in essence, performs two functions: ensures that a given client application is indeed communicating with the desired server and encrypts all network traffic so that it is not sent as human-readable clear text.

Stovepipe Application—A client-server or mainframe legacy system where the application has its own database, user interface and communications scheme; an application generally not integrated to another as the UI is typically directly coupled to the database.

Object and Attribute Identification

Immediately before software generation, ObjectServerFactory merges databases and tables to produce a singular set of objects.

Consider the following enumeration that is generated when the familiar DEMO tables input to OSF.

```
//
// Object list enumeration
//
enum ObjectID
{
   CustomerObject,
   DepartmentObject,
   EmployeeObject,
   ItemObject,
   JobObject,
   LocationObject,
```

-continued

```
   PriceObject,
   ProductObject,
   SalaryGradeObject,
   SalesOrderObject,
   LocationDepartmentObject,
   JobEmployeeObject,
   LocationEmployeeObject,
   DepartmentEmployeeObject,
   ProductPriceObject,
   DepartmentCustomerObject,
   LocationCustomerObject,
   JobCustomerObject,
   EmployeeCustomerObject,
   EmployeeSalesOrderObject,
   JobSalesOrderObject,
   LocationSalesOrderObject,
   DepartmentSalesOrderObject,
   CustomerSalesOrderObject,
   CustomerItemObject,
   DepartmentItemObject,
   LocationItemObject,
   JobItemObject,
   EmployeeItemObject,
   SalesOrderItemObject,
   ProductPrice_Object,
   ProductItemObject
};
```

For each of the above objects, an IDL Interface is generated. Consider the interface that is generated for the ProductPrice object, which is built from the Product, Item and Price DEMO tables:

```
//
// Equivalent derivation:
// ProductPrice_: PRODUCT, ITEM, PRICE
//
interface ProductPrice : BaseObject
{
   readonly attribute string ProductID;
   readonly attribute string Description;
   readonly attribute string OrderID;
   readonly attribute string ItemID;
   readonly attribute string ActualPrice;
   readonly attribute string Quantity;
   readonly attribute string Total;
   readonly attribute string ListPrice;
   readonly attribute string MinPrice;
   readonly attribute string StartDate;
   readonly attribute string EndDate;
   // Attribute identifiers used in clients and servers
   enum ProductPriceAttributeIDs
   {
      PRODUCTIDAID,
      DESCRIPTIONAID,
      ORDERIDAID,
      ITEMIDAID,
      ACTUALPRICEAID,
      QUANTITYAID,
      TOTALAID,
      LISTPRICEAID,
      MINPRICEAID,
      STARTDATEAID,
      ENDDATEAID
   };
};
```

Observe than an additional IDL enumeration is generated for each object. Using the object Ids and the attribute Ids together, each attribute can be uniquely identified at any time.

Written Languages Supported by OSF

Pursuant to international standard ISO-639, the following languages are supported by OSF:

```
"aa", "Afar",
"ab", "Abkhazian",
"af", "Afrikaans",
"am", "Amharic",
"ar", "Arabic",
"as", "Assamese",
"ay", "Aymara",
"az", "Azerbaijani",
"ba", "Bashkir",
"be", "Byelorussian",
"bg", "Bulgarian",
"bh", "Bihari",
"bi", "Bislama",
"bn", "Bengali",
"bo", "Tibetan",
"br", "Breton",
"ca", "Catalan",
"co", "Corsican",
"cs", "Czech",
"cy", "Welsh",
"da", "Danish",
"de", "German",
"dz", "Bhutani",
"el", "Greek",
"en", "English",
"eo", "Esperanto",
"es", "Spanish",
"et", "Estonian",
"eu", "Basque",
"fa", "Persian",
"fi", "Finnish",
"fj", "Fiji",
"fo", "Faroese",
"fr", "French",
"fy", "Frisian",
"ga", "Irish",
"gd", "Scots Gaelic",
"gl", "Galician",
"gn", "Guarani",
"gu", "Gujarati",
"ha", "Hausa",
"he", "Hebrew",
"hi", "Hindi",
"hr", "Croatian",
"hu", "Hungarian",
"hy", "Armenian",
"ia", "Interlingua",
"id", "Indonesian",
"ie", "Interlingue",
"ik", "Inupiak",
"is", "Icelandic",
"it", "Italian",
"iu", "Inuktitut",
"ja", "Japanese",
"jw", "Javanese",
"ka", "Georgian",
"kk", "Kazakh",
"kl", "Greenlandic",
"km", "Cambodian",
"kn", "Kannada",
"ko", "Korean",
"ks", "Kashmiri",
"ku", "Kurdish",
"ky", "Kirghiz",
"la", "Latin",
"ln", "Lingala",
"lo", "Laothian",
"lt", "Lithuanian",
"lv", "Latvian",
"mg", "Malagasy",
"mi", "Maori",
"mk", "Macedonian",
"ml", "Malayalam",
"mn", "Mongolian",
```

-continued

```
"mo", "Moldavian",
"mr", "Marathi",
"ms", "Malay",
"mt", "Maltese",
"my", "Burmese",
"na", "Nauru",
"ne", "Nepali",
"nl", "Dutch",
"no", "Norwegian",
"oc", "Occitan",
"om", "(Afan) Oromo",
"or", "Oriya",
"pa", "Punjabi",
"pl", "Polish",
"ps", "Pashto, Pushto",
"pt", "Portuguese",
"qu", "Quechua",
"rm", "Rhaeto-Romance",
"rn", "Kirundi",
"ro", "Romanian",
"ru", "Russian",
"rw", "Kinyarwanda",
"sa", "Sanskrit",
"sd", "Sindhi",
"sg", "Sangho",
"sh", "Serbo-Croatian",
"si", "Sinhalese",
"sk", "Slovak",
"sl", "Slovenian",
"sm", "Samoan",
"sn", "Shona",
"so", "Somali",
"sq", "Albanian",
"sr", "Serbian",
"ss", "Siswati",
"st", "Sesotho",
"su", "Sundanese",
"sv", "Swedish",
"sw", "Swahili",
"ta", "Tamil",
"te", "Telugu",
"tg", "Tajik",
"th", "Thai",
"ti", "Tigrinya",
"tk", "Turkmen",
"tl", "Tagalog",
"tn", "Setswana",
"to", "Tonga",
"tr", "Turkish",
"ts", "Tsonga",
"tt", "Tatar",
"tw", "Twi",
"ug", "Uighur",
"uk", "Ukrainian",
"ur", "Urdu",
"uz", "Uzbek",
"vi", "Vietnamese",
"vo", "Volapuk",
"wo", "Wolof",
"xh", "Xhosa",
"yi", "Yiddish",
"yo", "Yoruba",
"za", "Zhuang",
"zh", "Chinese",
"zu", "Zulu",
```

PRO-OBJECT Template Targets

Here are the most commonly used template replacement tags used in template skeleton files.

Note that the operation of the OSFGenerate code generation object is recursive, so multiple tags can and do exist on one line of code and within lines of code in repeat blocks.

| Target in Skeleton Template file | Function and Operation by OSFGenerate |
|---|---|
| ##Package## | -> package target (0) |
| ##TableObjectName## | -> normalised table name (1) |
| ##TABLENAME## | -> insert table name in UPPER CASE (2) |
| ##COLUMNNAMES## | -> insert all column names in UPPER CASE (3) |
| ##KEYFIELDSAND-SORTORDER | -> array of ints defining which cols are keys (4) |
| ##tableobjectname## | -> all lower case normalised table name (5) |
| ##ObjectName## | -> upper and lower case normalised or specified object name (6) |
| ##objectname## | -> lower case normalised or specified object name (7) |
| ##BaseTableObjects## | -> enumerate all base table objects (8) |
| ##inheritanceblock## | -> recursively invoke parseSkeletonRecord() until ##endinheritanceblock## is encountered in the input template stream (9) |
| ##index## | -> insert an index counter, scoped within a given ##codeblock## (10) |
| ##AttributeName## | -> attribute name as a java-style class-- first byte upper case (11) |
| ##attributeName## | -> attribute name as a java-style method-- first byte lower case (12) |
| ##ATTRIBUTENAME## | -> UPPER CASE attribute name (13) |
| ##attributeblock## | -> recursively invoke parseSkeletonRecord() until ##endattributeblock## is encountered in the input template stream (14) |
| ##attributeonlyblock## | -> same as an ##attributeblock## but with no key fields (15) |
| ##allkeyattributeblock## | -> same as an ##attributeblock## but with only key fields (16) |
| ##keyFields## | -> insert key fields as java-style method-- first byte lower case (17) |
| ##MAXKEYCOUNT## | -> insert nonnegative numeric integer constant of all object keys (18) |
| ##ATTRIBUTECOUNT## | -> insert nnic of count of attributes of object, including keys (19) |
| ##parentKeyFields## | -> insert key fields of top-level table object ONLY-- first byte lower case (20) |
| ##attributesNoKeys## | -> insert attribute names only, no primary or secondary keyfields (21) |
| ##attributeNamesKeysQualfied## | -> all attributes, but at the end of a key field append keysuffix__ (22) |
| ##keymap## | -> insert metadata about key fields of underlying base tables (23) |
| ##OBJECTNAME## | -> UPPERCASE normalised or specified object name (24) |
| ##counter+init## | -> special tag to initialise a special internal counter. No output. (25) |
| ##counter## | -> insert the current value of the above counter, then increment (26) |
| ##registryentrycount## | -> insert the count of registry entries written (27) |
| ##allcolumnblock## | -> recursively invoke parseSkeletonRecord() until ##endcolumnblock## is encountered in the input template stream (28) |
| ##COLUMNNAME## | -> recursively insert a singular column name in UPPER CASE (29) |
| ##TABLE## | -> recursively insert a singular table name in UPPER CASE (30) |
| ##entrycount++## | -> increment registry entry count-- no output (31) |
| ##allattributeblock## | -> recursively invoke parseSkeletonRecord() until ##endcolumnblock## is encountered in the input template stream (32) |
| ##DEFAULTMIN## | -> based on datatype and attribute length, insert a reasonable default minimum value (33) |
| ##DEFAULTMAX## | -> based on datatype and attribute length, insert a reasonable default minimum value (34) |

-continued

| Target in Skeleton Template file | Function and Operation by OSFGenerate |
|---|---|
| ##VALIDATIONTYPE## | -> based on datatype insert the validation type as defined in the OSFRulesObject base class (35) |
| ##fieldlength## | -> insert the maximum field length (36) |
| ##picklistcandidates## | -> insert picklist candidates from table scan or default string (37) |
| ##iso639language## | -> insert the current two byte iso639 language string (38) |
| ##LANGUAGE## | -> insert the current language descriptor (39) |
| ##AttributeNameExpanded | -> add a space before the 2nd through n capitals in an attribute name and then insert (40) |
| ##language## | -> insert the current language descriptor, in lower case (41) |
| ##picklistvalues## | -> insert all picklist values (multiple lines) or if no picklist exists for this column, suppress output of the record (42) |
| ##picklistvalue## | -> insert a unique picklist value gurаranteed to be unique (43) |
| ##picklistvalues## | -> insert all unique picklist values (multiple lines) or if no picklist exists for this column, suppress output of the record (44) |
| ##databaseblock## | -> recursively invoke parseSkeletonRecord() until ##enddatabaseblock## is encountered in the input template stream, setting currentdatabase__ on each interation for each instance on the OSFDatabase list (45) |
| ##DBLOGICALNAME## | -> insert in upper case the intenral logical name of the currentdatabase__ (46) |
| ##DBOWNER## | -> insert in upper case the ownername of the currentdatabase__ and continue with further replacements (47) |
| ##DBPASSWORD## | -> insert in the case entered the password of the owner in the currentdatabase__ object and continue on with further replacements (48) |
| ##DBTYPENAME## | -> insert in upper case the jdbtools type name of the currentdatabase__, carry on with further replacements (49) |
| ##DBSERVER## | -> insert in the case entered the hostname or IP address in the currentdatabase__, carry on with further replacements (50) |
| ##DBPORT## | -> insert IP connect port in the currentdatabase__ object, carry on with further replacements (51) |
| ##DBINSTANCE## | -> insert in the case entered the instance name or SID in the currentdatabase__ object, carry on with further replacements (52) |
| ##DBOWNER## | -> insert in the case entered by the user the owner / user name in the currentdatabase__ object, carry on with further replacements (53) |
| ##MINKEYCOUNT## | -> insert count of keys for a partially qualified read = key count of top level parent (54) |
| ##hasparentconstraint## | -> table is part of a relation / has a parent or owning table (55) |
| ##testvalues## | -> based upon current object context, insert a list of test attribute values (56) */ |
| ##attributename## | -> attribute name as an automatic declaration (57) |
| ##attributenamekeysqualified## | -> all attributes, lower case, at the end of a key field append a lower case keysuffix__ (58) |
| ##javadatatype## | -> insert an appropriate Java data type depending on the normalised internal datatype (59) |

-continued

| Target in Skeleton Template file | Function and Operation by OSFGenerate |
|---|---|
| ##initializer## | -> insert an appropriate initialiser depending on the normalised internal datatype (60) |
| ##JavaPrimitiveObject## | -> insert an name suitable for use in conversion methods (61) |
| ##INTERNALDATA-TYPES## | -> insert the internal datatypes based on the current _table (62) |

Example Resource Bundle

```
/*
     * @(#)JobEmployee__fr.java      1.0
     */
/** resource bundle for
          object: JobEmployee, language: French
          note: use the french.sh sed script to update this and
          all resource bundles for the French language.       */
package com.tricoron.osftest.client;
import java.util.ListResourceBundle;
public class JobEmployee__fr extends ListResourceBundle
{
          static final Object[ ] [ ] contents =
          {
               // Field / attribute descriptors
               { "JobID", "French: Job I D"},
               { "Function", "French: Function"},
               { "EmployeeID", "French: Employee I D"},
               { "LastName", "French: Last Name"},
               { "FirstName", "French: First Name"},
               { "MiddleInitial", "French: Middle Initial"},
               { "ManagerID", "French: Manager I D"},
               { "HireDate", "French: Hire Date"},
               { "Salary", "French: Salary"},
               { "Commission", "French: Commission"},
               { "DepartmentID", "French: Department I D"},
               // Picklist value descriptors
               { "JOB$JOB__ID$669", "French: 669:"},
               { "JOB$JOB__ID$668", "French: 668:"},
               { "JOB$JOB__ID$672", "French: 672:"},
               { "JOB$JOB__ID$671", "French: 671:"},
               { "JOB$JOB__ID$670", "French: 670:"},
               { "EMPLOYEE$DEPARTMENT__ID$43", "French: 43:"},
               { "EMPLOYEE$DEPARTMENT__ID$34", "French: 34:"},
               { "EMPLOYEE$DEPARTMENT__ID$30". "French: 30:"},
               { "EMPLOYEE$DEPARTMENT__ID$24", "French: 24:"},
               { "EMPLOYEE$DEPARTMENT__ID$23", "French: 23:"},
               { "EMPLOYEE$DEPARTMENT__ID$20", "French: 20:"},
               { "EMPLOYEE$DEPARTMENT__ID$14", "French: 14:"},
               { "EMPLOYEE$DEPARTMENT__ID$13", "French: 13:"},
               { "EMPLOYEE$DEPARTMENT__ID$12", "French: 12:"},
               { "EMPLOYEE$DEPARTMENT__ID$10", "French: 10:"},
               // tag to return "missing" in the event a null key is passed to getString( )
               { " ", "missing"}
          };
          public Object[ ] [ ] getContents( )
          {
               return contents;
          }
}
```

Example Foreign Language Translation Script

```
# ****************************************************
# master language translation sed script: French
# ****************************************************
#
# to update all French resource bundles, please run the following
# from a bourne shell (sh) $ prompt:
```

-continued

```
#
# $ for f in *__fr.java ; do sed -f french.sed $f > $f.new ; mv $f.new $f ; done
#
# Note to translator: Please leave the s, underscore and slash characters
# intact on each of the following lines. Change only the "translation here"
# text. Thanks.
# ===========================================================================
# field descriptors:
#
# description for attribute: "customerID" which is mapped
# to column CUSTOMER__ID in table CUSTOMER
s/French: Customer I D/translation here/
# description for attribute: "name" which is mapped
# to column NAME in table CUSTOMER
s/French: Name/translation here/
<snip>
# description for attribute: "jobID" which is mapped
# to column JOB__ID in table EMPLOYEE
s/French: Job I D/translation here/
# description for attribute: "manageRID" which is mapped
# to column MANAGER__ID in table EMPLOYEE
s/French: Manager I D/translation here/
# description for attribute: "hireDate" which is mapped
# to column HIRE__DATE in table EMPLOYEE
s/French: Hire Date/translation here/
<snip>
# description for attribute: "orderID" which is mapped
# to column ORDER__ID in table ITEM
s/French: Order I D/translation here/
# description for attribute: "itemID" which is mapped
# to column ITEM__ID in table ITEM
s/French: Item I D/translation here/
# description for attribute: "actualPrice" which is mapped
# to column ACTUAL__PRICE in table ITEM
s/French: Actual Price/translation here/
# description for attribute: "quantity" which is mapped
# to column QUANTITY in table ITEM
s/French: Quantity/translation here/
# description for attribute: "total" which is mapped
# to column TOTAL in table ITEM
s/French: Total/translation here/
#
# pick list descriptors
#
# pick list choice value for column LOCATION__ID in table DEPARTMENT
s/French: 124:/translation here/
s/French: 123:/translation here/
s/French: 122:/translation here/
s/French: 167:/translation here/
# pick list choice value for column JOB__ID in table EMPLOYEE
s/French: 669:/translation here/
s/French: 668:/translation here/
s/French: 667:/translation here/
s/French: 672:/translation here/
s/French: 671:/translation here/
s/French: 670:/translation here/
# pick list choice value for column COMMISSION in table EMPLOYEE
s/French: 1000:/translation here/
s/French: 300:/translation here/
s/French: 800:/translation here/
s/French: 900:/translation here/
s/French: 1200:/translation here/
s/French: 500:/translation here/
s/French: 0.0:/translation here/
s/French: 1400:/translation here/
# pick list choice value for column DEPARTMENT__ID in table EMPLOYEE
s/French: 43:/translation here/
s/French: 34:/translation here/
s/French: 30:/translation here/
s/French: 24:/translation here/
s/French: 23:/translation here/
s/French: 20:/translation here/
s/French: 14:/translation here/
s/French: 13:/translation here/
s/French: 12:/translation here/
s/French: 10:/translation here/
# pick list choice value for column PRODUCT__ID in table ITEM
s/French: 100871:/translation here/
s/French: 100870:/translation here/
```

-continued

```
s/French: 102136:/translation here/
s/French: 102134:/translation here/
s/French. 200376:/translation here/
s/French: 102132:/translation here/
s/French: 102130:/translation here/
s/French: 101863:/translation here/
s/French: 103141:/translation here/
s/French: 101860:/translation here/
s/French: 103140:/translation here/
s/French: 104352:/translation here/
s/French: 104351:/translation here/
s/French: 104350:/translation here/
s/French: 103121:/translation here/
s/French: 103120:/translation here/
s/French: 100861:/translation here/
s/French: 100860:/translation here/
s/French: 200380:/translation here/
s/French: 104362:/translation here/
s/French: 104361:/translation here/
s/French: 104360:/translation here/
s/French: 105127:/translation here/
s/French: 105125:/translation here/
s/French: 105124:/translation here/
s/French: 105123:/translation here/
s/French: 100890:/translation here/
s/French: 103131:/translation here/
s/French: 103130:/translation here/
# pick list choice value for column GRADE_ID in table SALARY_GRADE
s/French: 5:/translation here/
s/French: 4:/translation here/
s/French: 3:/translation here/
s/French: 2:/translation here/
# pick list choice value for column LOWER_BOUND in table SALARY_GRADE
s/French: 2001:/translation here/
s/French: 3001:/translation here/
s/French: 1201:/translation here/
s/French: 1401:/translation here/
# pick list choice value for column UPPER_BOUND in table SALARY_GRADE
s/French: 9999:/translation here/
s/French: 2000:/translation here/
s/French: 3000:/translation here/
s/French: 1400_:/translation here/
#
# end of French translation sed script
```

Standardized Message Example

```
1998-12-23 01:56:18 com.tricoron.OSFv13.OSFMain-S-OSFInit, ObjectServerFactory initialised
1998-12-23 01:56:21 com.tricoron.OSFv13.WordListLoadThread-I-LoadStart, Loading wordlist
1998-12-23 01:56:23 com.tricoron.OSFv13.WordListLoadThread-S-LoadComplete, Wordlist load
complete
1998-12-23 01:56:29 com.tricoron.OSFv13.OSFDatabase-I-StartConnect, Connecting to
10.1.1.7:1521:ORCL
1998-12-23 01:56:43 Com.tricoron.OSFv13.OSFDatabase-S-ScanComplete, Schema scan of DB
'prodmain' complete
1998-12-23 01:57:35 com.tricoron.OSFv12.OSFObjects-W-KeyListMismatch, Primary key not found
for foreign key, o-1125 con-376 col-2147483647 pos-0 fo-1122 fcol-2147483647 pkcon-373
1998-12-23 01:57:35 com.tricoron.OSFv12.OSFObjects-W-KeyListMismatch, Primary key not found
for foreign key, o-2002 con-702 col-2147483647 pos-O fo-1999 fcol-2147483647 pkcon-700
<snip>
1998-12-23 01:58:49 com.tricoron.OSFv13.OSFGenerate-I-GeneratingComponentClass, Generating
SalesOrderItemObject.java
1998-12-23 01:58:50 com.tricoron.OSFv13.OSFGenerate-I-GeneratingTestComponentClass,
Generating TestSalesOrderItemObject.java
1998-12-23 01:58:51 com.tricoron.OSFv13.OSFGenerate-I-GeneratingComponentClass, Generating
ProductPriceObject.java
1998-12-23 01:58:52 com.tricoron.OSFv13.OSFGenerate-I-GeneratingTestComponentClass,
Generating TestProductPriceObject.java
1998-12-23 01:58:52 com.tricoron.OSFv13.OSFGenerate-I-GeneratingComponentClass, Generating
ProductItemObject.java
1998-12-23 01:58:54 com.tricoron.OSFv13.OSFGenerate-I-GeneratingTestComponentClass,
Generating TestProductItemObject.java
<snip>
```

-continued

```
1998-12-23 01:58:54 com.tricoron.OSFv13.OSFPickListBuildThread-I-PickListBuildThreadStart,
scanning table-DEPARTMENT
1998-12-23 01:58:54 com.tricoron.OSFv13.OSFPickListBuildThread-I-PickListBuildThreadStart,
scanning table-ITEM
<snip>
1998-12-23 01:58:59 com.tricoron.OSFv13.OSFDatabase-W-HeavyConnectionUsage, connection pool
for logical DB prodmain-DEMO-DataAccess at 100%
1998-12-23 01:58:59 com.tricoron.OSFv13.OSFDatabase-I-MoreConnections, connection pool for
logical DB prodmain-DEMO-DataAccess increased from 4(4) to 12 connections
<snip>
1998-12-23 02:10:37 com.tricoron.OSFv13.OSFGenerate-I-GeneratingResourceClass, Generating
ProductItem__en.java
1998-12-23 02:10:38 com.tricoron.OSFv13.OSFGenerate-I-GeneratingResourceClass, Generating
ProductItem__fr.java
1998-12-23 02:10:39 com.tricoron.OSFv13.OSFGenerate-I-GeneratingResourceClass, Generating
Product Item__de.java
1998-12-23 02:10:40 com.tricoron.OSFv13.OSFGenerate-I-GeneratingResourceClass, Generating
ProductItem__es.java
1998-12-23 02:10:41 com.tricoron.OSFv13.OSFGenerate-I-GeneratingResourceClass, Generating
ProductItem__ja.java
1998-12-23 02:10:42 com.tricoron.OSFv13.OSFGenerate-I-GeneratingResourceClass, Generating
Product Item__zh.java
1998-12-23 02:10:43 com.tricoron.OSFv13.OSFGenerate-I-GeneratingMasterLanguageScript,
Generating english.sed
1998-12-23 02:11:17 com.tricoron.OSFv13.OSFGenerate-I-GeneratingMasterLanguageScript,
Generating french.sed
1998-12-23 02:11:28 com.tricoron.OSFv13.OSFGenerate-I-GeneratingMasterLanguageScript,
Generating german. sed
1998-12-23 02:11:59 com.tricoron.OSFv13.OSFGenerate-I-GeneratingMasterLanguageScript,
Generating spanish.sed
1998-12-23 02:11:50 com.tricoron.OSFv13.OSFGenerate-I-GeneratingMasterLanguageScript,
Generating japanese.sed
1998-12-23 02:12:01 com.tricoron.OSFv13.OSFGenerate-I-GeneratingMasterLanguageScript,
Generating chinese.sed
1998-12-23 02:12:12 com.tricoron.OSFv13.OSFGenerate-I-GeneratingRegistry, Generating
Registry.java
1998-12-23 02:13:37 com.tricoron.OSFv13.OSFGenerate-I-RunStatistics, Module and linecount
statistics follow:
1998-12-23 02:13:37 DBIO Objects: 10 (8668 source lines)
1998-12-23 02:13:37 DBIO Test Objects: 10 (4304 source lines)
1998-12-23 02:13:38 Persistence Objects: 32 (28414 source lines)
1998-12-23 02:13:38 Persistence Test Objects: 32 (18208 source lines)
1998-12-23 02:13:38 Server/Impl Objects: 32 (33519 source lines)
1998-12-23 02:13:38 Server/Impl Test Objects: 32 (19429 source lines)
1998-12-23 02:13:38 Business Logic/Rule Objects: 32 (28006 source lines)
1998-12-23 02:13:39 Business Logic/Rule Test Objects: 0 (0 source lines)
1998-12-23 02:13:39 Component/Bean Objects: 32 (54842 source lines)
1998-12-23 02:13:39 Component/Bean Test Objects: 32 (6149 source lines)
1998-12-23 02:13:39 Resource Bundle Objects: 192 (38703 source lines)
1998-12-23 02:13:39 Language Translation Scripts: 6 (14394 source lines)
1998-12-23 02:13:40 Other, miscellaneous test modules: 1 (9512 source lines)
1998-12-23 02:13:40 Other. miscellaneous test modules: 0 (0 source lines)
1998-12-23 02:13:40
1998-12-23 02:13:40 Total Generated Objects: 443 (264148 source lines)
```

File: OSFMain.java

See Program called OSFMain.java which is on the CD-ROM filed herewith.

File: OSFGenerate.java

See Program called OSFGenerate.java which is on the CD-ROM filed herewith.

FILE: OSFORBStream.java

See Program called OSFORBStream.Java which is on the CD-ROM filed herewith.

File: OSFORBStreamObject.java

See Program called OSFORBStreamObject.java which is on the CD-ROM filed herewith.

FILE: OSFORBStreamException.java

See Program called OSFORBStreamException.java which is on the CD-ROM filed herewith.

What is claimed is:

1. A method of translating elements of a database into an object desired, comprising the steps of:

reading said elements of said database and corresponding schema definitional elements to determine values of said elements and their relationships wherein said reading step further comprises:

generating a pick list based upon an inversion of said database; and generating a script containing all unique foreign language strings to be translated;

assembling a list of the values of said elements and their relationship to a standardized view of said database;

accessing skeleton code templates representative of final objects to be produced;

generating source code for the class of the object desired; and producing said object desired by enveloping values assembles in one of said templates.

2. The method of claim 1 wherein said assembling step further comprises:

translating said script to a given language.

3. A method of communicating elements of a database, having a metadata, between a server computer and a client computer, comprising:

generating a pseudo-object by said server computer, said pseudo-object comprising data of said elements;

generating metadata of said elements, wherein said metadata is relationship of said data of said elements, wherein said generating step further comprising:

reading said metadata of said database;

translating a list of said metadata to a standardized view of said database;

accessing skeleton code templates representative of final classes to be produced;

generating source code for the classes of the objects desired, and scripts to compile said classes into executable form;

producing said object desired by enveloping said data and metadata;

transmitting said pseudo-object and metadata from said server computer to said client computer; and assembling said elements to final distributed objects by said client computer from said pseudo-object and metadata received.

4. The method of claim 3 wherein said reading step further comprises:

generating a pick list based upon an inversion of said database table; and generating a script containing all unique foreign language strings to be translated.

5. The method of claim 4 wherein said assembling step further comprises:

translating said script to a given language.

6. An article of manufacture comprising:

a computer usable medium having computer readable program code embodied therein configured to translate metadata of a database into objects desired, the computer readable program code in said article of manufacture comprising:

computer readable program code configured to cause a computer to read said metadata of said database to determine characteristics of said database and their relationship; wherein said computer readable program code further comprises;

computer readable program code configured to generate a pick list based upon an inversion of elements of said database; and computer readable program code configured to generate a script containing all unique foreign language strings to be translated;

computer readable program code configures to cause a computer to assemble a list of the metadata of said database and their relationship in a pseudo-standardized view of said database;

computer readable program code configured to cause a computer to read skeleton code templates representative of final classes to be produced;

computer readable program code configured to cause a computer to generate source code for the class of the object desired; and computer readable program code configured to cause a computer to produce said objects desired by enveloping values assembled in said templates.

7. An article of manufacture comprising:

a computer usable medium having computer readable program code embodied therein configured to communicate elements of a database table between a server computer and a client computer, the computer readable program code in said article of manufacture comprising:

computer readable program code configured to generate a pseudo-object by said server computer, said pseudo-object comprising data of said elements and to generate metadata of said elements, wherein said metadata is relationship of said data, wherein said computer readable program code configured to generate an object by said server computer further comprising:

a computer usable medium having computer readable program code embodied therein configured to translate elements of a relational database table into objects desired, the computer readable program code in said article of manufacture comprising:

computer readable program code configured to cause a computer to read said elements of said database table to determine values of said elements and their relationship;

computer readable program code configured to cause a computer to assemble a list of the values of said elements and their relationship to a standardized view of said database table;

computer readable program code configured to cause a computer to access skeleton code templates representative of final objects to be produced;

computer readable program code configured to cause a computer to generate source code for the class of the object desired; and computer readable program code configured to cause a computer to produce said objects desired by enveloping values assembled in one of said templates;

computer readable program code configured to transmit said pseudo-object and said metadata from said server computer to said client computer; and computer readable program code configured to assemble said elements by said client computer from said object and metadata received.

8. The article of manufacture of claim 7 wherein said computer readable program code configured to cause a computer to read said elements of said database table further comprises:

computer readable program code configured to generate a pick list based upon an inversion of said database table; and computer readable program code configured to generate a script containing all unique foreign language strings to be translated.

* * * * *